United States Patent
Sullivan et al.

(10) Patent No.: US 7,774,220 B2
(45) Date of Patent: Aug. 10, 2010

(54) PROJECT MANAGEMENT SYSTEM FOR AIDING USERS IN ATTAINING GOALS

(75) Inventors: Daniel J. Sullivan, Toronto (CA); Barbara Sue Smith, Toronto (CA)

(73) Assignee: The Strategic Coach Inc., Toronto, ON (CA)

( * ) Notice: Subject to any disclaimer, the term of this patent is extended or adjusted under 35 U.S.C. 154(b) by 1417 days.

(21) Appl. No.: 10/163,637

(22) Filed: Jun. 7, 2002

(65) Prior Publication Data
US 2002/0194046 A1 Dec. 19, 2002

Related U.S. Application Data

(63) Continuation-in-part of application No. 09/450,002, filed on Nov. 29, 1999, now abandoned.

(51) Int. Cl.
G06F 17/60 (2006.01)
(52) U.S. Cl. .......................... 705/7; 434/238; 715/963
(58) Field of Classification Search ....................... None
See application file for complete search history.

(56) References Cited

U.S. PATENT DOCUMENTS

| | | | |
|---|---|---|---|
| 4,489,958 A | 12/1984 | Martin | |
| 5,247,438 A | 9/1993 | Subas et al. | |
| 5,457,476 A | 10/1995 | Jenson | |
| 5,655,118 A | 8/1997 | Heindel et al. | |
| 5,729,745 A * | 3/1998 | Reina et al. | 719/315 |
| 5,745,110 A * | 4/1998 | Ertemalp | 715/764 |
| 5,812,132 A * | 9/1998 | Goldstein | 715/797 |
| 5,839,901 A * | 11/1998 | Karkanen | 434/127 |
| 5,855,006 A | 12/1998 | Huemoeller et al. | |
| 5,873,108 A | 2/1999 | Goyal et al. | |
| 5,890,905 A * | 4/1999 | Bergman | 434/118 |
| 5,954,510 A * | 9/1999 | Merrill et al. | 434/236 |
| 5,978,648 A * | 11/1999 | George et al. | 434/362 |
| 6,012,037 A | 1/2000 | Yoshikawa | |
| 6,042,383 A * | 3/2000 | Herron | 434/238 |
| 6,167,362 A * | 12/2000 | Brown et al. | 703/11 |
| 6,308,164 B1 | 10/2001 | Nummelin et al. | |
| 6,313,852 B1 * | 11/2001 | Ishizaki et al. | 715/751 |
| 6,501,473 B1 * | 12/2002 | Hayes et al. | 345/440 |

OTHER PUBLICATIONS

McClure, David. "Goal-setting MBA Ware ideal for busy project managers," ORMS, Feb. 1996, vol. 23, No. 1, downloaded rom www.lionhrtpub.com/orms [retrieved Jan. 4, 2007].*

(Continued)

*Primary Examiner*—Albert DeCady
*Assistant Examiner*—Dave Robertson
(74) *Attorney, Agent, or Firm*—Carr & Ferrell LLP

(57) ABSTRACT

The present invention is a project management method, system and software product for aiding a user in attaining goals. The system has a goal field for describing a goal, a plurality of obstacle fields for describing a plurality of obstacles to be overcome in attaining the goal, and a plurality of strategy fields for describing a plurality of strategies for overcoming the plurality of obstacles to achieve a result correlated with the goal. Each obstacle field in the plurality of obstacle fields is linked to the goal field, has a unique associated strategy field in the plurality of strategy fields, and is linked with the unique associated strategy field.

20 Claims, 55 Drawing Sheets

OTHER PUBLICATIONS

Fulton, Jennifer. Easy Microsoft Outlook 97. Que: 1997, p. 156-158, 209-211.*

Lifeplan. "Lifeplan—plan and live an excellent life!" as of Jun. 30, 1999, downloaded from web.archive.org/www.mindtools.com [retrieved Dec. 15, 2006].*

Avantos. "Avantos ManagePro 3.1", originally publication date unknown, downloaded from www.foremost-systems.com [retrieved Dec. 15, 2006].*

Goal Pro. "Success Studios Goal Pro 5.0" Jun. 2000, downloaded from web.archive.org/www.goalpro.com [retrieved on Dec. 15, 2006].*

Sullivan, Daniel, "The Strategy Circle", The Strategic Coach, publication date unknown.*

Sullivan, Daniel. "The Secrets of Success", CMA Magazine, Sep. 1998, vol. 72, No. 7, p. 22-25.*

Sullivan, Daniel. "New economic rules call for personal focus" National Underwrite Life, Jul. 2, 1991, n 27A, p. 13 (2).*

Sullivan, Dan. "Breaking through the ceiling of complexity". Life and health Insurance Sales, Jul. 1994, v137n7, p. 4-15.*

Leff, Michelle R. "The checkbook mentor" Life Association News, May 1998, v93n5, p. 8-96.*

Morrow, Edwin P. "Asset Enhancement" Journal of Financial Planning, Apr. 1998, v11n2, p. 100-102.*

The Strategic Coach, Inc. "Where the Best Get Better" downloaded from web.archive.org/www.strategiccoach.com [retrieved Dec. 14, 2006).*

"Welcome to The Strategic Coach" (Nov. 27, 1999) home page of strategiccoach.com, downloaded from http://web.archive.org/web/19991112194745/www.strategiccoach.com/KPhome.htm [retrieved Jul. 6, 2008], 4 pages.*

FAQs (Jun. 1999) support page of strategiccoach.com, downloaded from http://web.archive.org/web/19991113040218/www.strategic-coach.com/software.htm [retrieved Jul. 6, 2008], 14 pages.*

The Strategic Circle/Strategic Coach Program (1983-1997) U.S. Appl. No. 10/163,167 Artifact 10163637ZA, selected pp. 5.*

Claudia Willen, The ABCs of Outlook 97, Sybex Inc., Mar. 17, 1997, Chapters 8-14.

Russell Borland, Running Microsoft Outlook 97, Microsoft Press, Jun. 25, 1997, Chapter 8.

* cited by examiner

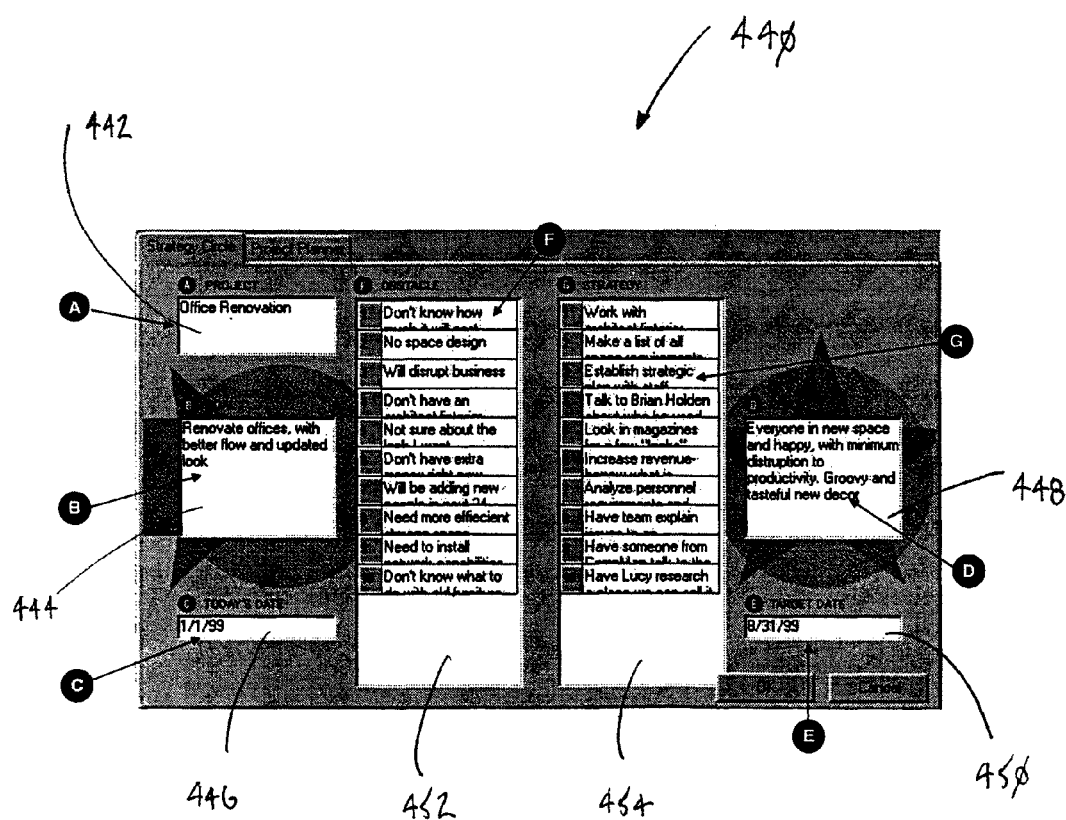

Figure 34c

| # | Strategies | Who's Involved | Implementation Deadline | Step 1 | Step 2 | Step 3 | Step 4 | Step 5 | Resources/Expenses |
|---|---|---|---|---|---|---|---|---|---|
| 1 | Schedule 28 days/discuss with family and team | Me, Family, Assistant/Team | 3 days | Discuss plan with family | Schedule meeting with team | Communicate plan to team | Delegate my schedule to assistant | Set up new vacation plan for team | |
| 2 | Make a list of favorite non-business-related activities | Me | 1 day | Schedule a vacation day | Go to cafe to make list | Communicate ideas with family | | | |
| 3 | Focus on physical exercise and travel | Me, Assistant, Travel agent, Personal trainer | 1 month | Research trainers | Meet with trainer and set up exercise schedule | Discuss vacation schedule with travel agent | Book long-weekend trip with family | Purchase home gym equipment | • Trainer $60/hr<br>• Trip $1,500<br>• Equipment $3,000 |
| 4 | Schedule business events one evening a week only | Me, Assistant | 5 days | Refer to Step 4 of Strategy #1 | | | | | |
| 5 | Explain reasons/plan work around vacation days | Me, Assistant, Team | 5 days | Refer to Step 5 of Strategy #1 | | | | | |
| 6 | Explain reasons/plan schedule with my spouse | Me, Spouse | 5 days | Refer to Step 1 of Strategy #1 | Schedule vacation days with spouse for the year | | | | |
| 7 | Outline all work/discuss with team/delegate | Me, Assistant, Team | 2 weeks | Prioritize strategic projects | Meet with key team members to discuss | Brainstorm ideas of things to do | | | |
| 8 | Develop neglected hobbies | Me | 2 months | Sign up for photography refresher course | Have camera repaired | Delegate activities I should not be doing | | | • Course approx $500<br>• Camera repair $150 |
| 9 | Assign half a day weekly for business reading | Me, Assistant | 5 days | Refer to Step 4 of Strategy #1 | Have assistant update subscriptions | Have assistant prioritize business reading | | | • Subscription fees approx $240 |
| 10 | Explain plans to clients/delegate client service | Me, Assistant, Team, Clients | 2 weeks | Set up client appointments | Draft follow-up letter with contact information | Train Sam on client service issues | Hire replacement to take over Sam's current position | | • Replacement salary $32K<br>• Raise for Sam $5K |

| | Lifetime Extender | | | | |
|---|---|---|---|---|---|
| A. | At what age are you going to die? | | F. How old are you now? | | 43 |
| B. | What do you want your life to be like the year before you die? | | G. How old will you be in 3 years? | | 46 |
| | Physically? | Mobile and healthy | H. Assuming you want the due now rather than the end of your life, what are your priorities for the next 3 years? | | |
| | Mentally? | Alert and feisty | | | |
| | Financially? | Independent | | | |
| | Your Relationships? | Loving and interesting | 1 | Schedule a trip to Europe | |
| | Your Self Assessment? | Life life to the fullest. Made a differer | | | |
| C. | Given this, at what age are you really going to die? | 105 | 2 | Keep a journal | |
| D. | How many extra years do you have? | 20 | 3 | Give $$ to business school student for | |
| E. | What would you like to do with these extra years? | | 4 | Take presentations skills course | |
| | | | 5 | Get info on flying lessons | |
| 1 | Write a book | | | | |
| 2 | Have a TV time slot-"Lifes Observations" | | | | |
| 3 | Travel to every continent | | | | |
| 4 | Learn how to fly | | | OK | Cancel |

Enter up to five items.

US 7,774,220 B2

PROJECT MANAGEMENT SYSTEM FOR AIDING USERS IN ATTAINING GOALS

RELATED APPLICATIONS

This application is a continuation-in-part of U.S. patent application Ser. No. 09/450,002, filed Nov. 29, 1999.

FIELD OF THE INVENTION

This invention relates to time and goal management systems, and in particular, to a computer implemented time management system which aids entrepreneurs in managing their time and goals.

BACKGROUND OF THE INVENTION

The world is currently experiencing an explosion of entrepreneurism. Over the last 25 years in particular because of microtechnology, and because of the breakdown in large bureaucratic structures there has been a vast increase in the number of entrepreneurs in the world. As a result of that, there has been a need for a particular type of software time management and goals management program for highly successful, experienced entrepreneurs who are on the cutting edge of their particular field.

One of the big problems in dealing with time management for entrepreneurs is the ceiling of complexity. Entrepreneurs by nature are very confident people and one of the things that allows them take risks is the fact that they have a high level of confidence. They also have a unique ability which allows them to create opportunities in the marketplace which have not existed before. As they go out and create their organization in the marketplace what happens is that, over a period of time, they find themselves becoming involved more and more in things that they are not really good at. They take on complexity, they have to take on staff, their business requires a great deal of detail, there is a lot of paperwork, there are systems to worry about, and after a while, what happens is that they hit a ceiling of complexity where a number of things happen: one is that they run out of time. They just do not have any more time to focus on their biggest opportunities and more and more they find they focus less and less on future opportunities and more and more on present operations or even worse than that, dealing with past problems. The goal of the present invention is to aid them in moving out of the past, moving them out of the present and having them focus on the development of their future opportunities of taking what they do uniquely well and moving into the future.

Many time management systems exist, but prior to the present invention none have provided the ability to integrate time management with the tracking of business and personal goals. To be successful, any business person must balance their professional and personal lives. To achieve this balance requires clearly defined goals and objectives. The present invention provides the means for achieving that balance.

One example of a time management system is U.S. Pat. No. 5,457,476, which makes use of a palmtop computer to coordinate a schedule, to do list and notes. U.S. Pat. No. 5,855,006 discloses a scheduling or time management system, that integrates data via modem from external sources such as a seller of tickets to sporting events or even the user's bank account. U.S. Pat. No. 5,873,108 discloses an electronic personal information manager for organizing appointments, expenses, contacts and various types of lists.

The prior art systems are essentially time management tools, that provide levels of detail on each scheduled appointment or to do. None of the above mentioned scheduling systems provide for integration of business and personal goals into a time and life management system.

There is therefore a need for a time and goal management system to simplify the work programs of the entrepreneurs, to increase their incomes and their savings and to enhance the overall quality of their lives.

SUMMARY OF THE INVENTION

An object of an aspect of the present invention is to provide an improved project management system for aiding a user in attaining goals.

In accordance with this aspect of the present invention there is provided a system comprising: a goal field for describing a goal; a plurality of obstacle fields for describing a plurality of obstacles to be overcome in attaining the goal, each obstacle field in the plurality of obstacle fields being linked to the goal field; and a plurality of strategy fields for describing a plurality of strategies for overcoming the plurality of obstacles to achieve a result correlated with the goal. Each obstacle field in the plurality of obstacle fields has a unique associated strategy field in the plurality of strategy fields, and is linked with the unique associated strategy field.

An object of a second aspect of the present invention is to provide an improved project management computer system for aiding a user in attaining goals.

In accordance with this second aspect of the present invention there is provided a project management computer system. The system comprises a strategy circle interface, a strategy matrix interface and information transfer means associated with the strategy circle interface and the strategy matrix interface. The strategy circle interface has a goal field for describing a goal, a plurality of obstacle fields for describing a plurality of obstacles to be overcome in attaining the goal, each obstacle field in the plurality of obstacle fields being linked to the goal field, and a plurality of strategy fields for describing a plurality of strategies for overcoming the plurality of obstacles to achieve a result correlated with the goal. Each obstacle field in the plurality of obstacle fields has a unique associated strategy field in the plurality of strategy fields, and is linked with the unique associated strategy field. The strategy matrix interface has, for each strategy field in the plurality of strategy fields, an associated plurality of information fields for receiving information regarding a strategy described in the strategy field. The information transfer means is for copying information entered into the plurality of strategy fields to the strategy matrix interface.

An object of a third aspect of the present invention is to provide an improved computer software product for configuring a computer system to aid a user in attaining goals.

In accordance with this third aspect of the present invention there is provided a computer program product. The computer program product comprises a recording medium, a strategy circle generation means recorded on the recording medium for generating a strategy circle interface, a strategy matrix generation means recorded on the recording medium for generating a strategy matrix interface, and an information transfer generation means recorded on the recording medium for generating an information transfer means. The strategy circle has a goal field for describing a goal, a plurality of obstacle fields for describing a plurality of obstacles to be overcome in attaining the goal, each obstacle field in the plurality of obstacle fields being linked to the goal field, and a plurality of strategy fields for describing a plurality of strategies for overcoming the plurality of obstacles to achieve a result correlated with the goal, Each obstacle field in the plurality of obstacle fields has a unique associated strategy field in the plurality of strategy fields, and is linked with the unique associated strategy field. The strategy matrix interface has, for each strategy field in the plurality of strategy fields, an associated plurality of information fields for receiving information regarding a strategy described in the strategy field. The information transfer means is for copying information entered into the plurality of strategy fields to the strategy matrix interface.

BRIEF DESCRIPTION OF THE DRAWINGS

FIG. 26 is a screen capture of the delegations details of the people component;

FIG. 33b is a screen capture of the strategy circle screen of the tools component;

FIG. 34c is a project planner for the strategy circle of FIG. 33c;

FIG. 37 is a screen capture of the lifetime extender screen of the tools component;

DETAILED DESCRIPTION OF THE INVENTION

Figure 1:
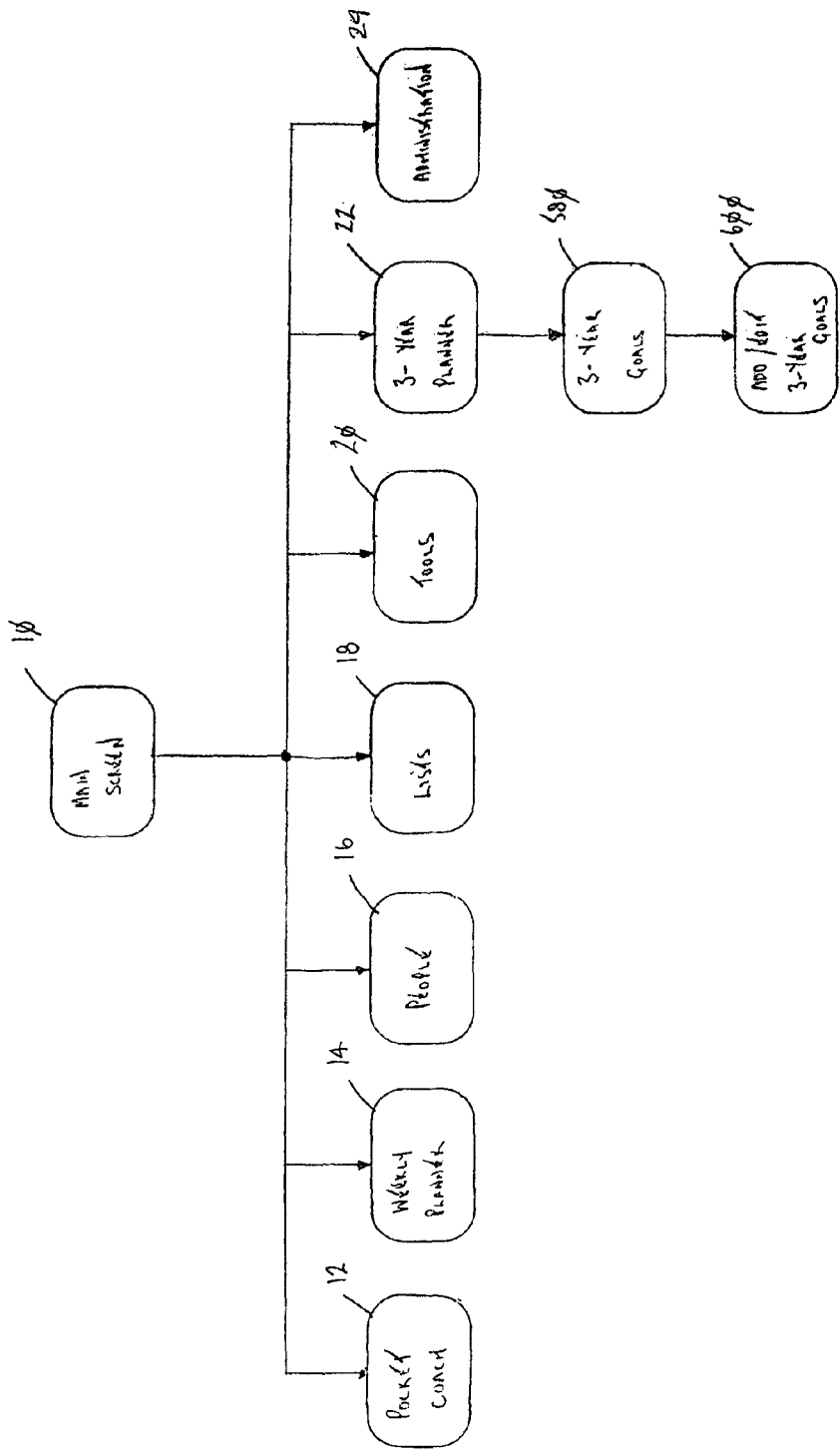
FIG. 1 is a block diagram illustrating the components of the present invention and sub-components of the 3-year planner component.

There are five basic areas that the present invention aids the user to manage and control. The details of each area follows.

1) Entrepreneurial Time System

This is where the present invention is different from any other kind of entrepreneurial system, it actually increases, dramatically, the amount of free time that the entrepreneurs have, and that really, usually, strikes people as very, very strange. How is an entrepreneur going to make themselves more successful by taking free time? This system is based on the principal that the actual results that entrepreneurs achieve actually occurs in a very short period of time and what they need is to be very rejuvenated, very relaxed and very focused on particular types of relationships, particular types of opportunities and when they are in this particular type of situation, they can achieve remarkable results in a very short period of time.

The time system that most people operate in is not an Entrepreneurial Time System, but rather a bureaucratic time system. This dates back to about 150 years to when the factory system began in Europe and in North America. It was a time when, in order for factories to be productive it was necessary that there be very strict work hours, people had to show up at their work station at a particular time because if they did not, it would stop the factory. It would stop the assembly line. It took a long time to get people to adapt to this system, it probably took generations. But, throughout the 20th century now, both in factory systems and in large offices and other kinds of institutions, the situation exists where people associate time management with being fully involved day by day and, for the most part, working all the time. "9 to 5" is a very famous concept in our culture. The work for the most part, is repetitive work, day in, day out, year in year out. The world has changed radically over the last twenty-five years and the way that things were organized, the way that things worked for such a long time, they do not work so well anymore. Many entrepreneurs, in making the move out of that old culture into the new entrepreneurial culture have brought some things with them that are not appropriate. One of the things that they have brought with them is a bureaucratic time sense. So, in order to get entrepreneurs into a state of much higher productivity and to a state of much higher energy, the present invention requires them to establish their entire yearly schedule on the basis of three days:

a) free days;
b) focus days; and,
c) buffer days.

These are the three different kinds of days, so we do not think in terms of weekdays, we do not think in terms of holidays or vacation days. We just say that throughout the year, 365 days, there are just three different kinds of days: free, focus and buffer.

A free day is a 24 hour day. It goes from midnight to midnight. The purpose of the free day is for rejuvenation. It is to separate the individual from work related activities, from work related relationships, and from work related thinking. Many entrepreneurs, when they first hit this concept, are like a drug addict going cold turkey. They are so used to working every day to the year, on a weekend they still work, when they go on vacation, they take along work with them. One of the things that such an approach to life does is it puts an enormous strain on family relationships. Thus, one of the things that the free day does is that it restores a sense of certainty to the family that when a free day is scheduled it is truly a free day.

Focus days are the days in which money is made. If the number of free days is increased than the number of work days now becomes crucial. A focus day is a day in which the entrepreneur is going to be focused on the entrepreneur's best activities, on the entrepreneur's best relationships, on the entrepreneur's best opportunities.

The third type of day is the buffer day. The buffer days are work days, they are twenty four hour days too, midnight to midnight, free day is midnight to midnight, focus day is midnight to midnight, buffer day is midnight to midnight. And on a buffer day, the entrepreneur is able to prepare. Most people in business do not practice, they do not rehearse, for them every day is game day. In order for the entrepreneur to be able to succeed on the focus days, the entrepreneur has to have some other days, buffer days, when the entrepreneur prepares. Everything that the entrepreneur is going to need for a particular meeting, a presentation, or a negotiation, the entrepreneur needs to set aside days when the entrepreneur can put in place all the steps necessary to be successful. The entrepreneur then has it very clear in their mind so that when the entrepreneur gets into the actual situation, then the entrepreneur does not have to think about it, it is all there. That is a buffer day. Similarly, when the entrepreneur is going away for free days, the entrepreneur also needs to prepare so that everything is in place, everything is delegated, everything has been thought through before the entrepreneur leaves. So, the buffer day is there for preparation so that focus days are truly focused, so that free days are truly free. The other thing that buffer days are used for is to clean up messes, to delegate. A very crucial third area is to actually develop new capabilities. The entrepreneur to succeed must acquire new knowledge and skills, new products, new services, new kinds of technology, strategic alliances, and develop new markets. Certain days of the development of the capabilities of the entrepreneurial firm have to take place and buffer days are used for this. That is the Entrepreneurial Time System.

2) Focus

The inventors believe that there are only two ways in which an entrepreneur can get into trouble, short range and long range. The short range means that probably within the context of each quarter there are certain crucial results that have to happen. Some of these are income results, some of them are capability results, or organizational results, the entrepreneur will have all these different kinds of results that have to occur within a 90 day framework, or the entrepreneur will have a sense that the entrepreneur is not going ahead. Certainly cash flow is one of those crucial 90 day results. There has to be a certain amount of cash flow to constantly fuel the entrepreneurial company. The inventors refer to the group of results that the entrepreneur has which are tied to the 90 day framework as the Top 20 Club. The inventors chose the name Top 20 because it is their contention and experience working with entrepreneurs over the years, that twenty relationships is about the maximum that the entrepreneur can work within a 90 day period to produce certain kinds of results. The entrepreneur can obviously work with more results but to have good communication, to have good team work, twenty is about the maximum that the entrepreneur is going to achieve during the 90 day period. Some people do not have twenty, some people have fifteen, some people have ten, some people have five, but the point here is that, at the beginning of each 90 day period, the entrepreneur focuses on just a certain number of relationships, the entrepreneur names who those relationships are, the entrepreneur decides the result they want to achieve with each one of those relationships and then on a week by week basis, during the quarter, the entrepreneur focuses in on "who can I work with this week?" "what result can I achieve by the end of this week?" so that by the end of the 90 days, all the results that the entrepreneur wanted for that quarter come in through the relationships. That is the Top 20 Club.

There is another set of results that the entrepreneur has to have. While focusing on the short range there are some results that have to occur six months from now, there are some results that have to happen a year from now, two years from now and so on. Even though they are not going to happen in the next 90 days, the entrepreneur has to start working with relationships that are going to produce those longer range results. These longer term relationships are called the Farm Club. The Farm Club is a baseball connotation that there are prospects for the future that are going to become major leaguers down the road.

As the entrepreneur is having meetings, the entrepreneur is having discussions, the entrepreneur is making presentations, the entrepreneur is involving the entrepreneur in teamwork with other individuals where the results are going to be six months down the road, a year down the road, two years down the road. That is the Farm Club.

3) The Largest Cheque

The word cheque is used in a very loose sense in the sense that a cheque means a kind of result. Now, for most people, who are directly in client relationships, or customer relationships, where the whole focus of their activity is to bring in money from the marketplace, cheque really works for them in just the normal sense of the word. Another way of thinking about it is the largest result. Say the entrepreneur has a larger type of entrepreneurial company, the entrepreneur has 1,000 to 2,000 employees. Within the frame work of the entrepreneur looking at the entrepreneur business there are a series of different indicators on how the entrepreneur is doing. It may be the accuracy with which the entrepreneur is creating the entrepreneur product error free, it may be renewal rates on particular types of activities. Thus, the entrepreneur will have a score board of different kinds of results. The objective is to identify what the inventors call the Strategic Implications, in other words, these are results that are clear indicators that the entrepreneur is growing, clear indicators that the entrepreneur is winning, and every company, regardless of what kind of company it has, can break the overall performance of that company into a set of key quantifiable factors. Obviously money is one of them, but there are other factors too. This is called the Largest Cheque.

4) Unique Ability

Of all the different activities a person would do in his or her lifetime, there are certain areas that are absolutely unique and any time that person is able to spend a certain amount of time in that area of unique ability which comes out in a particular activity, there is magic. Unique ability has a number characteristics, number one is the entrepreneur loves doing it, it is an activity of love so this is something that almost requires no effort on the entrepreneur's part. Two, because the entrepreneur loves doing it, it gives off a tremendous amount of energy. The entrepreneur feels the energy and other people, when they are in the entrepreneur presence, when the entrepreneur is doing this activity, also feel the energy. The third thing is that there is never ending improvement in this area. No matter how good the entrepreneur is, there is always room for more improvement. So this unique ability could be there at 20 years old in a very powerful form, at 30 it would be even better, at 50 it would be even more powerful, at 80 it would be even more powerful. It is something that would grow throughout a person's lifetime. They would never reach a point where they would start to recede from that as long as they are focusing their time on it.

To allow entrepreneurs to take advantage of the concepts described above, the inventors have incorporated these concepts in a computer based system. To that end, the inventors have used the Power Builder tool from PowerSoft with the SQL database provided by Sysbase, running on the Windows 95 operating system. As will be well understood by one skilled in the art, the tools used and the operating system selected to implement the present invention are not key to the present invention. Tools and operating systems selected may vary and although they may affect the specific implementation and appearance of the present invention, they do not restrict the present invention to either the inventors choice of tools or operating system. The present invention provides multi-user capability, that is to say that users of the system may share data and may view other users data within specified confidentiality or access/privilege guidelines.

5) The Strategy Circle

In difficult situations—ones that are fraught with obstacles that confuse, overwhelm, paralyze—there is danger, but there is also tremendous opportunity. All opposition in life is an opportunity to create and think strategically, to act strategically, and to succeed strategically: Opposition is an asset.

When we face obstacles to our goals, there are just two courses of action from which to choose: We can complain, or we can create. The choice we make means the difference between success and failure.

To complain means to be defeated, or to give up and allow problems to have the power over the future. This is a victim mentality. To create, on the other hand, means to transform obstacles, or find solutions. Making the decision to find solutions gives the individual, as the creator, increasing power and control over his or her future.

The Strategy Circle provides a new capability that encourages people to use their creative abilities to transform all personal and professional obstacles.

By using The Strategy Circle, we can look at obstacles as opportunities, and are much more likely to take responsibility for our problems. When The Strategy Circle is established as the foundation for creative problem solving, the door is opened for unlimited growth, development, and achievement.

With every use of The Strategy Circle, there is an automatic strengthening of the creative powers of the brain. After using The Strategy Circle just a few times, we automatically begin to think in a more integrated and creative fashion in all areas of our lives.

Regardless of culture, gender, or age, as human beings, we will always strive for something more and will always be faced with certain obstacles that prevent us from achieving what we want. Each of us has to come to grips with this opposition. And this is where the fundamental choice come in: Do we complain or do we create? Will we be empowered or will we paint ourselves as victims? For those armed with The Strategy Circle, there is only one choice. And it is this choice that results in creativity, breakthroughs, and extraordinary success throughout life.

In order to become a creative problem solver on a permanent basis, it is useful to understand how the human brain works. The brain is an extraordinary thinking system. It makes a trillion decisions per second, and does a hundred different things at once. It simultaneously takes millions of different memories and considerations into account. However, all of its complexity can be explained in terms of three great abilities.

The most remarkable ability that human beings have that separates us from the rest of the animal kingdom is our ability to visualize—to visualize a reality in the future that doesn't yet exist.

The brain's second impressive ability, however, often makes it difficult for us to take advantage of the first ability. Almost the moment we envision a particular result we want in the future, we immediately think of all the obstacles that will prevent us from achieving this result. We become paralyzed, unable to take the first step forward.

Many will claim that this negativity should be ignored. "Think positive," they say. To become a truly effective thinker and achiever, however, the secret is using this negativity as the raw material for achieving our goals.

Using the obstacles or negativity as a tool for achieving what we envision is possible because of our brain's third great ability. This is the transformative ability. We can take all of the opposition, and we can transform it into strategies for achieving our goals.

This is the philosophy of The Strategy Circle. Understanding it is the first step to thinking in a more entrepreneurial manner.

Everyone has the ability to envision improvements, or specific new and different results that can make our lives better in the future. Everyone, even a newborn infant, is equipped with the power to imagine or visualize results and achievements. In the course of a single day, we can contemplate a thousand different things—wishes and desires—that constitute how we want our future to be.

This is quite amazing when you think about it, this ability to see vividly things that do not yet exist! However, many people fail to capitalize on this ability because they are overwhelmed by their brain's second great ability.

As soon as our brain establishes a goal, we are immediately confronted with a series of obstacles in our minds. When these obstacles appear, most people give up. Some people become so focused on obstacles that they stop having goals, and often they try to stop other people from having and achieving goals.

This is a complete misunderstanding of the purpose of these obstacles. Obstacles are the brain's best and first attempt to provide us with the raw material for achieving our goals. In this sense, opposition is a positive thing.

There is a small group of people in every society that has learned how to thrive on obstacles. Their recognition and use of the third brain ability enables them to set goals, to identify obstacles, and then to convert the obstacles into strategies. This leads directly to the achievement of their goals.

This is the single quality of mind that separates entrepreneurial thinkers from non-entrepreneurial thinkers. Within every society, it is the entrepreneurially-minded who positively transform deficiencies.

FIG. 1 is a block diagram illustrating the components of the present invention comprising initial screen 10, Pocket Coach component 12, weekly planner component 14, people component 16, lists component 18, tools component 20, 3-year planner component 22 and administration component 24. Also shown are the 3-year goals sub-component 580 and the add/edit 3-year goals sub-component 600.

Figure 2:
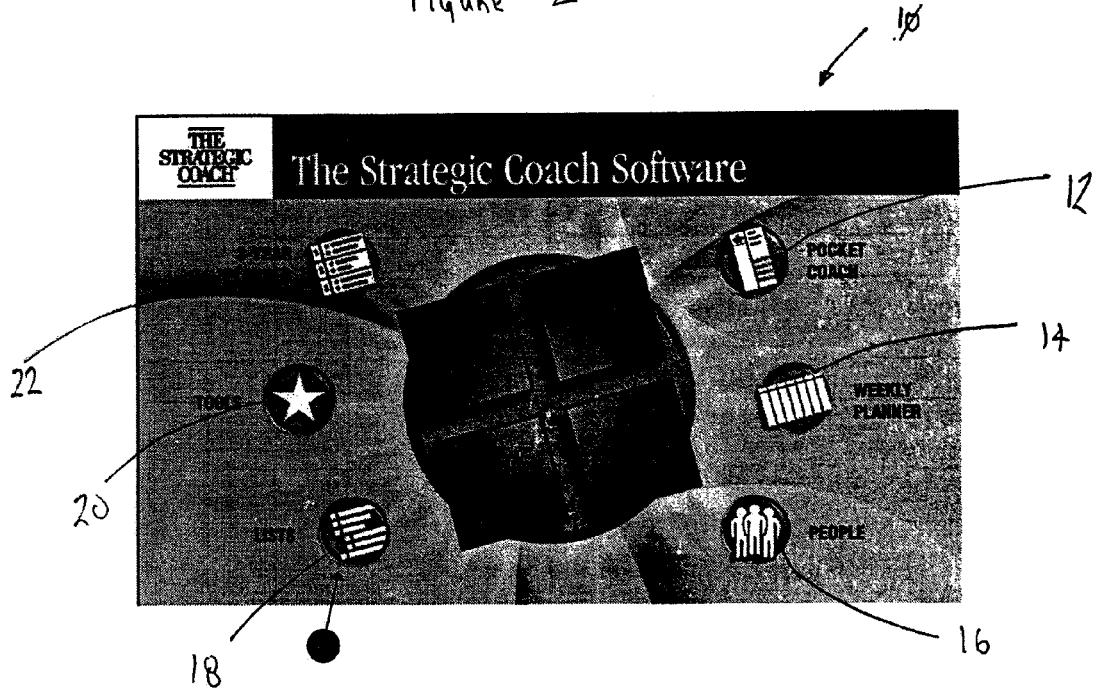
FIG. 2 is a screen capture of the main screen of the present invention.

Referring to FIG. 2, a screen capture of the main screen is shown generally as 10. The initial screen 10 displays user selectable icons for the six main components of the present invention, namely: Pocket Coach 12, weekly planner 14, people 16, lists 18, tools 20 and 3-year planner 22.

Figure 3:
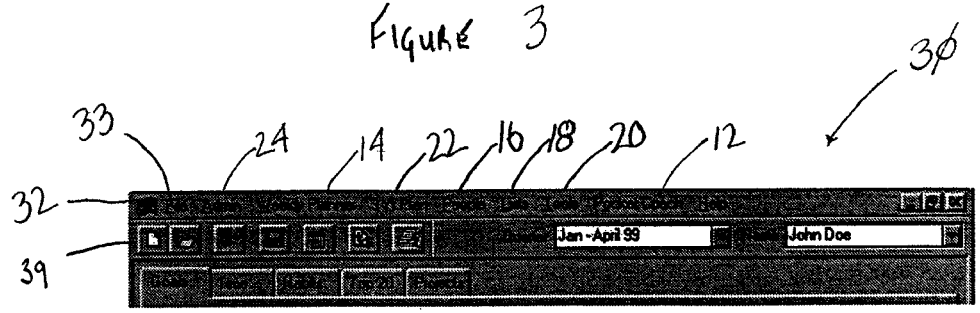
FIG. 3 is a screen capture of a command bar.

Before describing the details of each particular component, we will describe some features that are common throughout the present invention. Referring now to FIG. 3 a screen capture of a command bar is shown generally as 30. Each screen of the present invention has a command bar 30 located at the top of the screen. The options shown generally as 32 available on the command bar will vary by screen, but the most common are the ones shown in FIG. 3, namely: file 33, administration 24, weekly planner 14, three year planner 22, people 16, lists 18, tools 20, Pocket Coach 12 and help 34. Selecting any of these options will display a drop down menu with features specific to the option selected.

Figure 4:
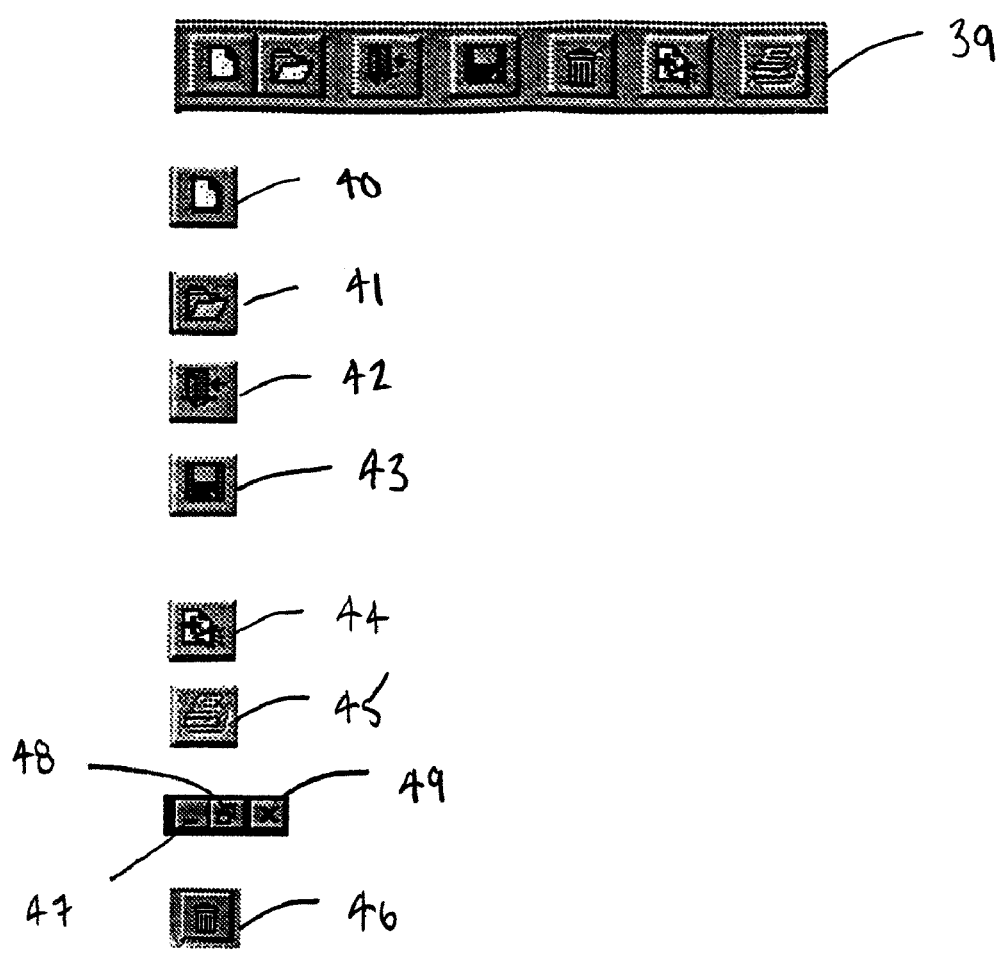
FIG. 4 is a screen capture of a toolbar and associated icons.

Below the command bar 30 is toolbar 39. Toolbar 39 contains icons that may change based upon the screen being displayed, but the most common icons are shown in FIG. 4. Referring now to FIG. 4, the icons shown provide the following functionality:

a) new file icon 40 creates a new file;
b) open icon 41 opens a new file or version;
c) exit icon 42 exits the application;
d) save icon 43 allows the user to save their work without waiting until all data has been entered;
e) privileges icon 44 allows the user to apply access privileges to other users for a specific screen (see FIG. 47);
f) print icon 45 prints a report or form;
g) delete icon 46 deletes the selected text;
h) minimize icon 47 minimizes a screen;
i) maximize icon 48 maximizes a screen; and
j) close icon 49 closes a screen.

Certain screens within the system display a specific version of the data stored. For example, there may be multiple versions of the Pocket Coach, one for each quarter. For these screens the user must either create a new version or select an existing version. To create a new version the user clicks on the file option 33 of the command bar 30, and then selects "new". A pop up window (not shown) will be displayed which will allow the user to select the type of file to be created, e.g. Pocket Coach, and permit the user to enter a name for the new version. Within the same pop up window will be listed all of the existing versions for the type of file. The user may decide to select an existing version from this list rather than creating a new version.

At the bottom of many screens are located buttons that activate commands. Active buttons will allow commands to be executed. These buttons have dark text. Inactive buttons do not allow commands to be activated. These buttons are grey or shadowed and cannot be accessed. The common buttons to activate commands are:

a) Add
This adds a new record by allowing the user to enter new data;
b) Cancel
This ignores any changes made to the current record or screen;
c) Close
This saves the information displayed on the screen and closes the screen;
d) Delete
This deletes the record that is currently displayed or highlighted on the screen;
e) Find
This allows the user to search for specific records in the database; and
OK
This saves any changes and closes the current screen or is used to acknowledge a screen prompt of message.

Figure 5:
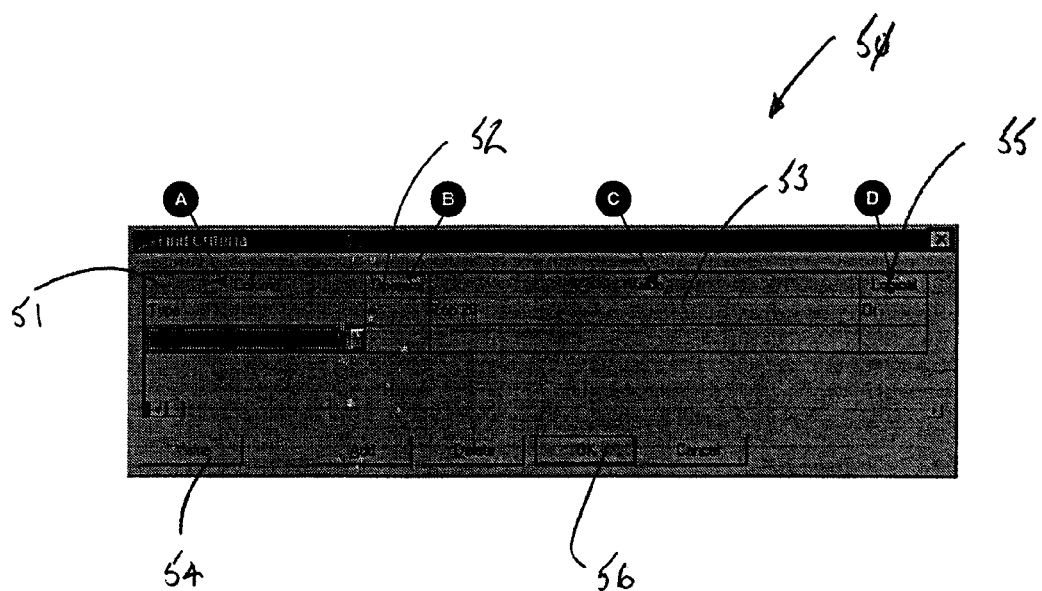
FIG. 5 is a screen capture of a find screen.

By selecting the find button the system will display the find screen of FIG. 5 shown generally as 50. The user may perform a search for records only on screens that have the find button active. Column field 51 displays a list of available search items for the screen the user is currently using. The user may then select an item from the list. Search operator field 52 provides the user with a list of logical operators from which they may select. The logical operators are:

a) None
This means that no operator is selected;
b) >=
Greater than or equal to. This will locate all records that have a value greater than or equal to the value entered in value field 53;
c) <=
Less than or equal to. This will locate all records that have a value less than or equal to the value entered in value field 53;

d) =

Equal to. This will locate all records that have a value equal to the value entered in value field 53;

e) >

Greater than. This will locate all records that have a value greater than the value entered in value field 53; and f) <

Less than. This will locate all records that have a value less than the value entered in value field 53.

Value field 53 may be a number, type or name; it must be exact. For example, if the user is searching for a type equal to "Top 20" the user must enter the name of the type exactly. Entering "Top-20" will result in no records being found. On some screens the system will provide the user with a choice of values. In these cases the value button 54 will be active. Clicking on the value button 54 will display a pop up window (not shown) from which the user may select a specific value. If desired the user may select an additional column, operator and value. This second selection may be logically combined with the first selection by setting the logical operator box 55. Pressing the OK button 56 results in initiation of the search. Once the search is complete, the find button will be replaced by a reset button (not shown). By pressing the reset button all of the records located will be displayed to the user.

Figure 6:
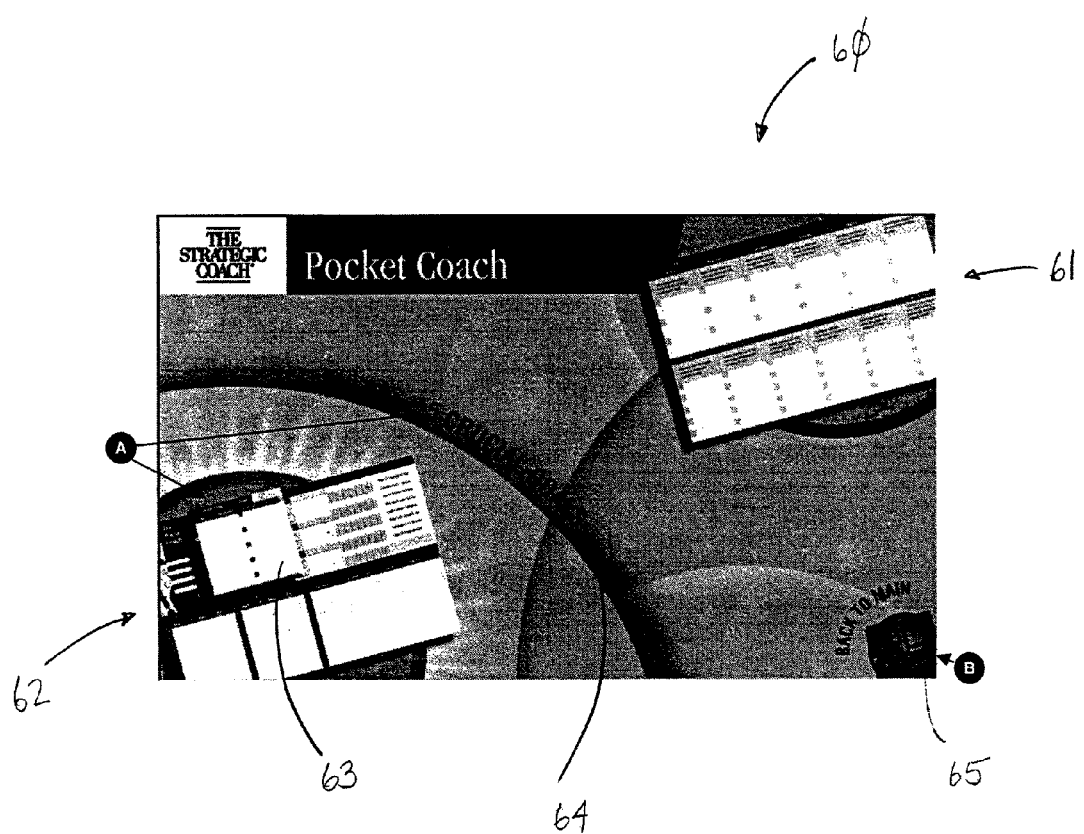
FIG. 6 is a screen capture of the Pocket Coach component of FIG. 1.

Referring to FIG. 6, a screen capture of the Pocket Coach component 12 of FIG. 1 is shown generally as 60. The Pocket Coach screen 60 displays images (shown generally as 61 and 62) of pages within a representation of a physical version of the Pocket Coach. As the user moves the cursor across each image (61, 62), a portion of the image (61, 62) will pop forward and its name will be displayed in the central area of the screen.

The five crucial goals screen 63 of image 62 is under the cursor and has been popped forward. In conjunction with the popping forward of a portion of the Pocket Coach image 62, the name of the portion is displayed in the central area of the screen 64. By clicking on the popped forward portion, the application will then display more detail on that portion of the Pocket Coach. The Pocket Coach screen 60 contains a return to main screen icon 65 that when selected by the user will return the user to main program screen 10.

Figure 7:
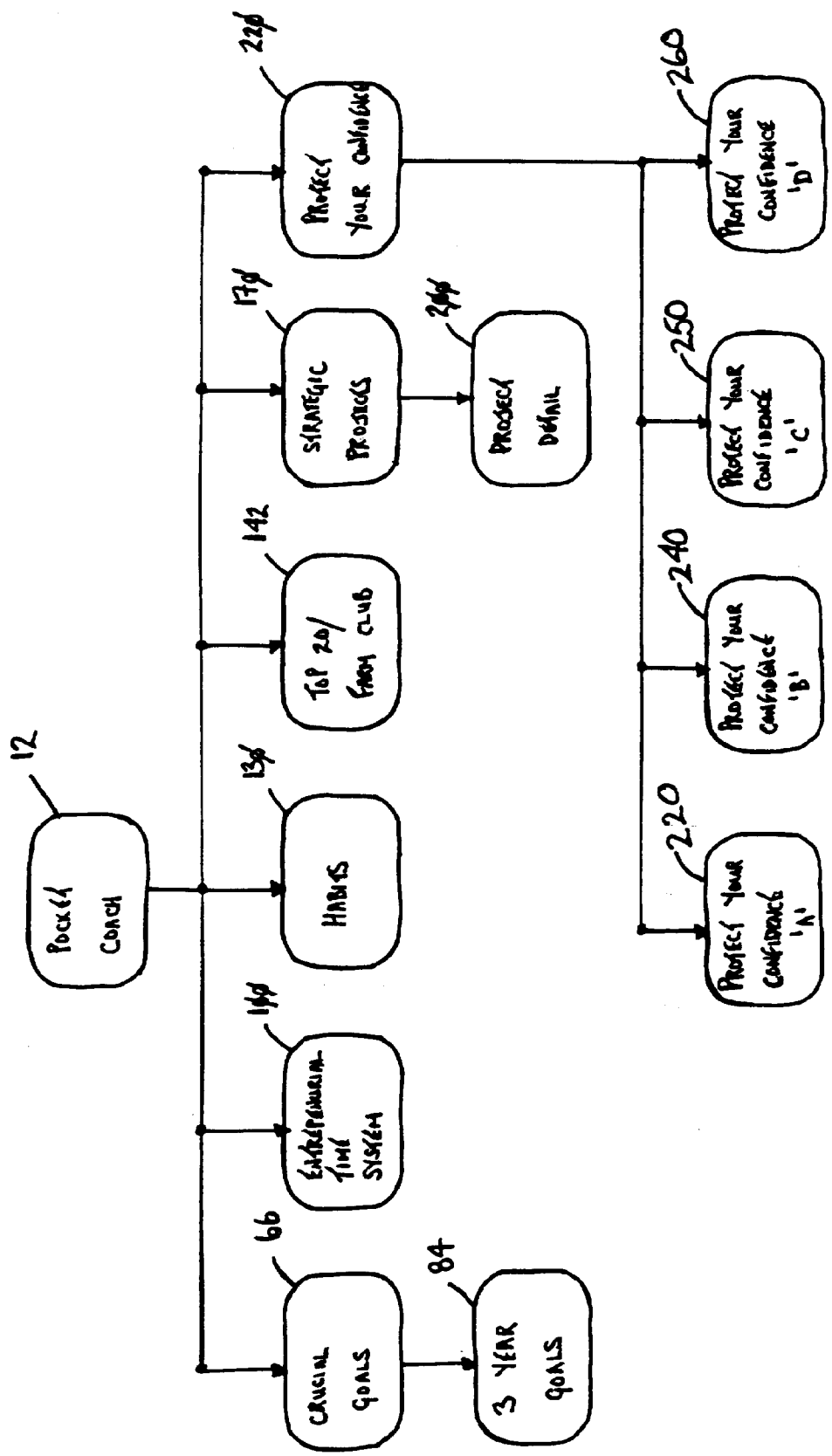
FIG. 7 is a block diagram illustrating the sub-components of the Pocket Coach.

FIG. 7 is a block diagram illustrating the sub-components of the Pocket Coach 12. Detailed discussions of each component follows.

Figure 8:
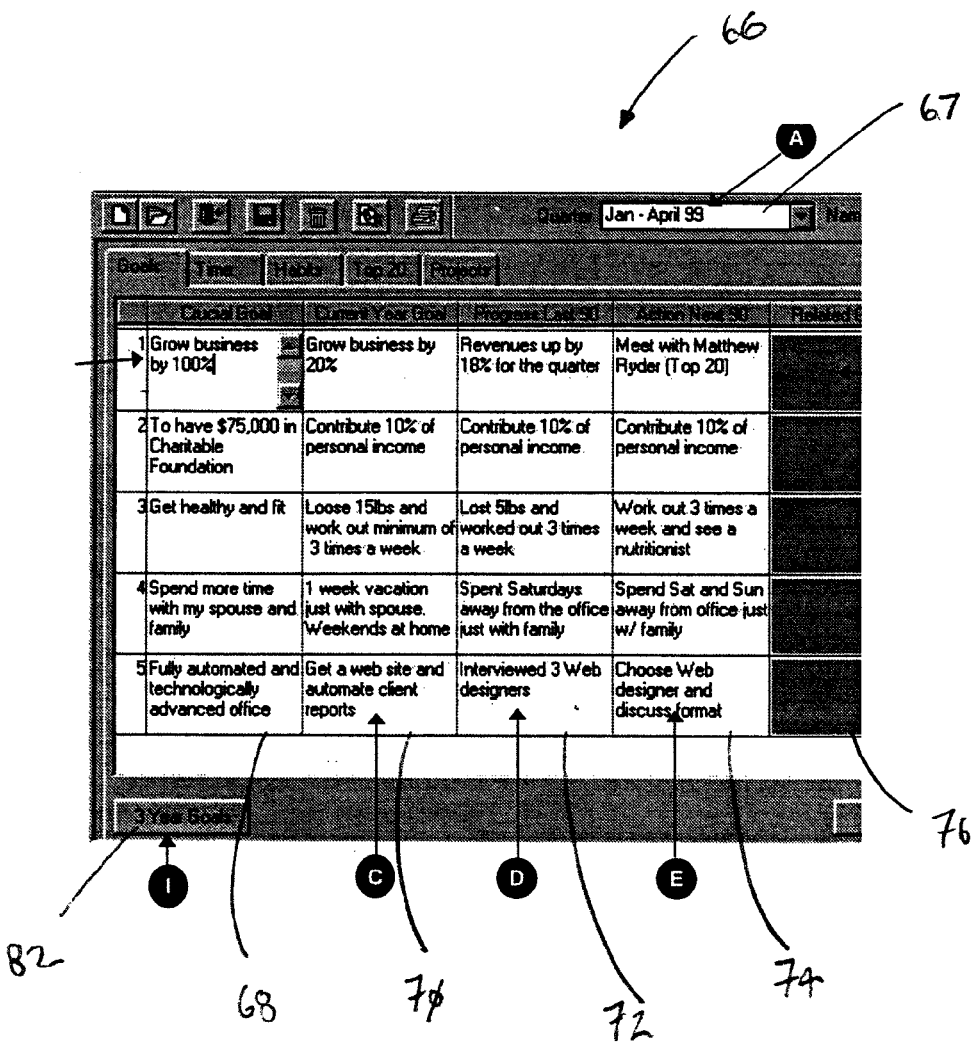
FIG. 8 is a screen capture of the 5 crucial goals sub-component of the Pocket Coach.
Figure 9:
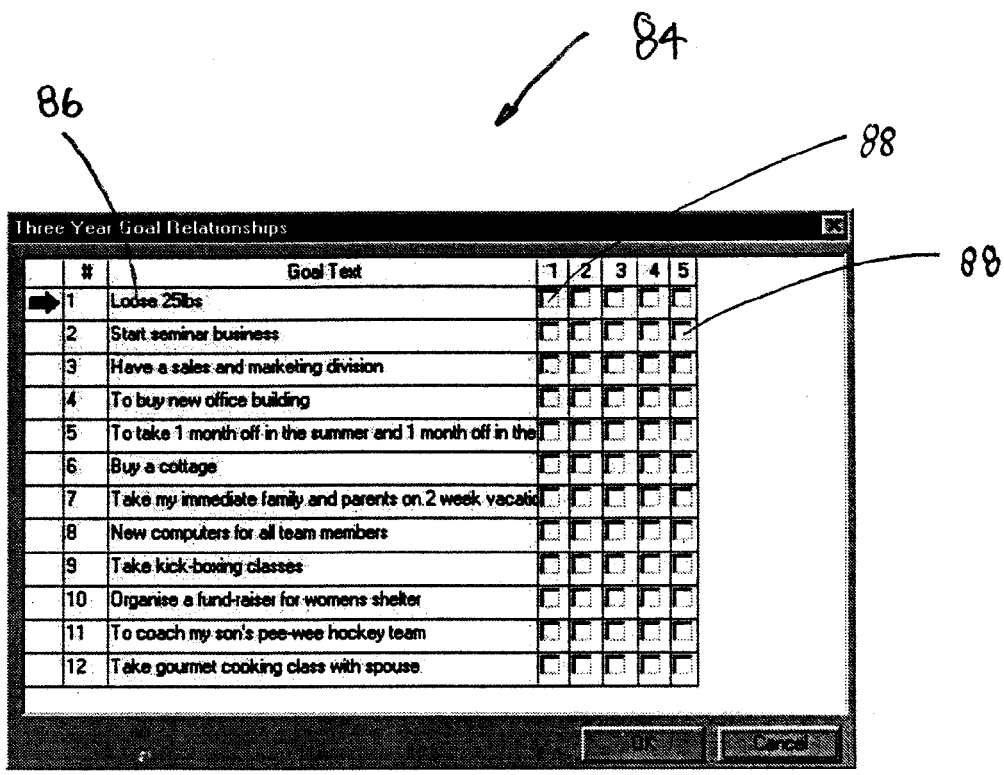
FIG. 9 is a screen capture of the three year goal relationships sub-component of the Pocket Coach.

Referring now to FIG. 8, a screen capture of the five crucial goals sub-component of the Pocket Coach 12 is shown generally as 66. The user first selects the quarter of the year they wish to work with from the quarterly box 67. Five crucial goals 68 are displayed in numeric order and may be edited or created within the five crucial goals screen 66 as desired by the user. Corresponding to each crucial goal are columns for: current goals 70, progress last ninety days 72, action needed next ninety days 74, related goals 76, a confidential indicator 78 (not shown), and a status field 80 (not shown). The fields in each of these columns may be edited by the user except for related goals 76. The data for related goals 76 comes from clicking 3-year goals button 82. Clicking button 82 displays three year goal relationships screen (FIG. 9). The status field 80 is common to many other screens of the present invention and comprises four values: in progress (I), completed (C), forward (F) and drop (D).

Referring now to FIG. 9, a screen capture of the three year goal relationships sub-component of the Pocket Coach 12 is shown generally as 84. The user may select one of goals 86 to be a displayed as a related goal 76 (FIG. 8), by selecting the appropriate crucial goal number from the tick boxes 88 numbered 1 to 5.

Figure 10:
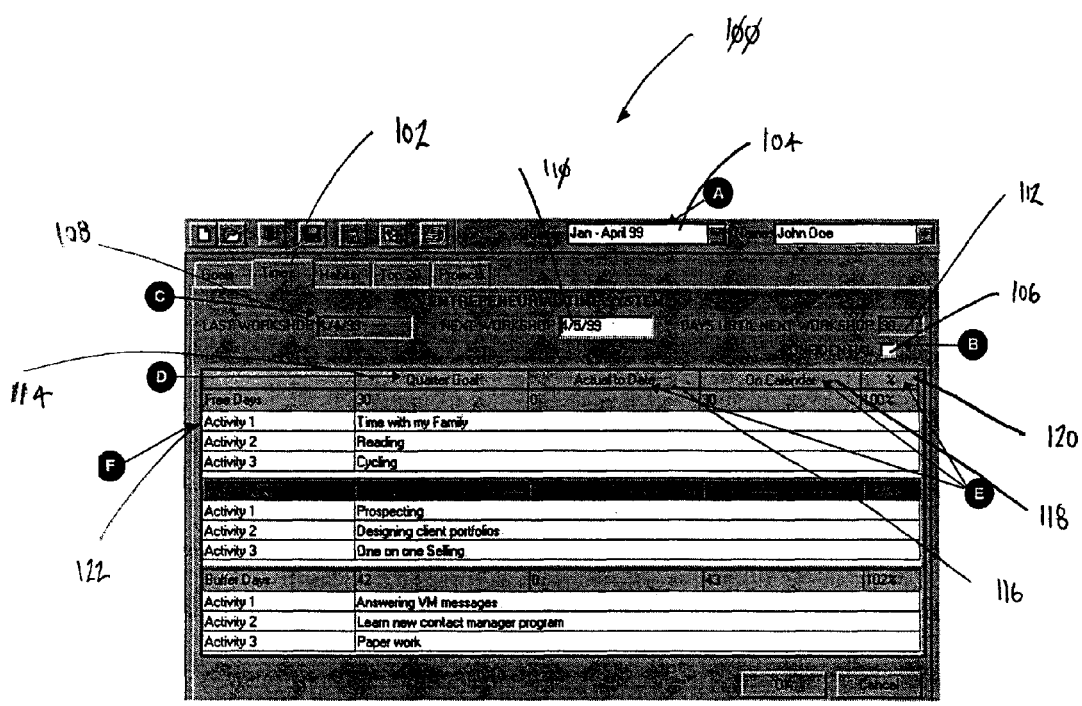
FIG. 10 is a screen capture of the entrepreneurial time system sub-component of the Pocket Coach.
Figure 21:
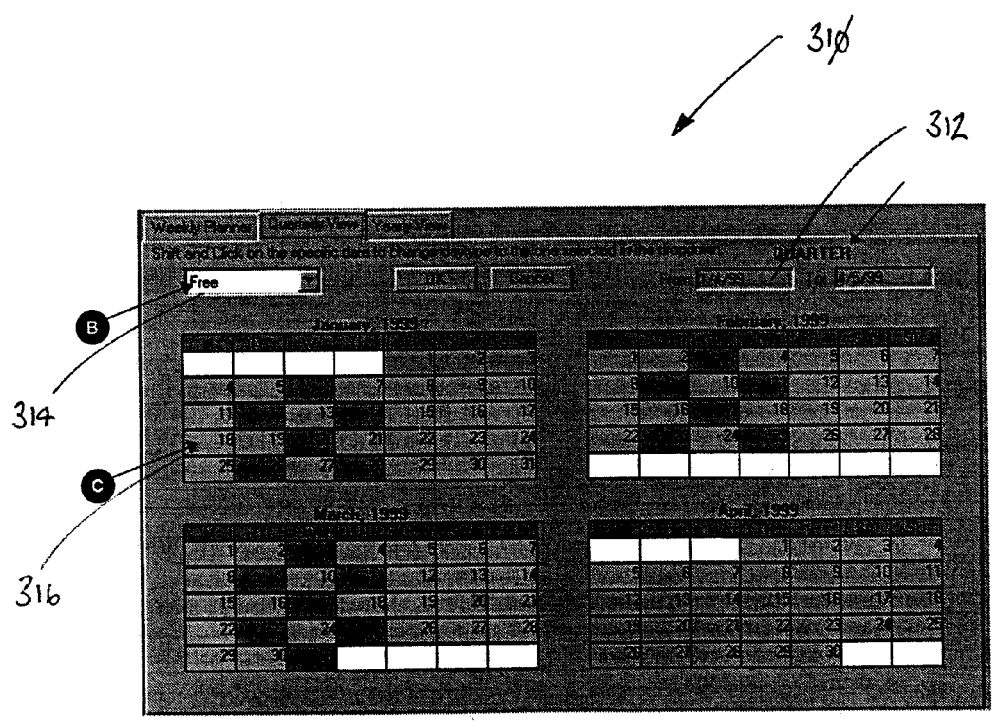
FIG. 21 is a screen capture of the quarterly view sub-component of the weekly planner component.

Referring now to FIG. 10, a screen capture of the entrepreneurial time system sub-component of the Pocket Coach 12 is shown generally as 100. Time tab 102 has been brought to the forefront indicating that this screen relates to the entrepreneurial time system. Box 104 permits the user to select the quarter of the year for which the data in this screen will apply. If the user wishes other users of the system not to be able to see the data on this screen, they may check confidential box 106. The last workshop 108, next workshop 110 and days until next workshop 112 fields are protected. The last workshop 108 and next workshop 110 fields reflect the dates entered when this screen was first created. Quarter goal column 114 is divided into bands of three types of days: free days, focus days and buffer days. When creating a new quarter of the year, the user enters the number of each type of days they wish to have for the quarter and the system calculates how close they are to that goal. Thus, actual to date field 116 displays the number of days of each day type that have actually passed. This is done by checking the weekly planner portion of the system (FIG. 21). On calendar field 118 displays the number of days of each day type that have been scheduled on the calendar (FIG. 21), this number is used to calculate percentage complete as shown in field 120. Fields 116, 118 and 120 may not be edited by the user. Each day type has a corresponding series of activity bars 122 into which the user may enter activities for each type of day.

Figure 11:
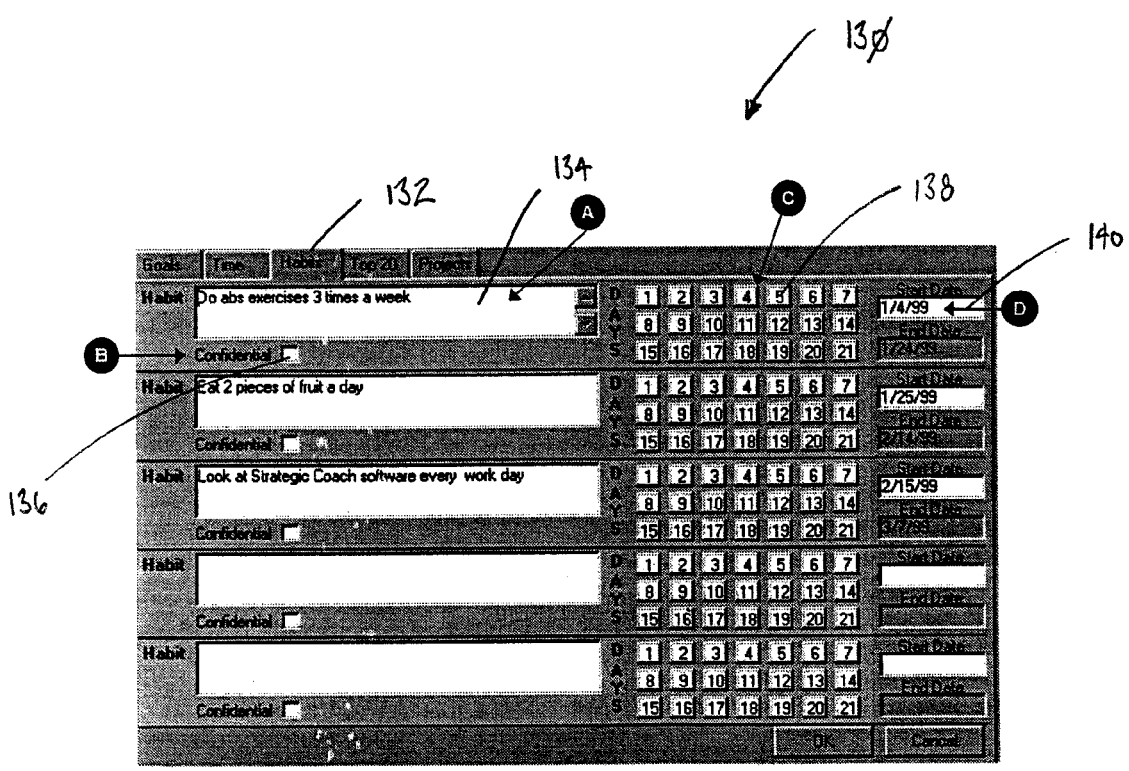
FIG. 11 is a screen capture of the habits sub-component of the Pocket Coach.

Referring now to FIG. 11, a screen capture of the habits sub-component of the Pocket Coach 12 is shown generally as 130. Habits tab 132 has been brought to the forefront indicating that screen 130 displays the habits portion of the system. Habit description field 134 permits the user to enter a description of the activity they wish to make a habit. As with other screens within the system, the user may click confidential field 136 if they wish their habit not to be seen by other users of the system. Each habit description 134 has a corresponding matrix of twenty one days 138. Each time a user completes the habit, they click on a number in the matrix 138 (in order). The number will turn red when clicked. After 21 days are red, the inventors believe the habit should be established. A start date field 140 is provided for the user to enter the date on which they wish to begin the habit. The end date is automatically generated to be 21 days after the start date. Note that the start and end dates for individual habits may not overlap.

Figure 12:
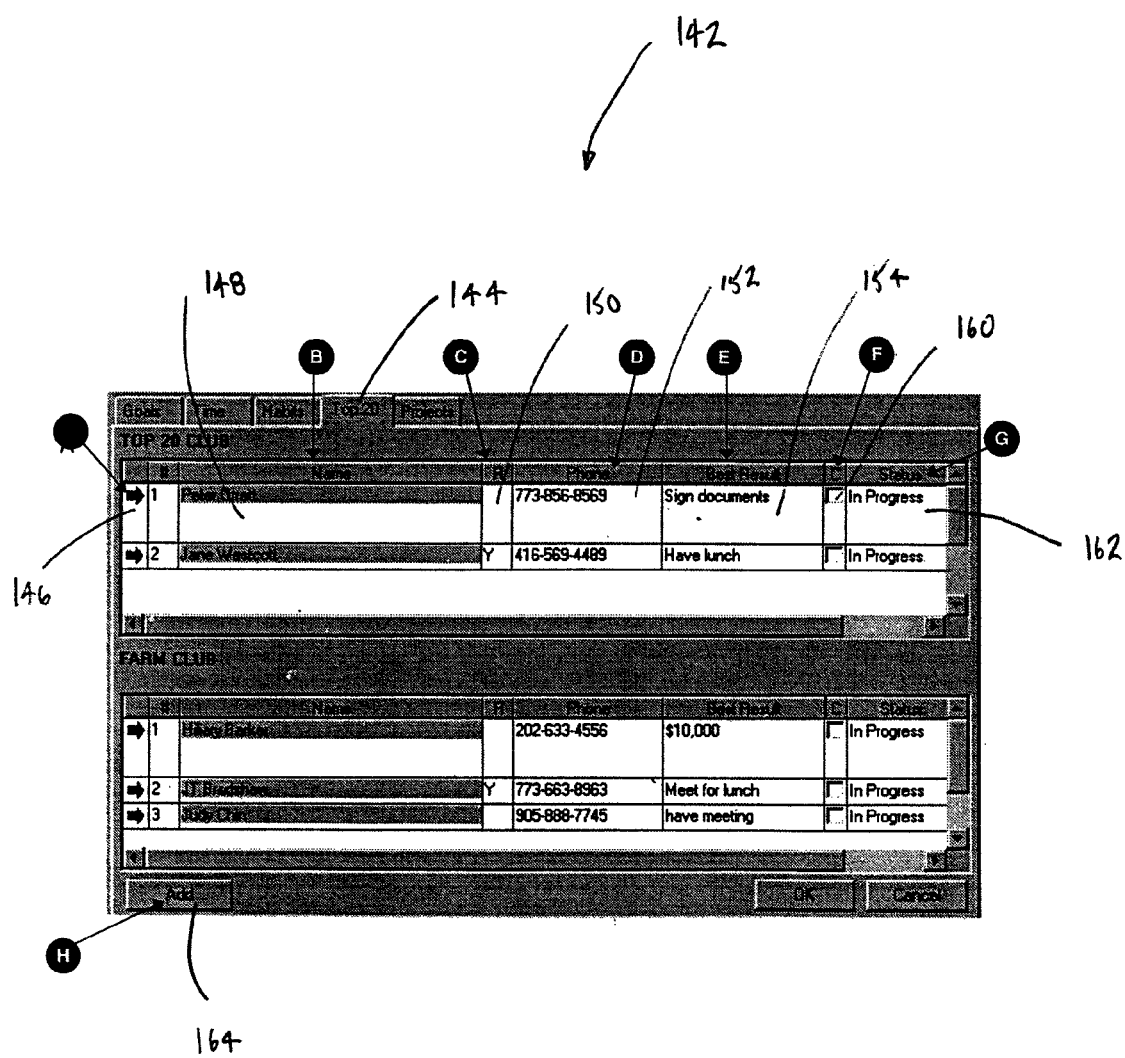
FIG. 12 is a screen capture of the Top 20/Farm Club sub-component of the Pocket Coach.
Figure 24:
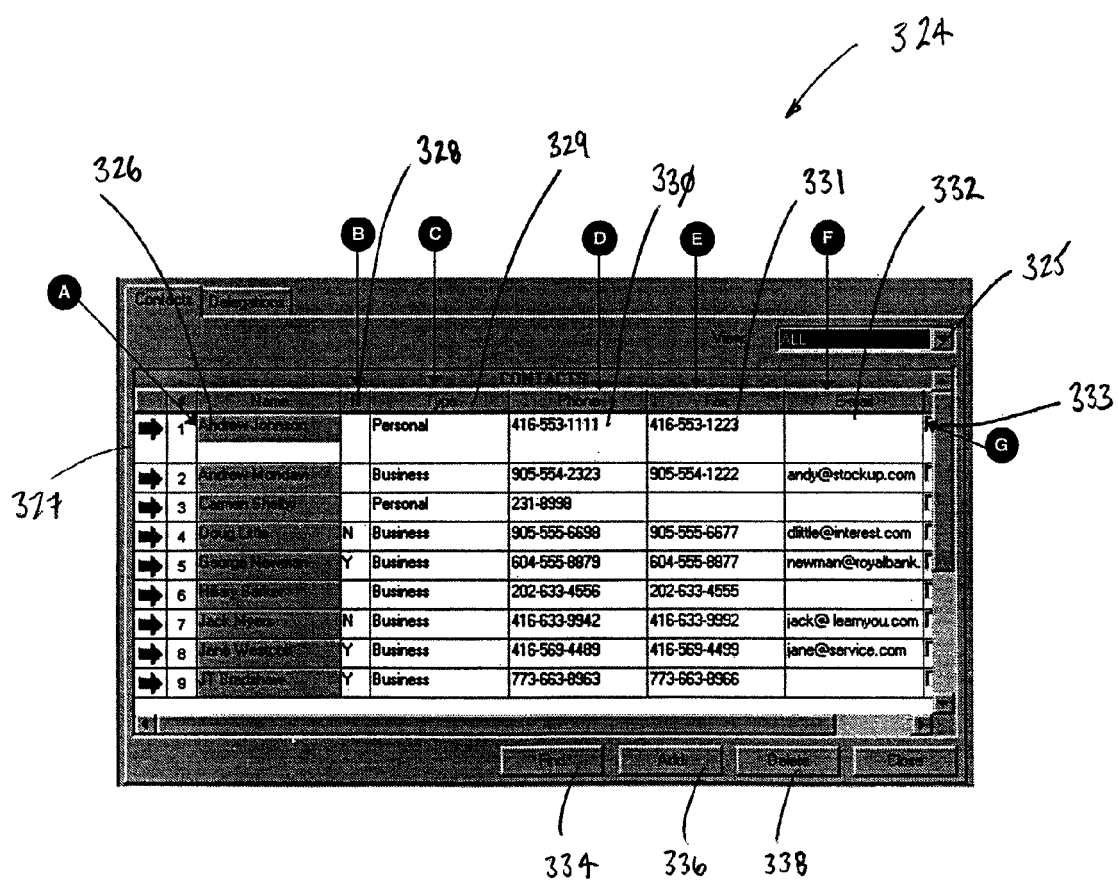
FIG. 24 is a screen capture of the contacts sub-component of the people component.

Referring now to FIG. 12, a screen capture of the Top 20/Farm Club sub-component of the Pocket Coach 12 is shown generally as 142. Top 20 tab 144 has been brought to the forefront indicating that this screen relates to the Top 20 portion of the Pocket Coach. By way of example the following description will refer to contacts in the Top 20 Club but applies equally to records in the Farm Club. Record selector field 146 displays an arrow that may be clicked upon by the user to display a contacts window (not shown). The contacts information is entered by the user via contacts screen 324 (FIG. 24). The contacts displayed on screen 142 may be edited, but to ensure consistency in the contact names, name field 148 of the screen 142 may not be edited. R-Factor field 150 is an editable field and will contain a "Y" if the user has asked the contact the R-Factor question. The R-Factor question is a relationship question. The purpose of the R-Factor question is to strengthen relationships by helping parties understand what would be required to aid each other in meeting their future goals. Phone number field 152 may be edited by the user. Best results this quarter field 154 may be edited by the user and is meant to indicate the best results to be expected from the contact within the next 90 days. Confidential field 160 may be checked to prevent other users from viewing the entry. Status field 162 is selected from a drop down menu comprising values for: in progress (I), completed (C), forward (F) and drop (D). Add button 164 allows the user to add a new contact to either the Top 20 club or the Farm Club. When selected the add button 164 pops up a contacts window (not shown) which displays a list of contacts. Any contact in the list may be dragged to the Top 20 or Farm Club portions of screen 142.

Figure 13:
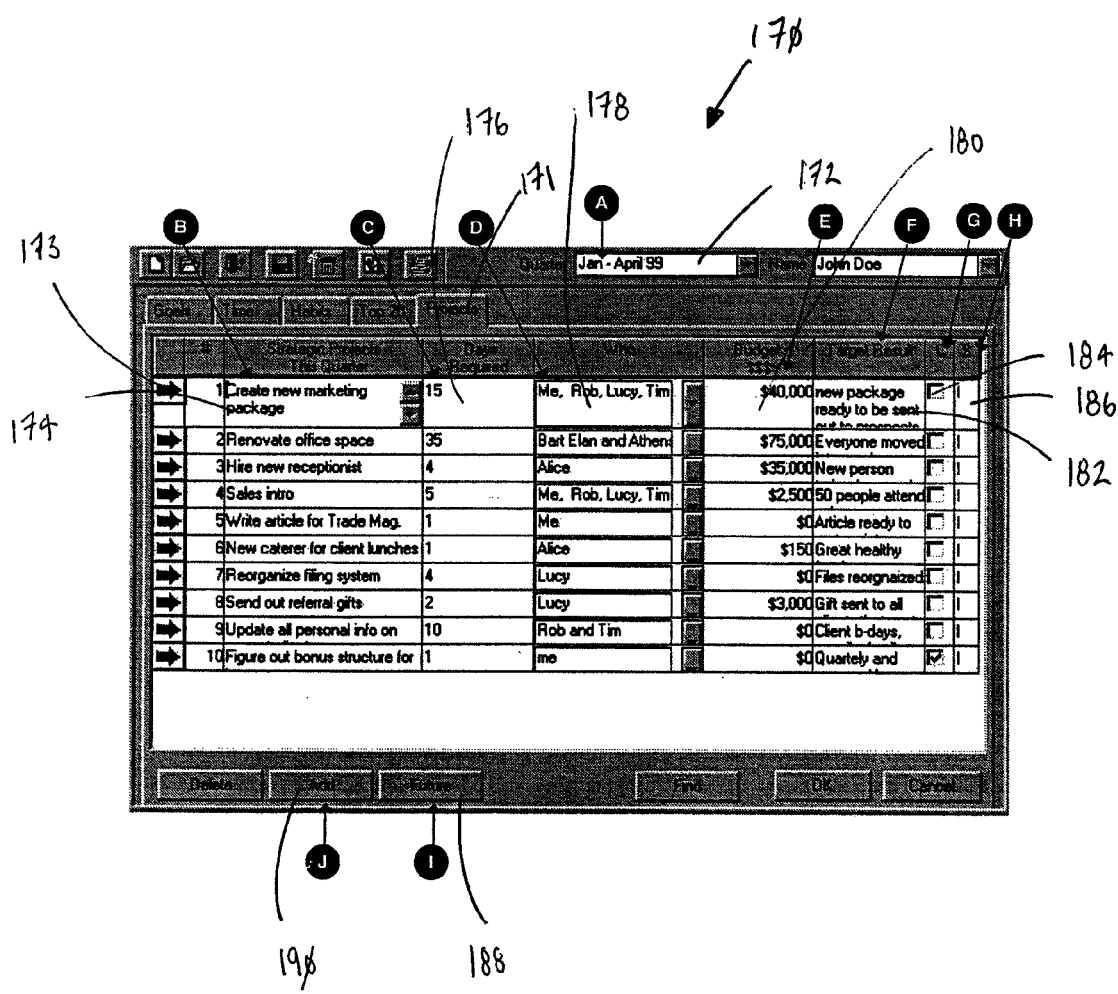
FIG. 13 is a screen capture of the strategic projects sub-component of the Pocket Coach.
Figure 14:
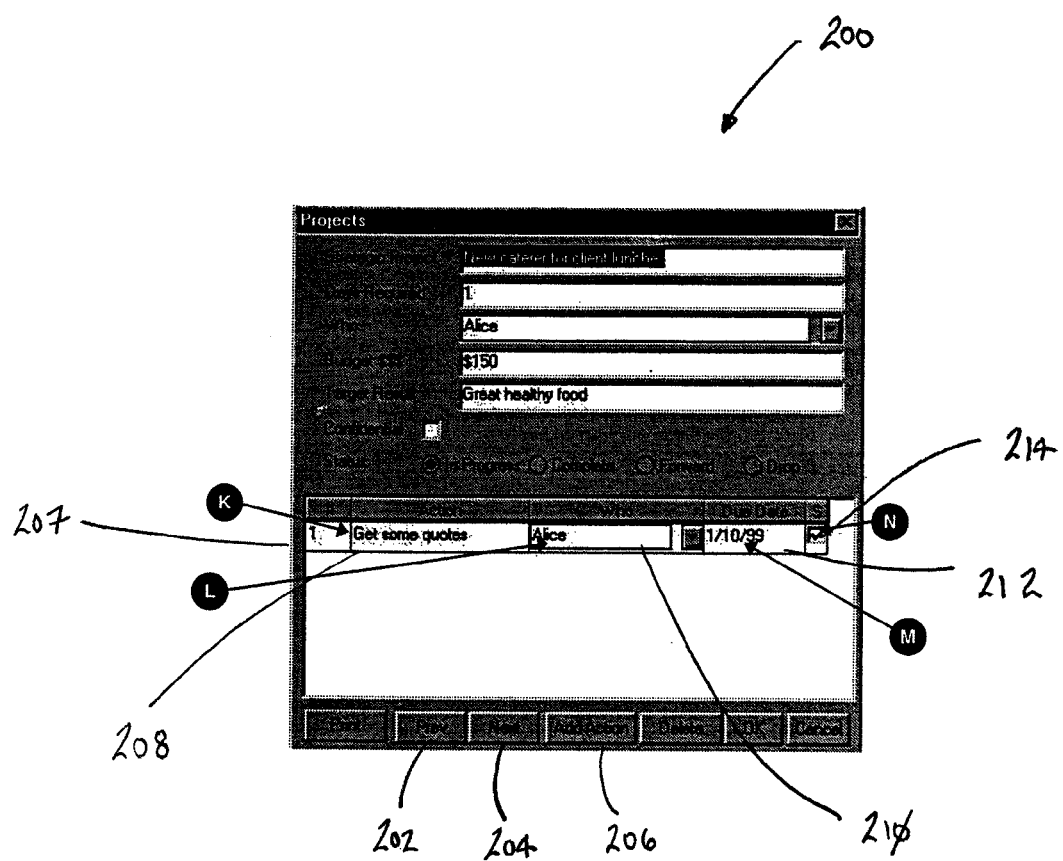
FIG. 14 is a screen capture of a detailed project sub-component of the Pocket Coach.

Referring now to FIG. 13, a screen capture of the strategic projects sub-component of the Pocket Coach 12 is shown generally as 170. Projects tab 171 has been brought to the forefront indicating that this screen relates to the strategic projects portion of the Pocket Coach. Quarter selection box 172 indicates the quarter for which the strategic projects are being displayed. Selecting arrow 173 for a strategic project 174 results in the display of a detailed project screen 200 (FIG. 14). Details of a specific project may be edited within the project screen 200. The user may enter up to ten strategic projects 174. If the user has more than ten strategic projects 174, they may press the future button 188 to add projects to the list as current projects are completed. Days required field 176 is the number of days (a whole number) that the user believes it will take to complete the project. Who field 178 is list of the individuals working on a given strategic project. A drop down list may be selected here, which will provide a list of individuals. This list is the administration who list (FIG. 48) and will be discussed later. Budget 180 indicates the whole number in dollars that the strategic project is expected to cost. Target result 182 is the desired result of the successful completion of the project. If the user wishes to keep this information confidential from other users, they may check confidential box 184. Also as throughout the system, status field 186 is selected from a drop down menu comprising values for: in progress (I), completed (C), forward (F) and drop (D).

The selection of future button 188 results in the display of a pop up window (not shown), which displays the names of all future projects that have yet to be planned or managed. Projects may be added to this window and may also be dragged from this window to the strategic projects screen 170 provided there are no more than ten strategic projects 174 in the strategic projects screen 170.

Figure 48:
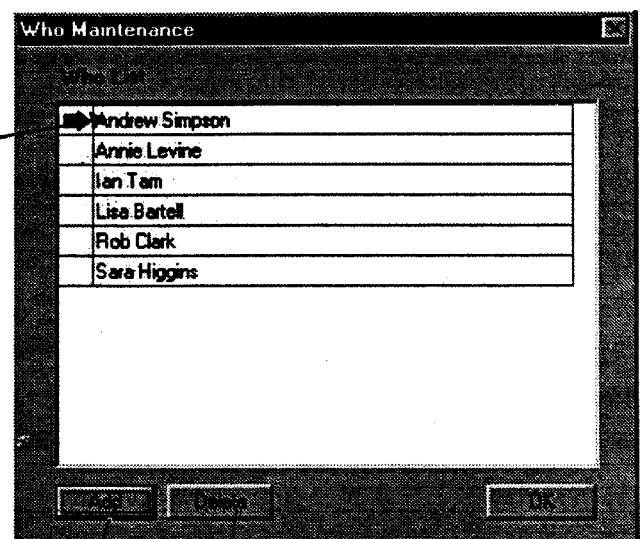
FIG. 48 is a screen capture of the who list maintenance screen of the administration function.

Referring now to FIG. 14, a screen capture of a detailed project sub-component of the Pocket Coach 12 is shown generally as 200. When viewing the strategic projects screen 170 (FIG. 13), the user may select an arrow 173 for a specific project or click on the add button 190. Either action results in the display of the detailed project screen 200. FIG. 14 shows an existing project that the user has selected to edit. Previous button 202 displays the previous project in the list of projects displayed in FIG. 13. Next button 204 displays the next project. Add action button 206 creates an action 207 into which the user may enter: an action description 208, a list of individuals working or responsible for the action 210, and a due date 212. The list of individuals responsible 210, is selected from the who list created using the who list management screen 690 (FIG. 48). If the action 207 has been completed, then status box 214 may be checked.

Figure 15:
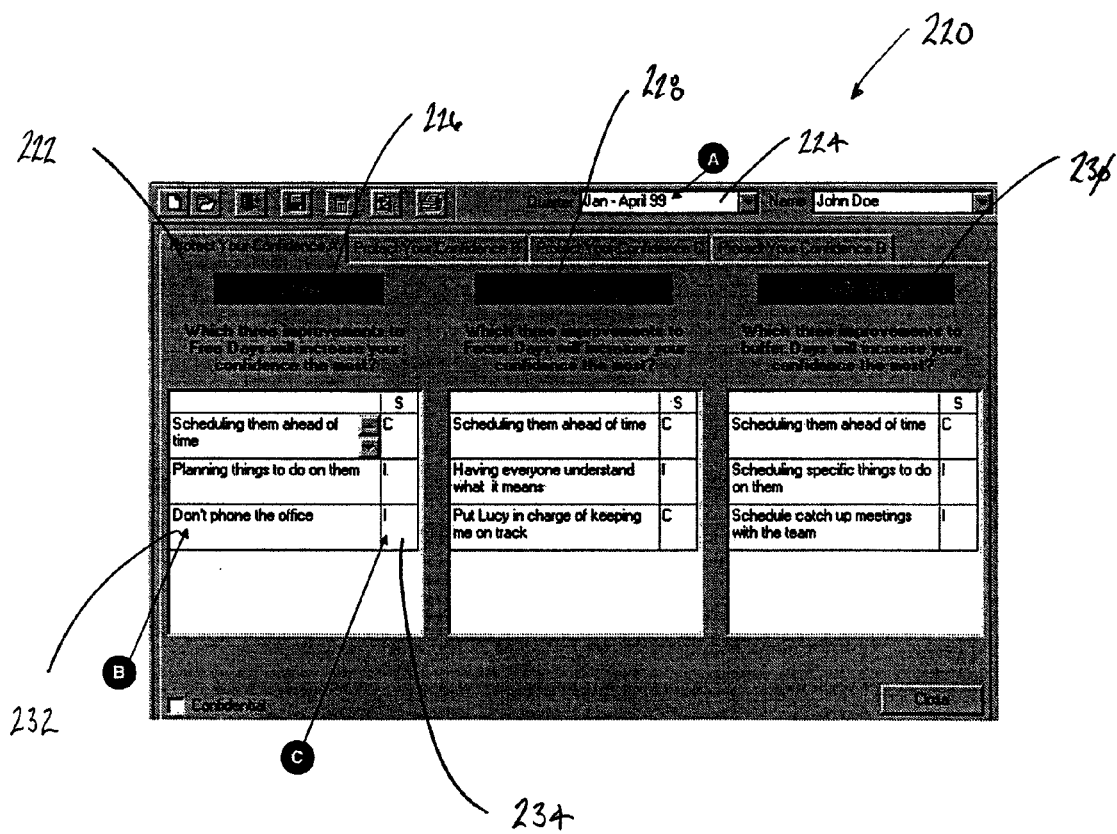
FIG. 15 is a screen capture of the Protect Your Confidence 'A' sub-component of the Pocket Coach.

Referring now to FIG. 15, a screen capture of Protect Your Confidence sub-component A of the Pocket Coach 12 is shown generally as 220. Protect Your Confidence A tab 222 has been brought to the forefront indicating the contents of this screen. As with other screens in the present invention, quarter field 224 indicates the quarter of the year being viewed within the screen 220. Screen 220 has three columns: 226, 228, and 230 with corresponding column numbers one to three. Above each column is a clear statement as to which improvements in the quarter, within the subject of the column will increase the confidence of the user the most. The three columns of screen A have as their subject: free days, focus days and buffer days. Using the first column 226 of free days as an example, an improvement field 232 is entered by the user, with a corresponding status field 234. As throughout the system, status field 234 is selected from a drop down menu comprising values for: in progress (I), completed (C), forward (F) and drop (D).

Figure 16:
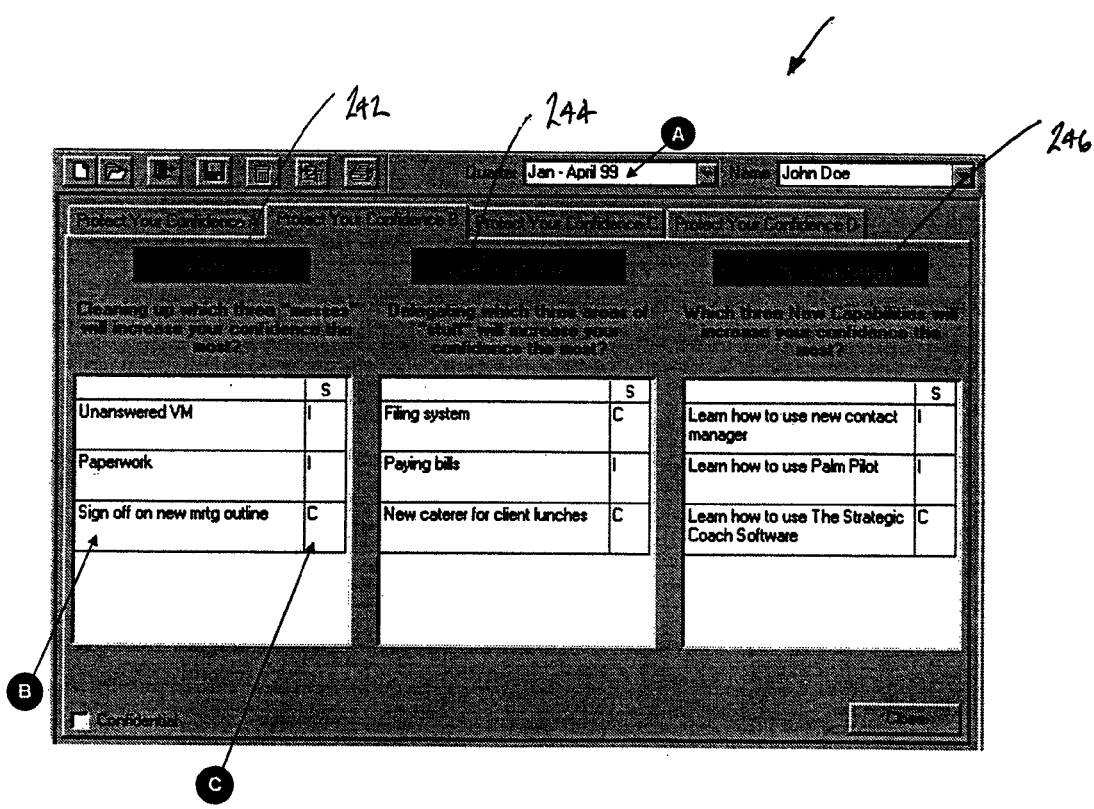
FIG. 16 is a screen capture of the Protect Your Confidence 'B' sub-component of the Pocket Coach.
Figure 17:
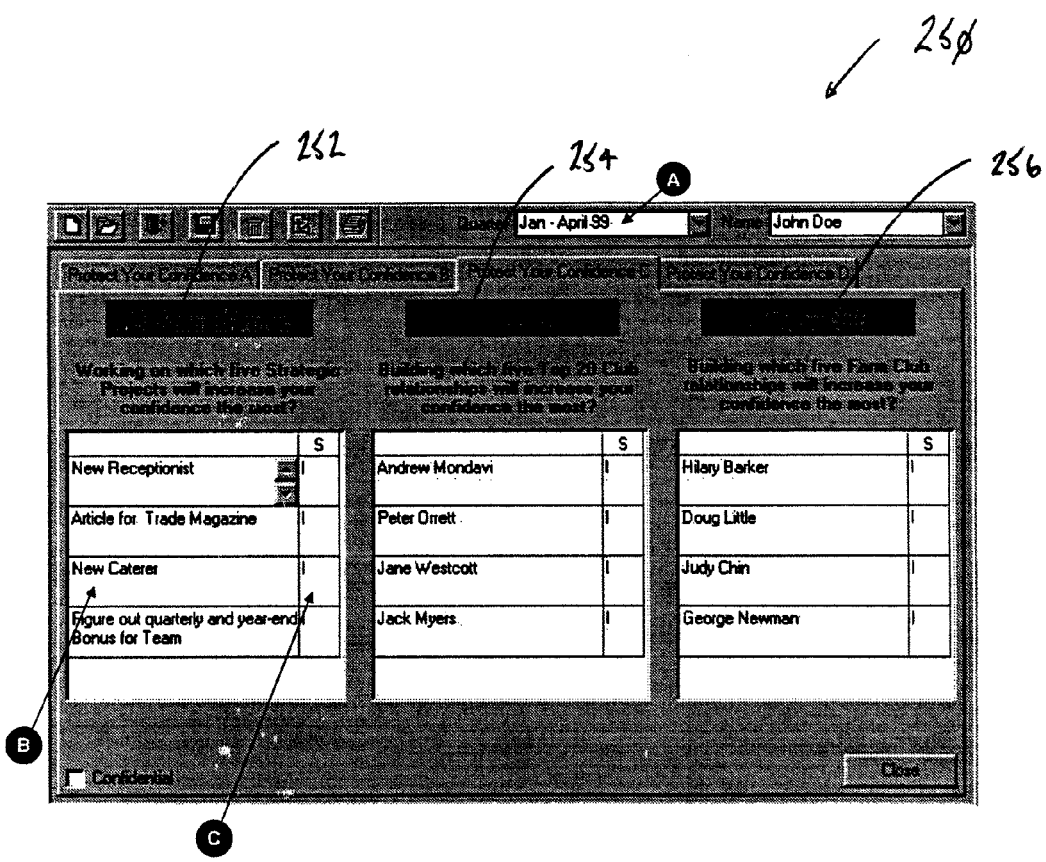
FIG. 17 is a screen capture of the Protect Your Confidence 'C' sub-component of the Pocket Coach.
Figure 18:
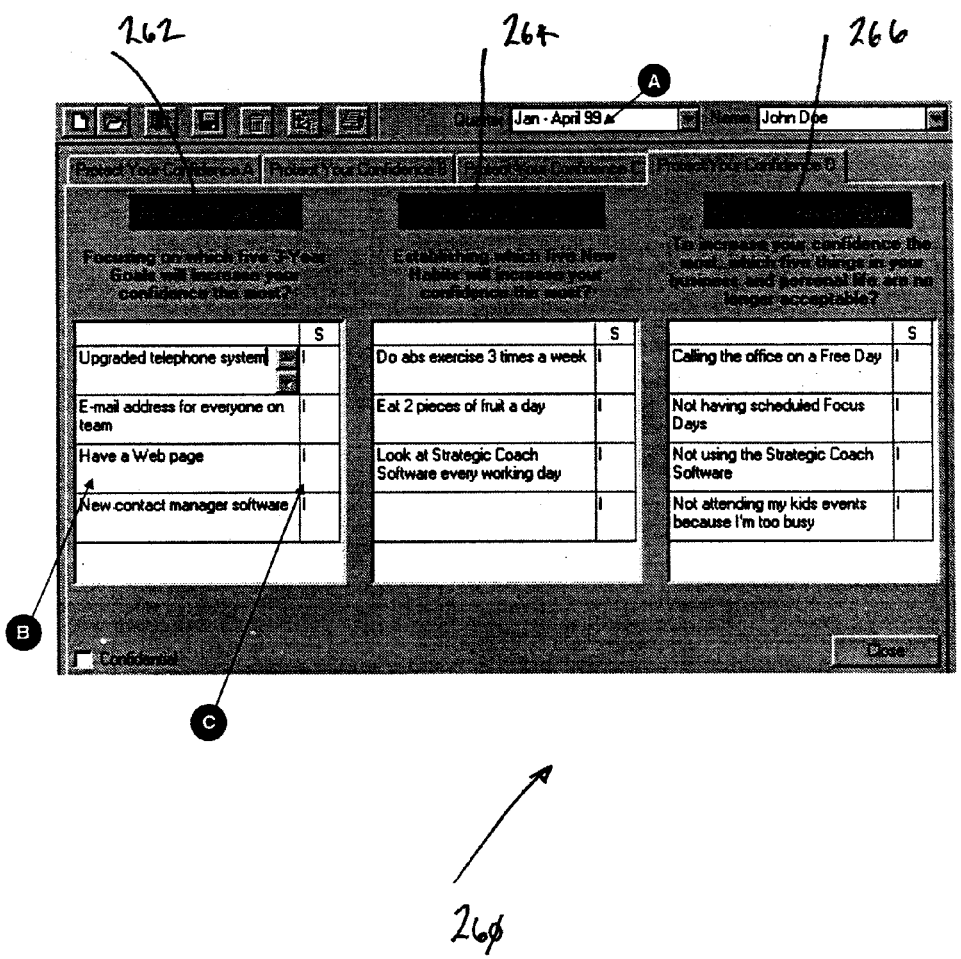
FIG. 18 is a screen capture of the Protect Your Confidence 'D' sub-component of the Pocket Coach.

FIGS. 16 through 18 follow the format of FIG. 15 as described above. FIG. 16 is a screen capture of Protect Your Confidence sub-component B, shown generally as 240, and has three columns 242, 244 and 246 having as their respective subjects: cleanups, delegations, and new capabilities. FIG. 17 is a screen capture of Protect Your Confidence sub-component C, shown generally as 250, and has three columns 252, 254, and 256 having as their respective subjects: strategic projects, Top 20 and Farm Club. FIG. 18 is a screen capture of Protect Your Confidence sub-component D, shown generally as 260, and has three columns 262, 264 and 266 having as their respective subjects: 3-Year goals, new habits and non-acceptables.

The functionality of the Pocket Coach component 12 of the present invention includes the ability to print hardcopy portions of the Pocket Coach, in its entirety, or by section. Other print options include which quarter to print and whether a date and time stamp is required. The print option may be selected by a print button at the bottom of a screen display or by selecting print icon 45 of toolbar 39 (FIG. 4).

Figure 19:
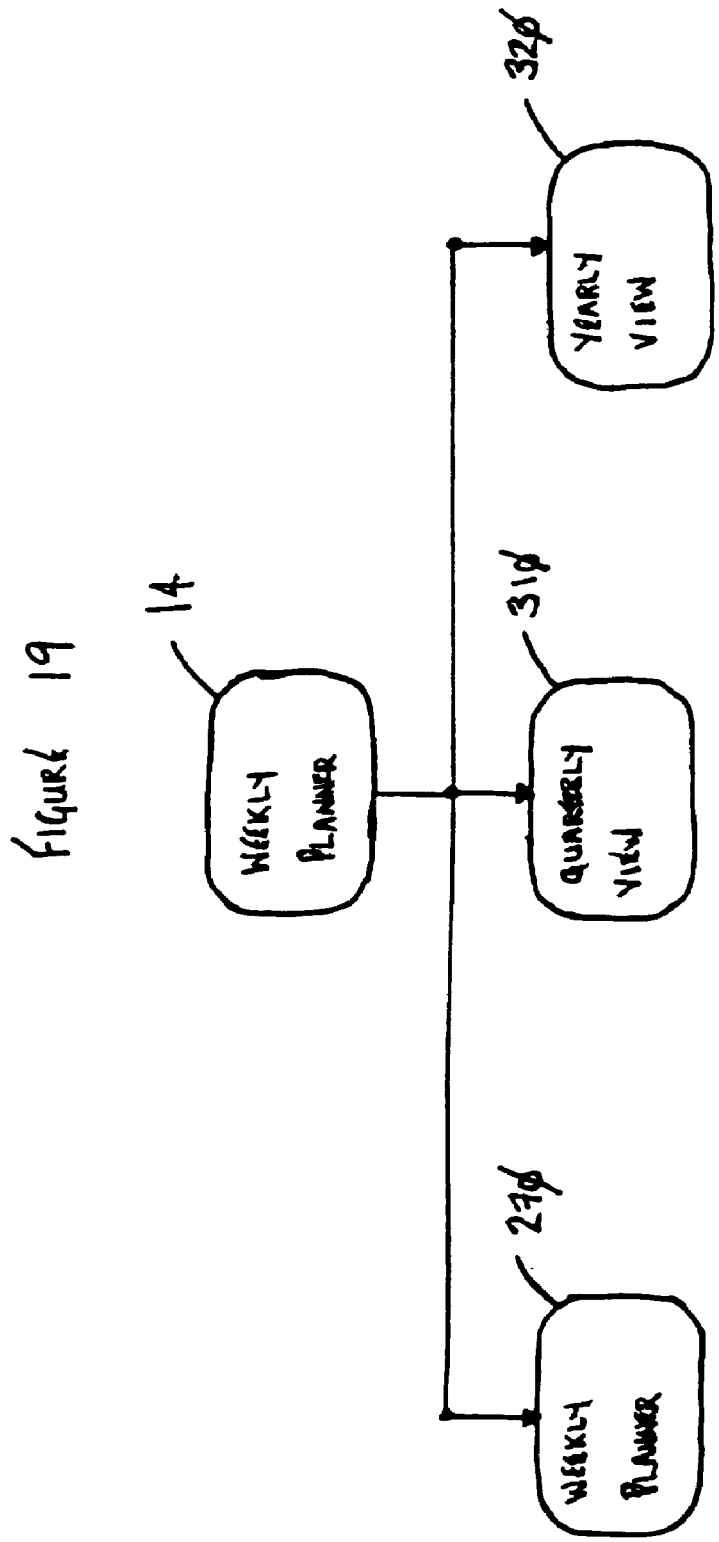
FIG. 19 is a block diagram illustrating the sub-components of the weekly planner component of FIG. 1.

FIG. 19 is a block diagram illustrating the sub-components of weekly planner component 14 of FIG. 1, comprising: weekly planner 270, quarterly view 310 and yearly view 320.

Figure 20:
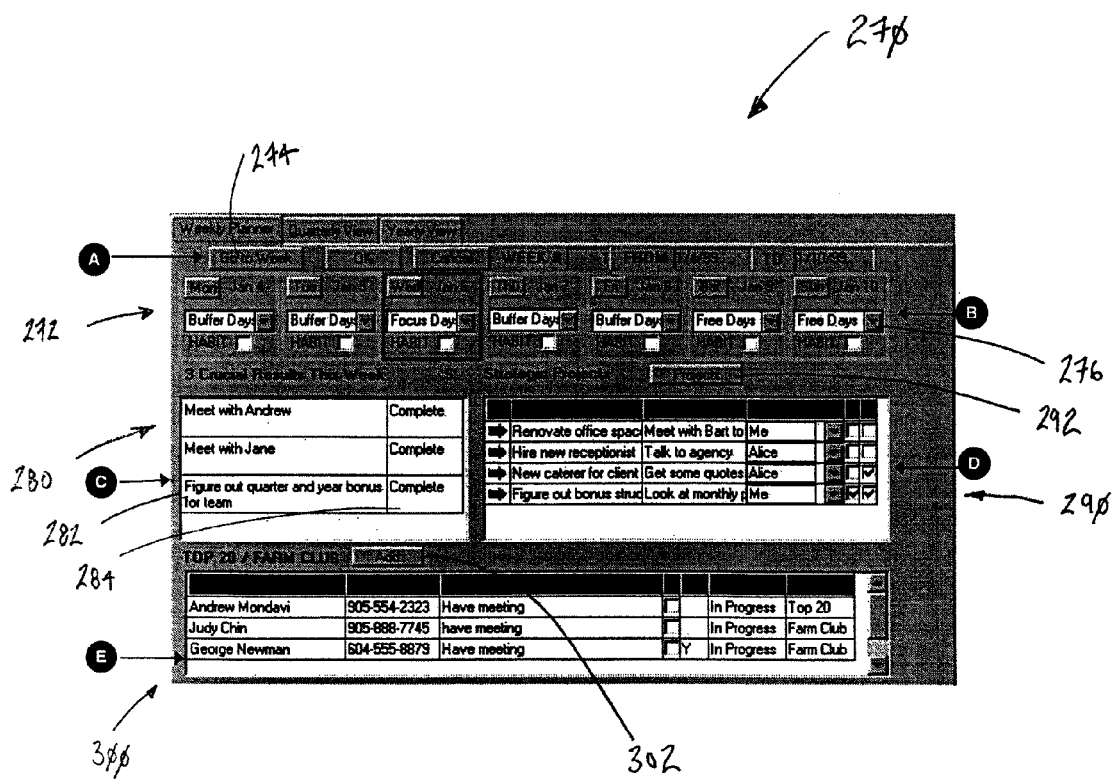
FIG. 20 is a screen capture of the weekly sub-component of the weekly planner.

Referring now to FIG. 20 a screen capture of the weekly planner sub-component of the weekly planner component 14 is shown generally as 270. Screen 270 provides a summary of the users week. Screen 270 comprises: a week selection portion, a crucial results portions, a strategic projects portion and a Top 20 /Farm Club portion; each of which is shown generally as 272, 280, 290 and 300 respectively.

Figure 22:
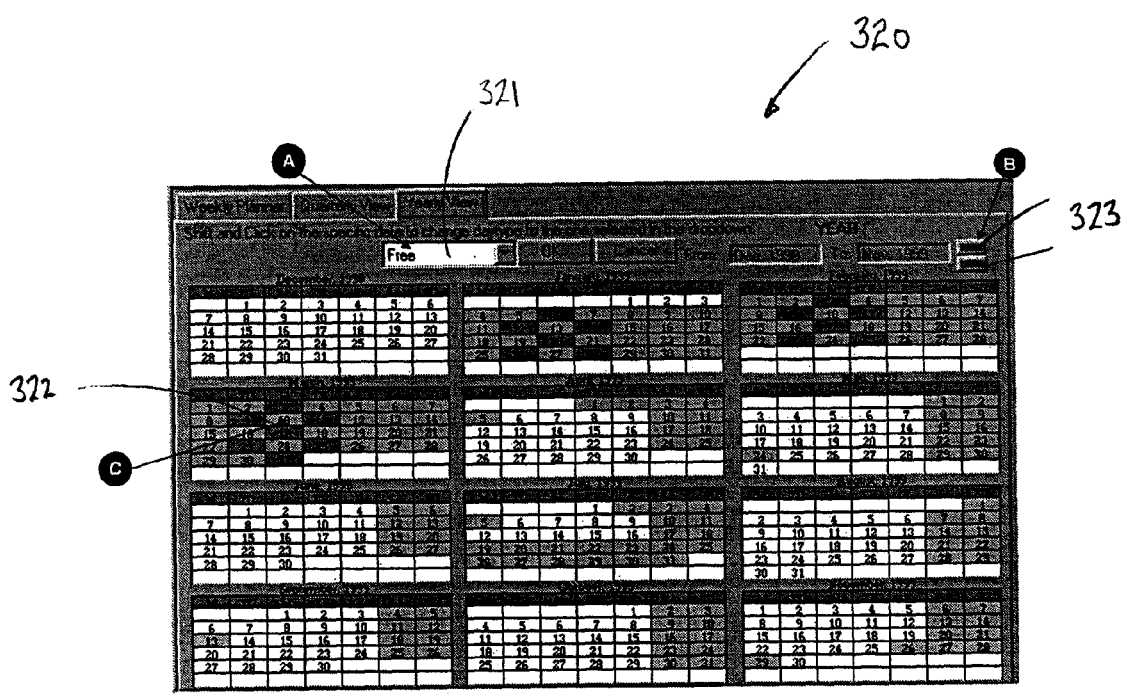
FIG. 22 is a screen capture of the yearly view sub-component of the weekly planner component.

Referring first to week selection portion 272, upon pressing the go to week button 274, a weekly navigation pop up window (not shown) will appear which will allow the user to create a new week or view an existing one. Each day of the week is displayed in the week selection portion 272 with a selection list 276 allowing the user to select the type of day (i.e. free day, buffer day or focus day). Any date type selection made will be reflected in the on calendar field 118 of the entrepreneurial time system screen 100 (FIG. 10). Any date type selection made will also be displayed in the quarterly view 310 (FIG. 21) and the yearly view 320 (FIG. 22).

Referring now to crucial results portion 280 of FIG. 20, the user may edit or enter data into crucial results fields 282 and by clicking on status field 284 activate a pop-up window from which a status from the list of: in progress (I), completed (C), forward (F) and drop (D) may be selected.

Referring now to the strategic projects portion 290 of FIG. 20, the present invention will check the due dates listed on the strategic projects screen 170 (FIG. 13). Any project with a due date for the week currently being viewed will be displayed in projects portion 290. By clicking the projects button 292, the user may add an action for the current week for an existing project. Clicking the projects button 292 results in the display of a list of strategic projects (not shown). By dragging a project from the list to the project portion 290 area, the projects screen 200 (FIG. 14) will next appear allowing the user to enter the action they wish for the current week. Clicking the OK button of the projects screen 200 will then return the user to the weekly planner screen 270 with the project and action selected now displayed.

Referring now to the Top 20/Farm Club portion 300 of FIG. 20, a new member may be added by selecting the add button 302. This selection results in the display of a summary window (not shown) of the data found in the Top 20/Farm Club Screen 142 (FIG. 12). Selecting a name from the summary window and dragging it to the Top 20/Farm Club portion 300 will add the name to the list displayed in portion 300.

Figure 49:
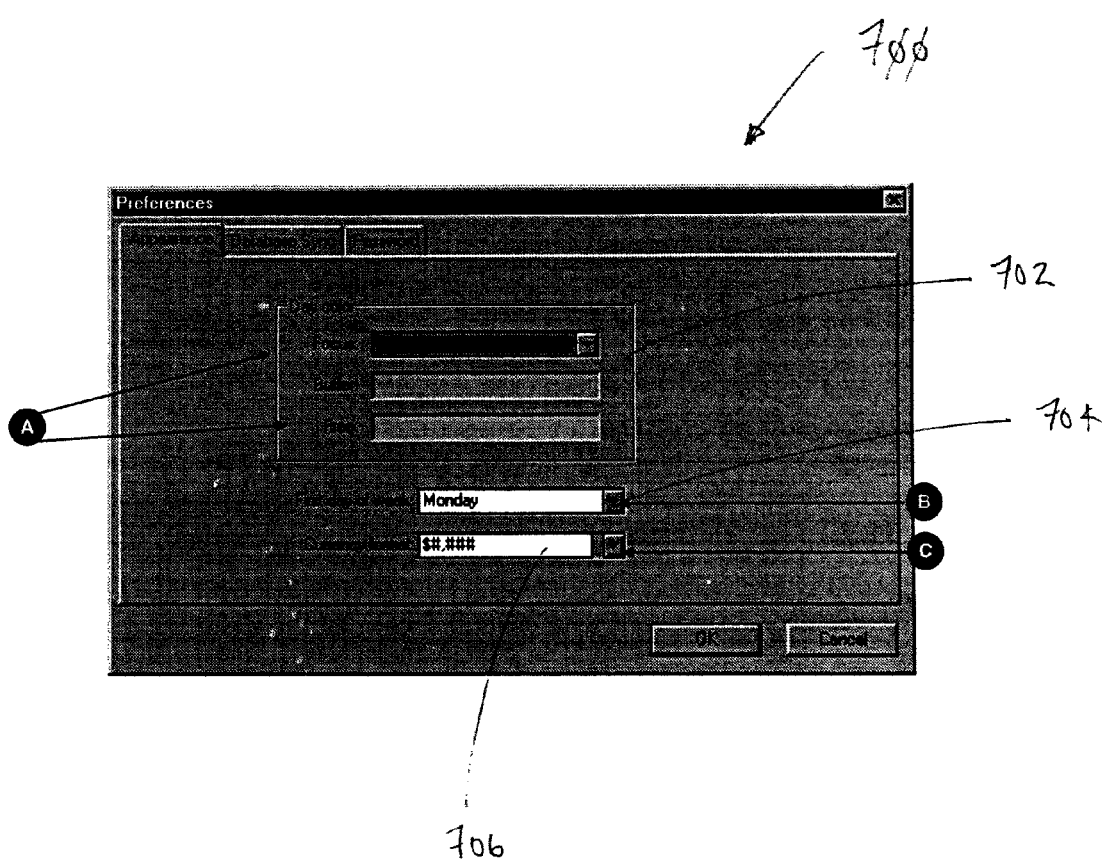
FIG. 49 is a screen capture of the appearances screen of the preferences sub-component of the administration function.

Referring now to FIG. 21 a screen capture of the quarterly view sub-component of the weekly planner component 14 screen is shown generally as 310. By clicking on the quarter field 312, a list of quarters that have been created will be displayed (not shown) from which the user may select an entry. The user may create a new quarter by selecting the new file icon 40 of the toolbar 39 (FIG. 4). By selecting a day type from the day type field 314, the user may then assign the colour for that day type to a specific calendar day by selecting a cell 316 of the calendar and pressing shift and click. Colours for day types are selected using appearance screen 700 (FIG. 49).

Referring now to FIG. 22, a screen capture of the yearly view sub-component of the weekly planner component 14 is shown generally as 320. By selecting a day type from the day type field 321 the user may then assign the colour for that day type to a specific calendar day by selecting a cell 322 of the calendar and pressing shift and click. By clicking on the down or up arrows 323, the user may scroll forward or backward to display twelve consecutive months.

Figure 23:
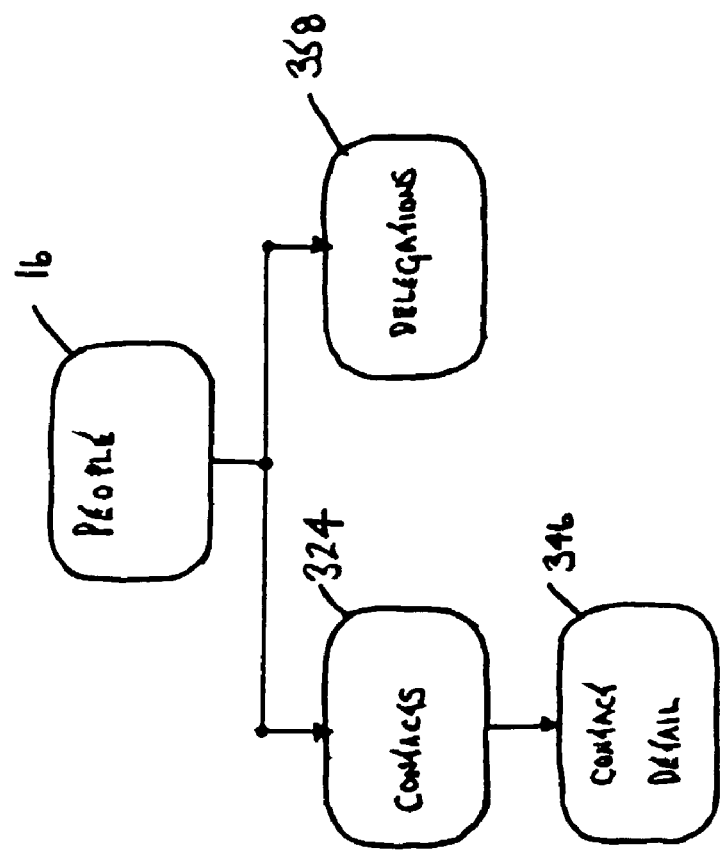
FIG. 23 is a block diagram illustrating the sub-components of the people component of FIG. 1.

FIG. 23 is a block diagram illustrating the sub-components of the people component 16 of FIG. 1; comprising: people component 16, contacts sub-component 324, contact detail sub-component 346 and delegations sub-component 358.

Referring now to FIG. 24, a screen capture of the contacts sub-component of the people component 16 of the present invention is shown generally as 324. The contacts screen 324 allows the user to keep track of their most important business and personal contacts. The contacts screen 324 contains the pool of contacts from which the Top 20 and Farm Club (FIG. 12) are designated. When the contacts screen 324 is first displayed, all existing contacts are listed. To filter the contacts displayed, the user may click on view field 325, which will display a drop down list from which the user may select a type of contact. Typical contact types include: business, delegations and personal. All fields on the screen 324, except for name field 326, may be edited on the screen 324 by clicking on the field and making changes. To edit name field 326, the user must click on selector arrow 327 adjacent the name field 326 they wish to change. This will display contact details window 346 (FIG. 25) into which the user may enter the first name and last name and other details of the contact. R-Factor field 328 indicates whether or not the contact has been asked the R-Factor Question. By clicking on type selector field 329, a pop up window (not shown) will be displayed allowing the user to select a different contact type or to add a new contact type. Creation of a new contact type will be reflected in the list of contact types available from the view field 325. Phone number field 330, fax number field 331 and email field 332 may each be edited by clicking on the field and entering the new data. Confidential field 333 may be checked by the user if they wish this contact to be kept hidden to other users. Find button 334 will provide the user with a pop up window to enter information to find a contact (FIG. 5). Selecting add button 336 will display the contact details window (FIG. 25) into which details of the new contact may be inserted. Selection of the delete button 338 will delete the selected contact record.

Figure 25:
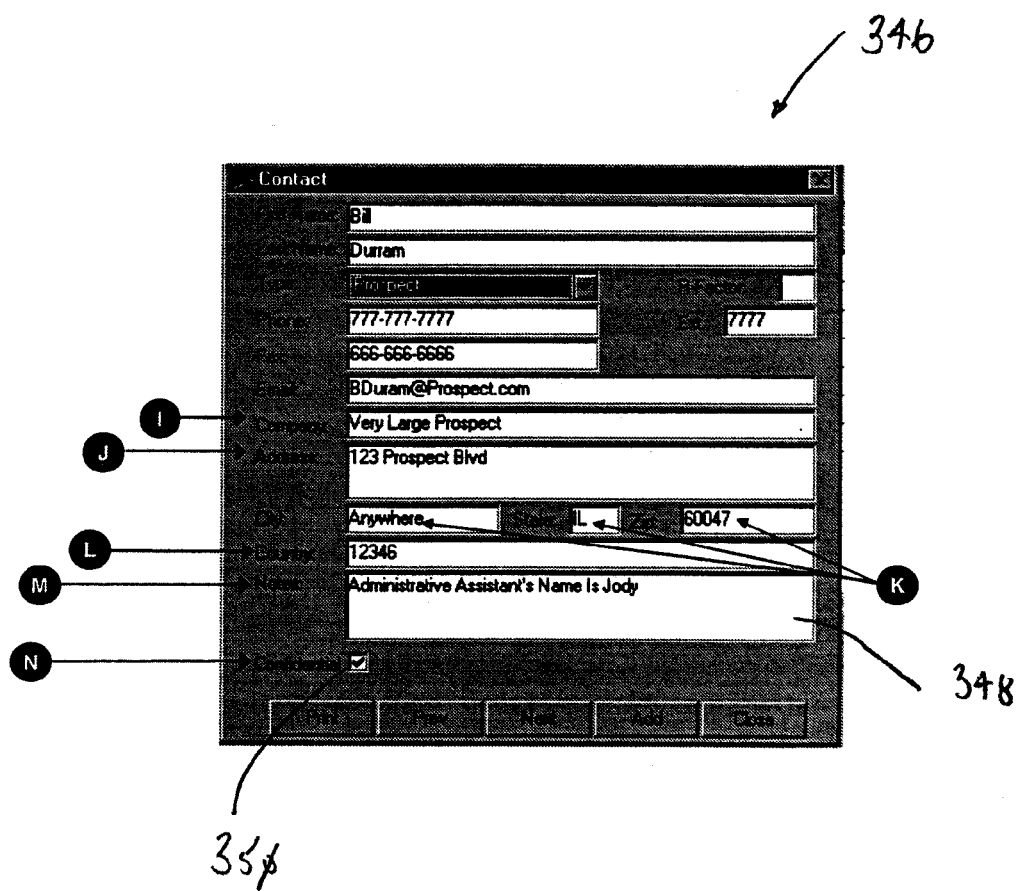
FIG. 25 is a screen capture of the contact details window of the people component.

Referring now to FIG. 25, a screen capture of the contact details window of the people component 16 is shown generally as 346. Contact details window 346 appears when the user clicks on selector arrow 327 or add button 336 of contacts screen 324 (FIG. 24). A plurality of standard fields are provided, including notes field 348 into which the user may enter multiple lines of data. As with other data records in the system, the user may check the confidential field 350 to ensure that other users do not have access to this record.

Figure 26:
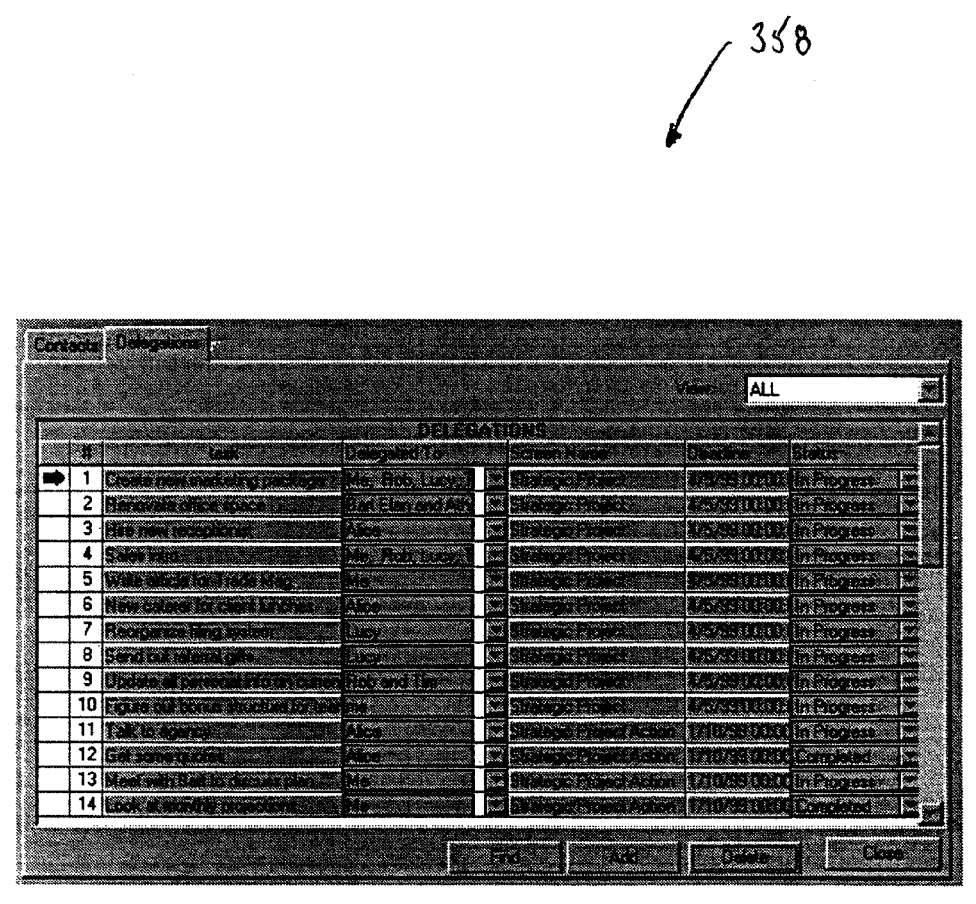
Figure 38:
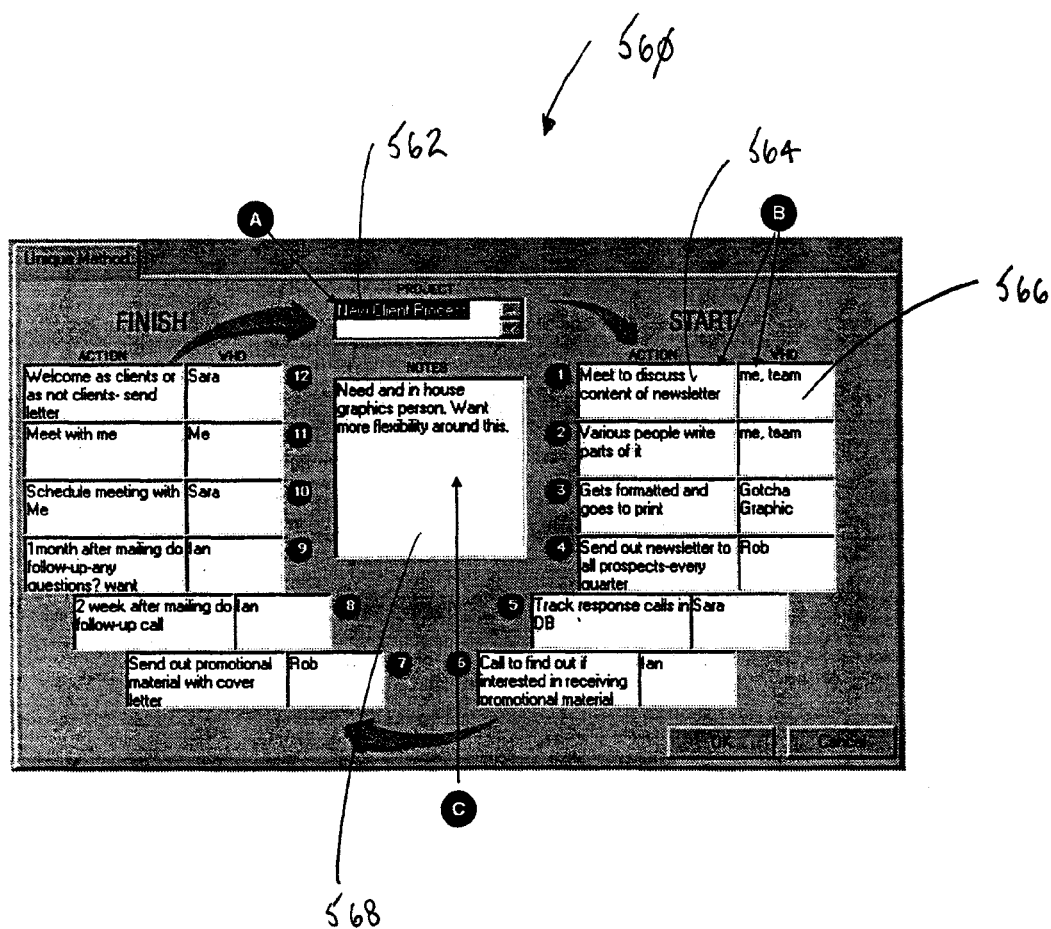
FIG. 38 is a screen capture of the unique method screen of the tools component.

Referring now to FIG. 26, a screen capture of the delegations details sub-component of the people component 16 is shown generally as 358. Screen 358 contains a list of tasks and the people to whom each task has been delegated. The information displayed comes from: the strategic projects screen 170 (FIG. 13), the strategic projects portion 290 of weekly planner screen 270 (FIG. 20), the who field 470 of project planner screen 460 (FIG. 34b) and the who field 566 of unique method screen 560 (FIG. 38). Delegations screen 358 is a read only screen. Information displayed on screen 358 may be edited using the weekly planner screen 270 (FIG. 20) or the strategic projects screen 170 (FIG. 13).

Figure 27:
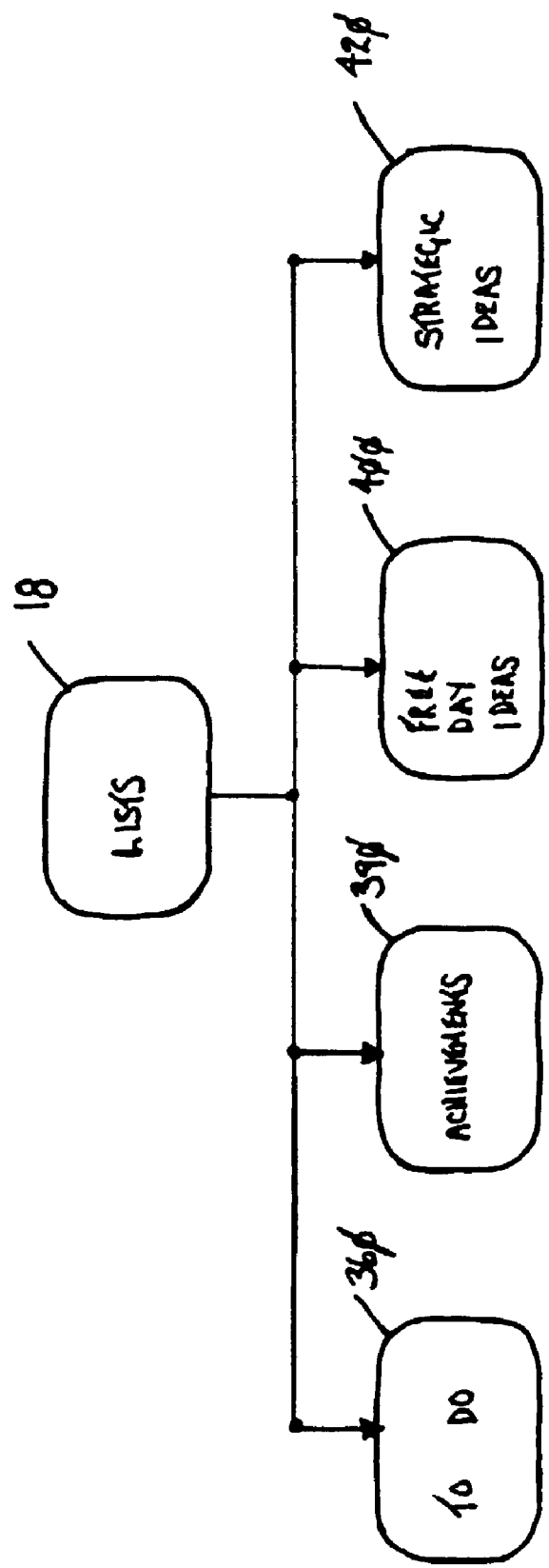
FIG. 27 is a block diagram illustrating the sub-components of the lists component of FIG. 1.

FIG. 27 is block diagram illustrating the sub-components of the lists component 18 of FIG. 1 comprising: to do 360, achievements 390, free day ideas 400 and strategic ideas 420.

Figure 28:
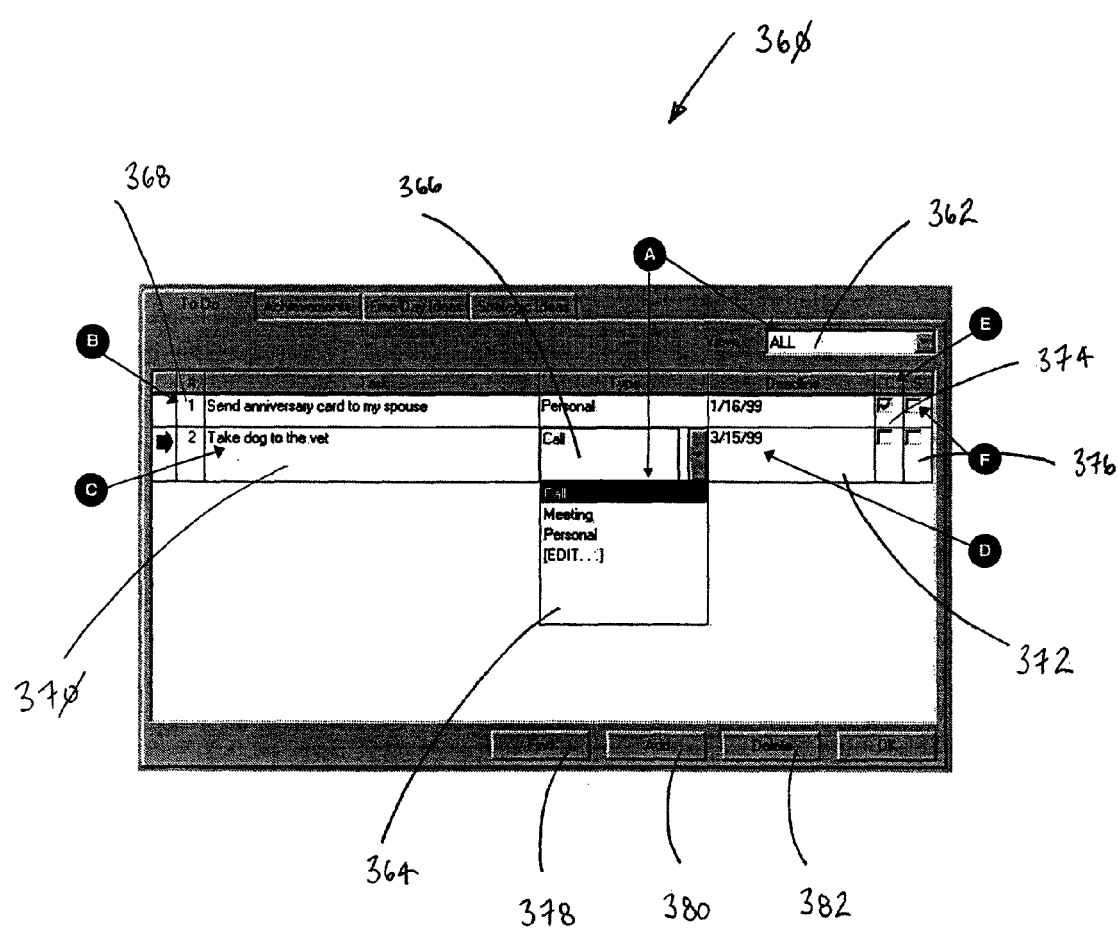
FIG. 28 is a screen capture of the to do list of the lists component.
Figure 29:
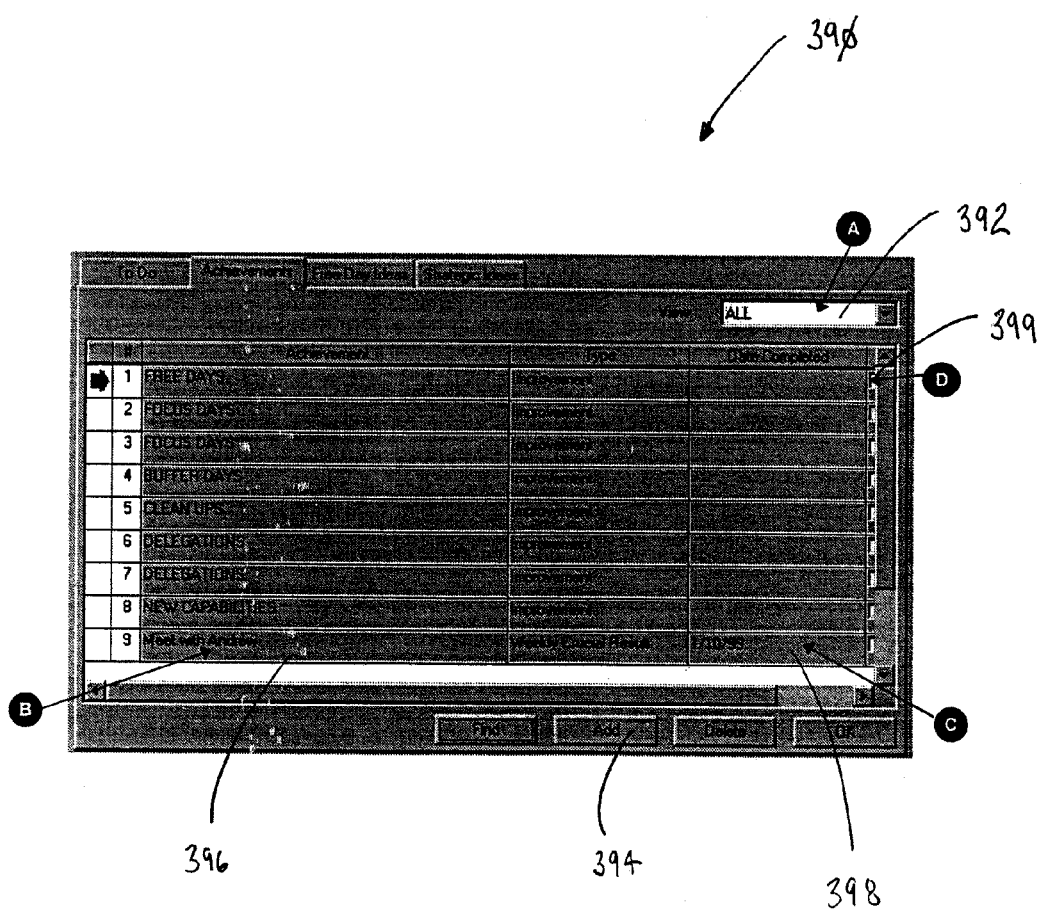
FIG. 29 is a screen capture of the achievements of the lists component.

Referring now to FIG. 28, a screen capture of the to do list of the lists component 16 of the present invention is shown generally as 360. To do list screen 360 lists activities, tasks and functions that must be completed within the next 90 days. Tasks are classified by type and the default is to display all types. By clicking on the type field 362, a pop up type window 364 will appear. Pop up type window 364 allows the user to select a specific type for display on screen 360, or by selecting the [EDIT . . . ] field, to add or delete types. As shown in FIG. 28, the user has clicked on the type cell 366, thus causing the pop up window 364 to appear, allowing the user to change the type of the current record. The record number field 368 is automatically entered by the system and cannot be edited by the user. The user may edit task field 370 by clicking on the field 370 and altering the text. Deadline field 372 contains the date by which the task must be completed. Confidentiality field 374 may be checked to keep the selected record hidden from other users. Status field 376 may be checked to indicate that the task has been completed. Completed to do's are displayed on achievements screen 390 (FIG. 29). General command buttons 378, 380 and 382 permit the user to find, add or delete a task respectively.

Referring now to FIG. 29, a screen capture of the achievements of lists component 16 is shown generally as 390. The achievements screen 390 enables the user to track the things that have been accomplished as well as when they were accomplished. When actions/items are marked as completed by checking box 376 of the to do list screen 360 (FIG. 28), or similar boxes on other screens, they are automatically posted to the achievements screen 390. As with the screens previously discussed, the default is to display all types of data. The user may alter this by selecting a different type from the type field 392. The user may also add achievements by selecting a type from the type field 392, then pressing the add button 394. The text describing the achievement is entered into achievement field 396, which accepts multiple lines. The date completed field 398 may be filled in as the record is added. Confidentiality field 399 may be checked if the user wishes to keep that record confidential from other users.

Figure 30:
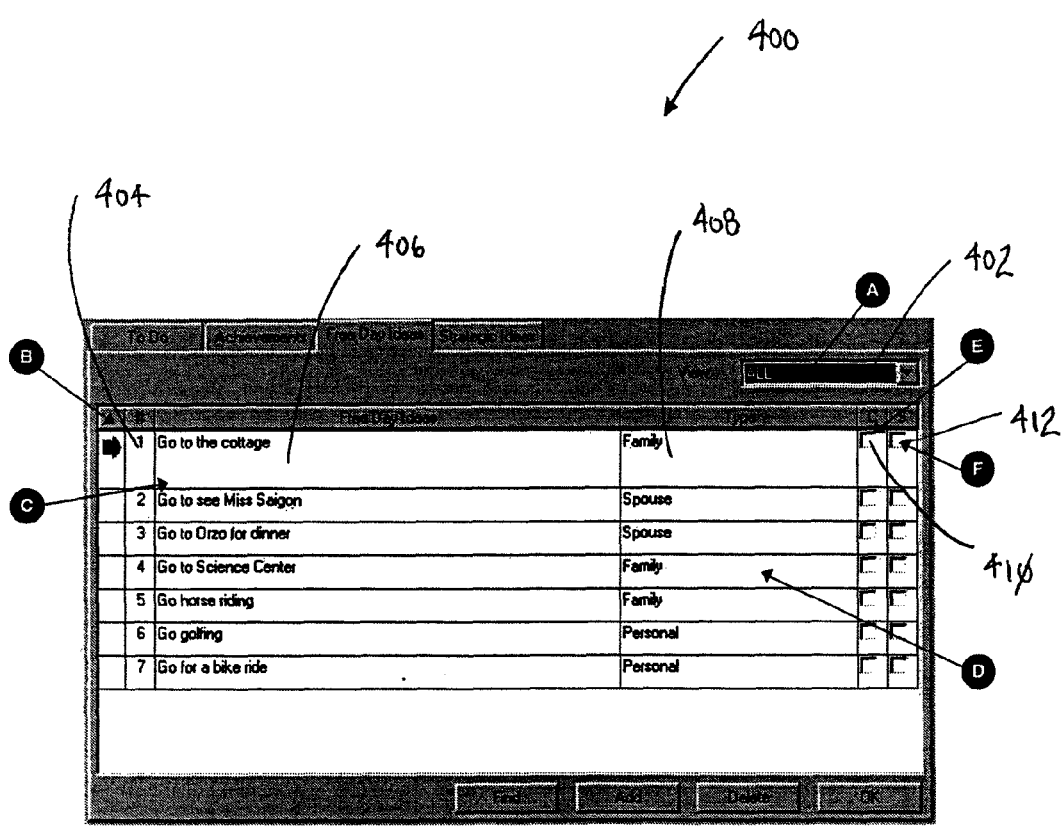
FIG. 30 is a screen capture of the free day ideas screen of the lists component.

Referring now to FIG. 30, a screen capture of the free day ideas sub-component of the lists component 16 is shown generally as 400. Free day ideas screen 400 allows the user to enter a list of activities they would like to do on their free days.

The default is to display all types of activities, but the user may change this by selecting the types field 402 and choosing a different type. As with other screens that have record numbers 404, these numbers are automatically generated by the system and cannot be modified by the user. Free day ideas field 406 permits multiple lines of input from the user. Type field 408 may be selected from a pop up window displayed (not shown) when selecting the types field 402 or added by selecting the [Edit . . .] portion of the pop up window. Typical types may include: family, spouse, travel, or friends. Confidentiality field 410 may be checked to prevent other users from viewing a record. Status field 412 may be checked when the activity has been completed.

Figure 31:
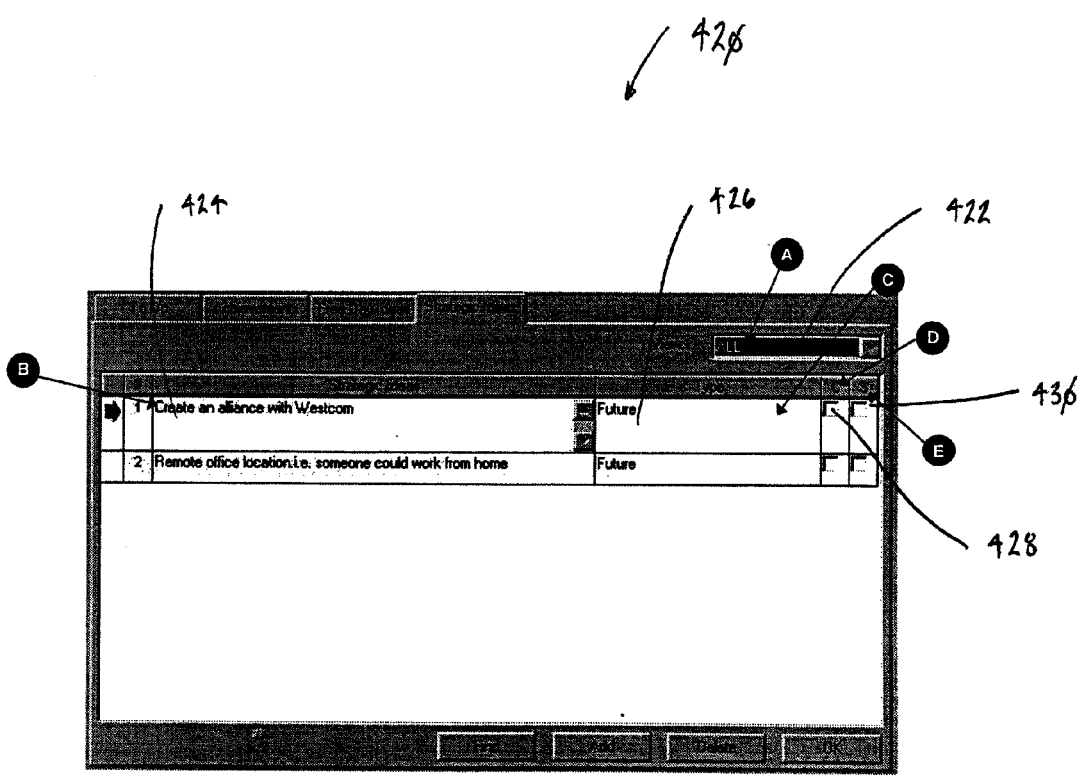
FIG. 31 is a screen capture of the strategic ideas screen of the lists component.

Referring now to FIG. 31, a screen capture of the strategic ideas screen of the lists component 16 is shown generally as 420. The strategic ideas screen 420 allows the user to maintain a list of strategic ideas. The default setting is to display all types of strategic ideas, but by clicking on view field 422 the user may restrict the types of ideas displayed. Description field 424 allows the user to enter multiple lines of text to describe the strategic idea. When adding an new idea or editing an existing idea the user may select a specific type for the type field 426. By clicking on type field 426 a pop up window of types (not shown) will be displayed, from which the user may select a predefined type or create a new type. Confidential box 428 may be checked to restrict access by other users. Status box 430 may be checked when the strategic idea has been completed.

Figure 32:
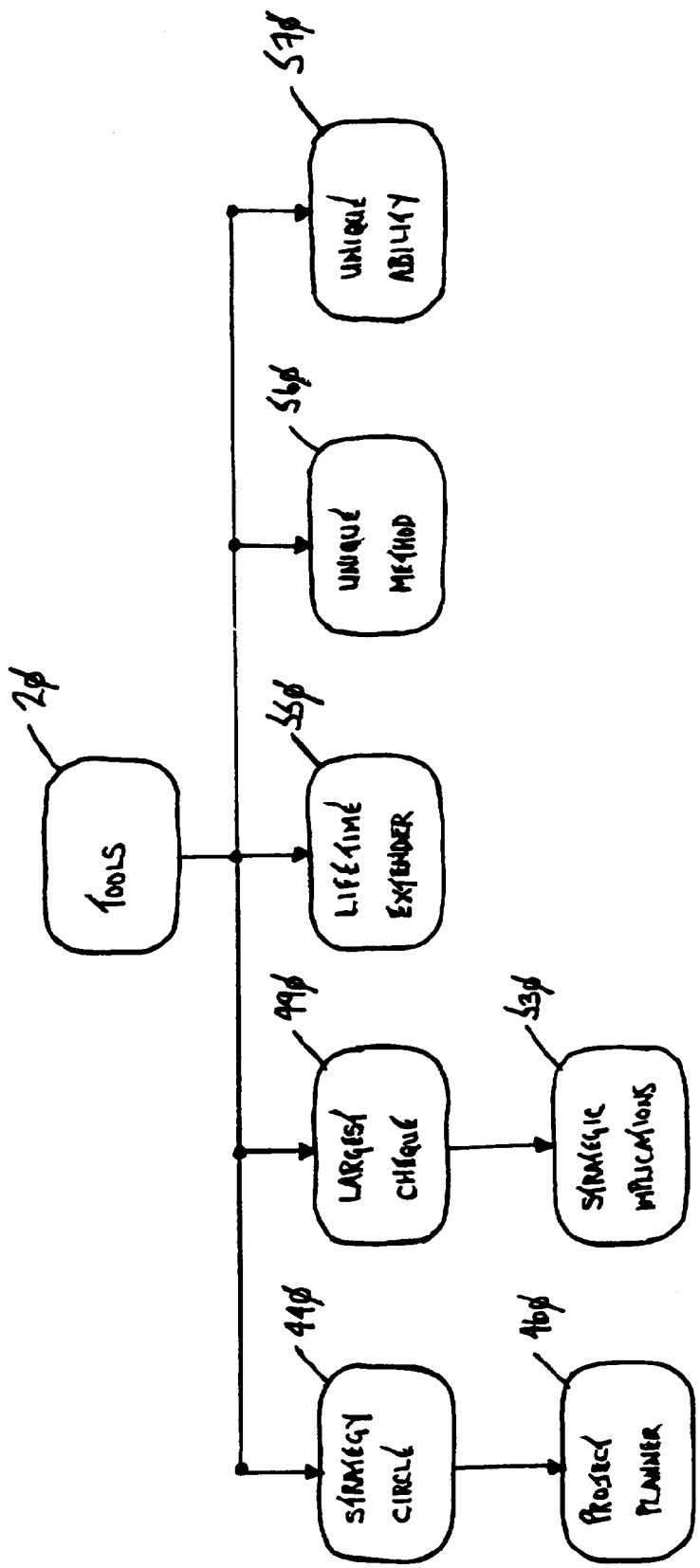
FIG. 32 is a block diagram illustrating the sub-components of the tools component of FIG. 1.

FIG. 32 is a block diagram of the components of the tools function comprising strategy circle component 440 and its sub-component project planner 460, largest cheque component 490 and its sub-component strategic implications 530, lifetime extender component 550, unique method component 560 and unique ability component 570.

Figure 33A:
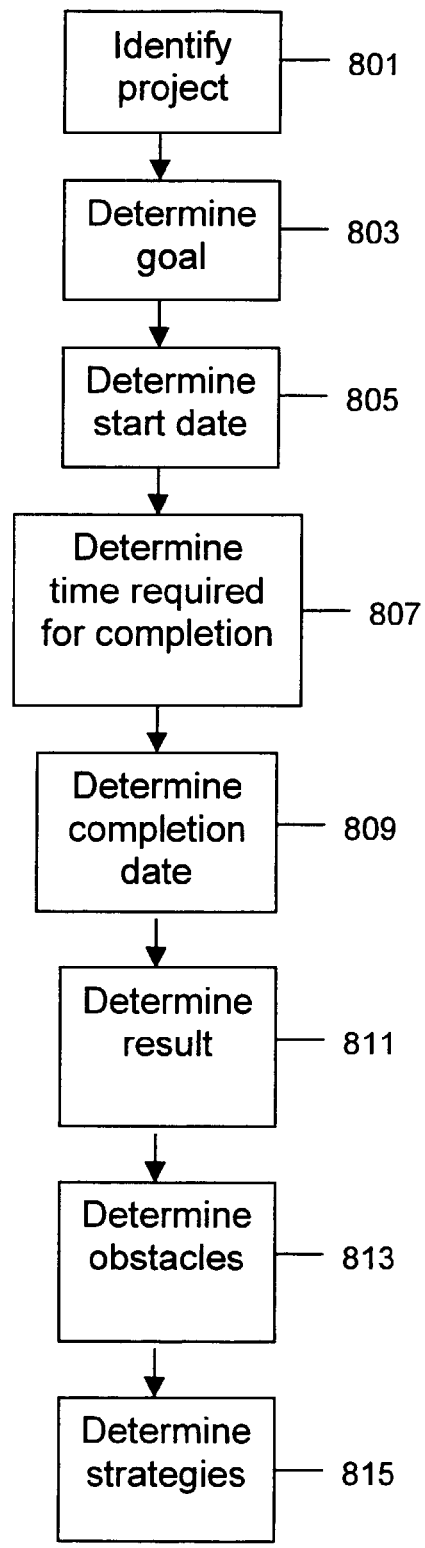
FIG. 33a is a flowchart showing the steps in a method of overcoming obstacles using strategies in accordance with an embodiment of the invention.

Referring to FIG. 33a, there is illustrated in a flowchart a method of obtaining goals by first identifying obstacles and then strategies for overcoming these obstacles. This method is preferably implemented using the strategy circle of FIG. 33b. Referring to step 801, the first step in the method is to identify a project that needs planning or an issue that needs resolving. This project may be professional or personal. Then, in step 803, a goal should be determined. This goal should state what the user wants to happen, and should be written in specific, measurable and achievable terms. In step 805, the current date is typically written in as the starting date for the project. Alternatively, a later date may be entered. Then, in step 807, the user determines how long it will take to complete the goal, and this time period, together with the starting date determined in step 805, is used to determine the completion date in step 809. In step 811, the user determines the results that will be achieved when the goal is attained. These results should be expressed in terms of what achieving the goal will look and feel like, and how it will impact the user and others involved. By creating a picture in the user's mind, the user will gain a clear sense of what it will be like to achieve the goal, which will help to effectively motivate the user. In step 813, the user determines specific obstacles to reaching the results. These obstacles should be described as specifically as possible. Further, as many obstacles should be identified as possible as these obstacles provide the raw material for accomplishing the project. After step 813, strategies for overcoming each of the obstacles are determined in step 815. At least one strategy should be determined for each obstacle. However, a particular strategy may well work for more than one obstacle. Alternatively, a particular obstacle may require more than one strategy to overcome. For this reason, it is very important to capture all of the obstacles before moving on to determining strategies for overcoming the obstacles.

Referring now to FIG. 33b, a screen capture of the strategy circle screen of the tools component is shown generally as 440. The strategy circle screen 440 allows the user to enter and track their progress toward their strategic goals. Certain information entered in screen 440 will be reflected in the related project planner screen 460 (FIG. 34b). Project field 442 permits the user to enter a description of a project. The information from the project field 442 also appears in the project planner screen 460 (FIG. 34b). Goal field 444 permits the user to enter a goal associated with the current project. Date field 446 defaults to the current date, but may be changed. When creating a new project, date field 446 may not be less than the current date. Result field 448 allows the user to enter the desired result for the current project. The contents of result field 448 are also displayed in the project planner screen 460 (FIG. 34b). Target date field 450 contains the date that the goal should be accomplished. Target date field 450 must not be less than the value in date field 446. The contents of target date field 450 are also displayed in the project planner screen 460 (FIG. 34b). Obstacle field 452 may contain up to ten obstacles. Each obstacle may have multiple lines. The values contained within obstacle field 452 are also displayed in planner screen 460 (FIG. 34b). Associated with each obstacle in obstacle field 452 is a strategy. The strategies are located in strategy field 454. Each strategy may have multiple lines. The information from the strategy field 454 also appears on the project planner screen 460 (FIG. 34b).

Figure 33C:
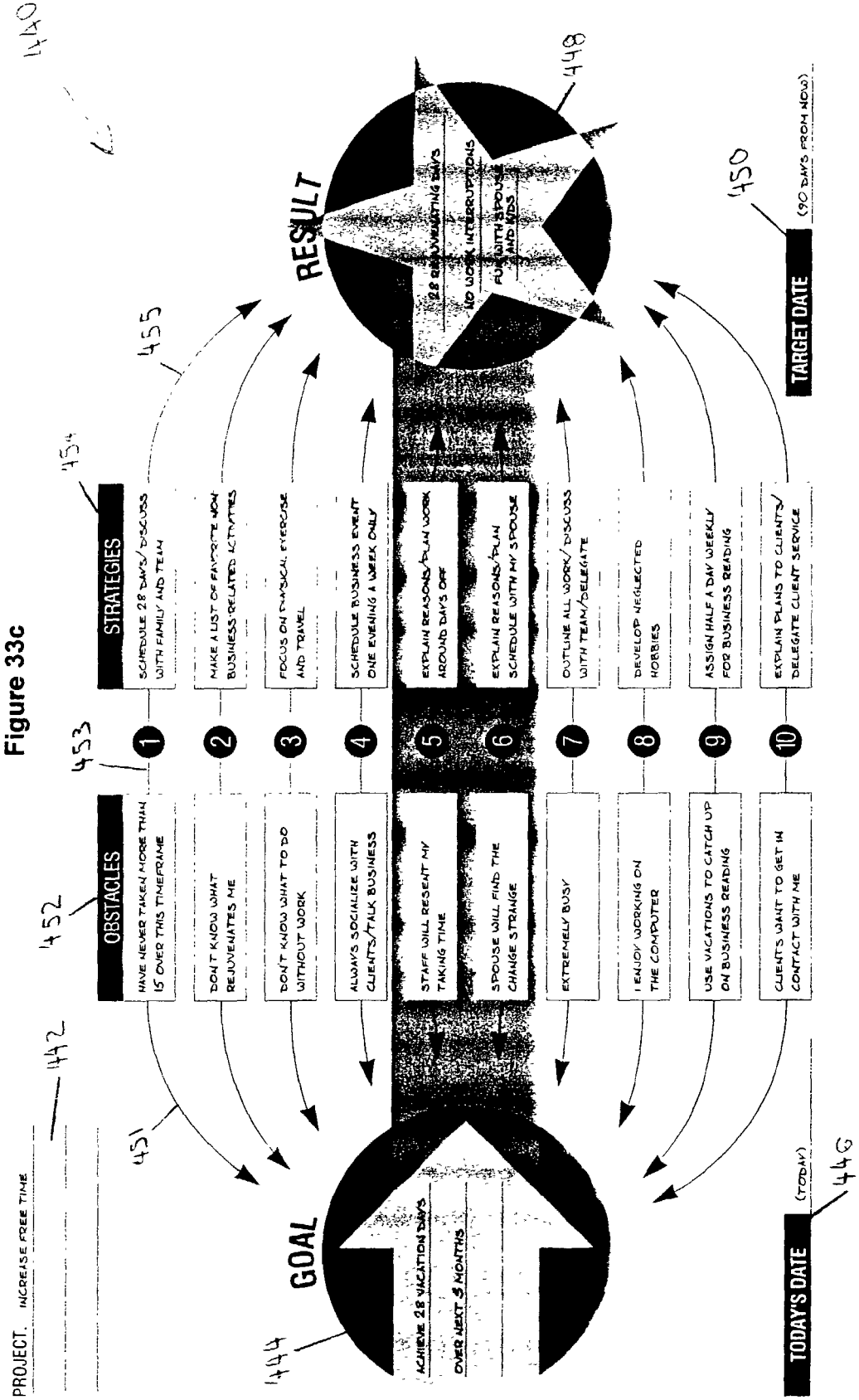
FIG. 33c shows a strategy circle containing strategy information pertaining to a specific goal.

Referring to FIG. 33c, a strategy circle 440 is shown for a specific project. This project, as shown in the project field 442, is to increase free time. As shown in goal field 444, the goal is for the user to have 28 vacation days within the next three months. The current date is written in field 446. The desired results are entered in result field 448. These results include the user enjoying twenty-eight rejuvenating days, no work interruptions, and for the user to have fun with their spouse and children. After thinking of the goal and results, the user thinks of obstacles. These obstacles are listed in 1 to 10 sub-fields of obstacle field 452. Sub-field 1 of obstacle field 452 has the obstacle that the user has never taken more than fifteen days over this timeframe in the past. All of these 10 sub-fields are linked to the goal field 444 by linking means 451. The strategy circle 440 also includes strategy field 454, in which is entered, in separate sub-fields, ten strategies for overcoming the ten obstacles listed in obstacle field 452. Each strategy listed in strategy field 454 is linked to the specific obstacle that such strategy is intended to overcome by link lines 453. Further, each strategy is linked to result field 448 by link lines 455. A target date for attaining the goal and results is entered into field 450.

Figure 34A:
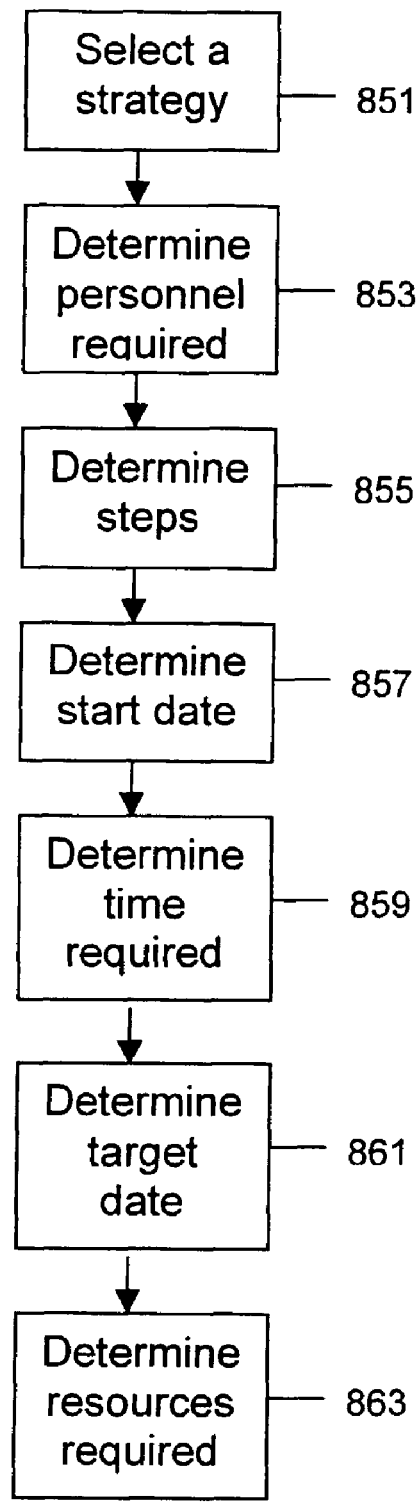
FIG. 34a is a flowchart showing the steps of a method of implementing individual strategies.
Figure 34B:
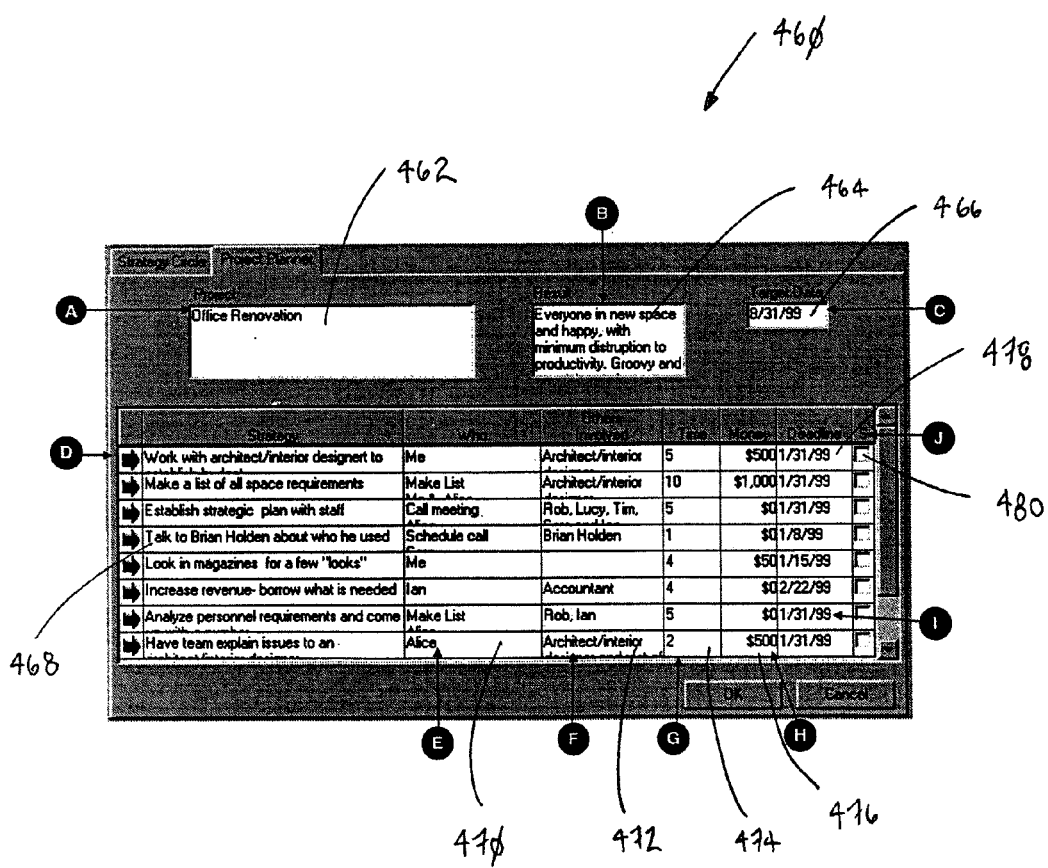
FIG. 34b is a screen capture of the project planner screen of the strategy circle.

Referring to FIG. 34a, there is illustrated a method for planning strategies in a flowchart. In a first step 851, a particular strategy in the plurality of strategies is selected. Then in step 853, the people required to execute that strategy are determined. In step 855, the steps required to implement the strategy are determined. Then, in step 857, the start date for initiating the strategy is determined. Often, this start date will be the start date of the project. However, if a strategy is not implementable until other strategies have been started, then the start date for that strategy will be delayed somewhat from the project start date. In step 859, the time required to implement the strategy is determined. Then, in step 861, the target date for completing the strategy is determined using the strategy start date determined in step 857, and the time required determined in step 859. In step 863, the resources required, and expenses to be incurred in implementing the strategy are determined.

Referring now to FIG. 34b, a screen capture of the project planner screen is shown generally as 460. The project planner screen 460 provides the user with the functionality to plan and track strategies for overcoming the obstacles identified in the obstacle field 452 of the strategy circle screen 440 (FIG. 33b). Further, the fields listed on screen 460 may be searched for selected information, such that a searcher can determine, for example, all of the projects in which a specific person is involved. Project description field 462 accepts a project description from the user, this description is also displayed in the project field 442 of the strategy circle screen 440 (FIG. 33b). Similarly, result field 464 corresponds to result field 448 of the strategy circle screen 440 (FIG. 33b). Target date 466 corresponds to target date field 450 of the strategy circle screen 440 (FIG. 33b). Up to ten strategies may be entered into strategy field 468 which correspond to strategy field 454 of the strategy circle screen 440 (FIG. 33b). Clicking on who field 470 will display a drop down list of individuals from which the individual responsible for implementing the strategy may be selected. Others involved field 472 contains the names of individuals or groups involved with the strategy. Time field 474 contains the amount of time required to complete the strategy. The amount of time may be units of time, e.g. 4 hrs. or 2 days, or it may be text notes e.g. "Friday at 3". Money field 476 contains the estimated cost in whole numbers of implementing the strategy. Deadline 478 contains the date by which the task should be completed. Confidential field 480 may be checked if the user does not wish other users to view the contents of a specific strategy record.

Referring to FIG. 34c, the associated project planner 460 is shown. Each of the ten strategies listed in strategy field 454 of FIG. 33c is automatically copied to the first column 468 of the project planner. Then, the user can enter the other information required to implement the strategy, such as the individuals whose involvement is required, which is listed in column or who field 470, and the deadline for implementing the strategy, which is listed in column or deadline field 478. The steps required to implement the strategy are then listed in columns 479, and the resources and expenses required are listed in column 476.

Figure 35:
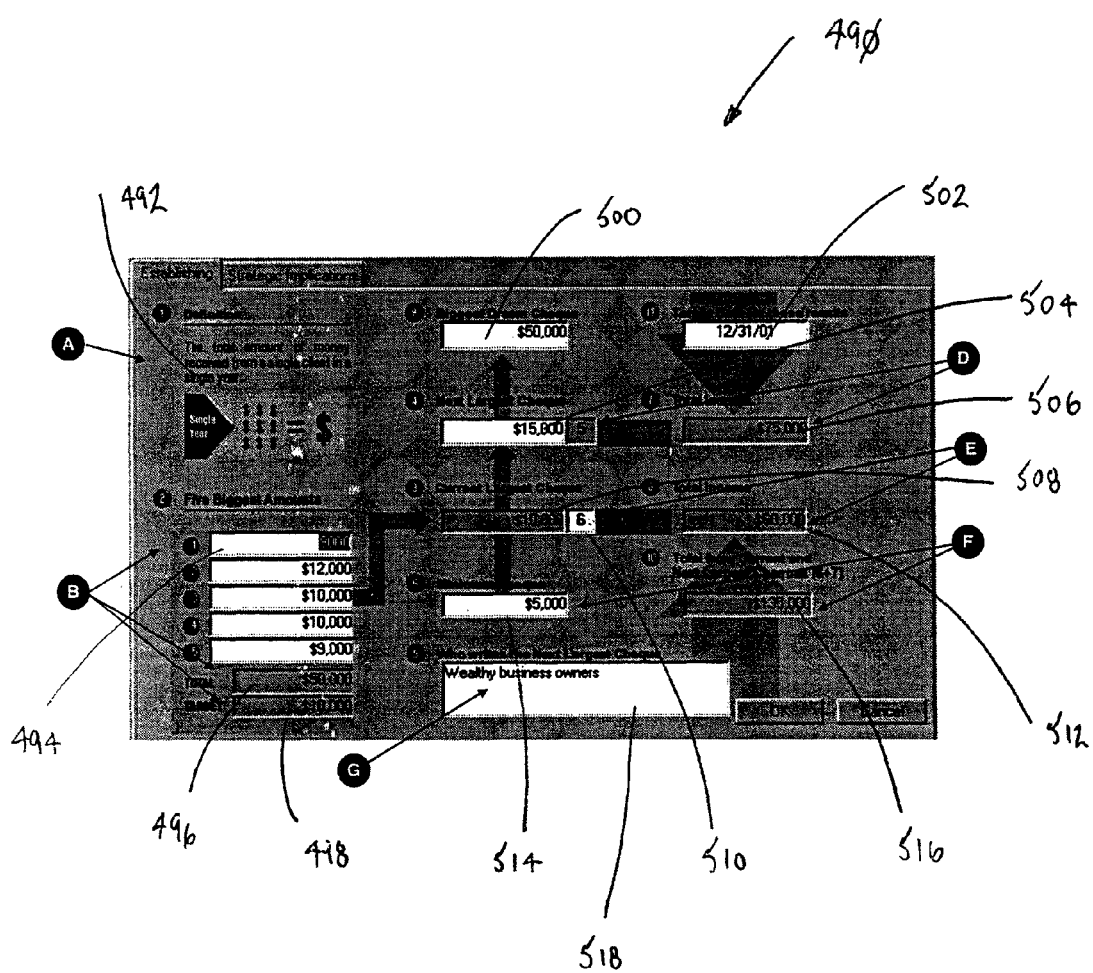
FIG. 35 is a screen capture of the largest cheque screen of the tools component.

Referring now to FIG. 35, a screen capture of the largest cheque screen of the tools component is shown generally as 490. The largest cheque screen 490 allows the user to identify the largest amount received from a single client in one year, and to set their plans to accomplish a similar goal in the future. The user must either create a new version of the largest cheque or select an existing version before any data will be displayed on the largest cheque screen 490. As discussed earlier, this selection is made by selecting the "file" option from the command line 32 (FIG. 3) and then selecting "new". A pop up window (not shown) will then provide the user with the option of creating a new version or selecting an existing version. Definition field 492 allows the user to enter or edit a formal definition of the largest cheque. Biggest amount field 494 is the first of the five largest amounts recently received. The total of these amounts is automatically calculated and displayed in total field 496. The average of these amounts is calculated and displayed in target field 498. Dream cheque field 500 contains the largest amount the user would like to receive in a single cheque and target date field 502 indicates the date by which the dream cheque should be received. Next largest cheque field 504 contains the amount that the user expects as their next largest cheque. The amount in next largest cheque field 504 is multiplied by five and displayed in total income field 506. Current largest cheque field 508 is the same as the value in target field 498. Number of clients field 510 allows the user to enter the number of clients from which they expect to receive the current largest check. The value in the number of clients field 510 is multiplied by the value in the current largest cheque field 508 to provide the value displayed in total income field 512. The value displayed in minimum cheque field 514 is entered by the user to indicate the lowest amount for which the user will personally be involved in a transaction or relationship. The value displayed in total field 516 is automatically calculated by adding the values of total income fields 506 and 512. Cheque writer field 518 contains the name of the individual or company that the user believes will write the user their next largest cheque.

Figure 36:
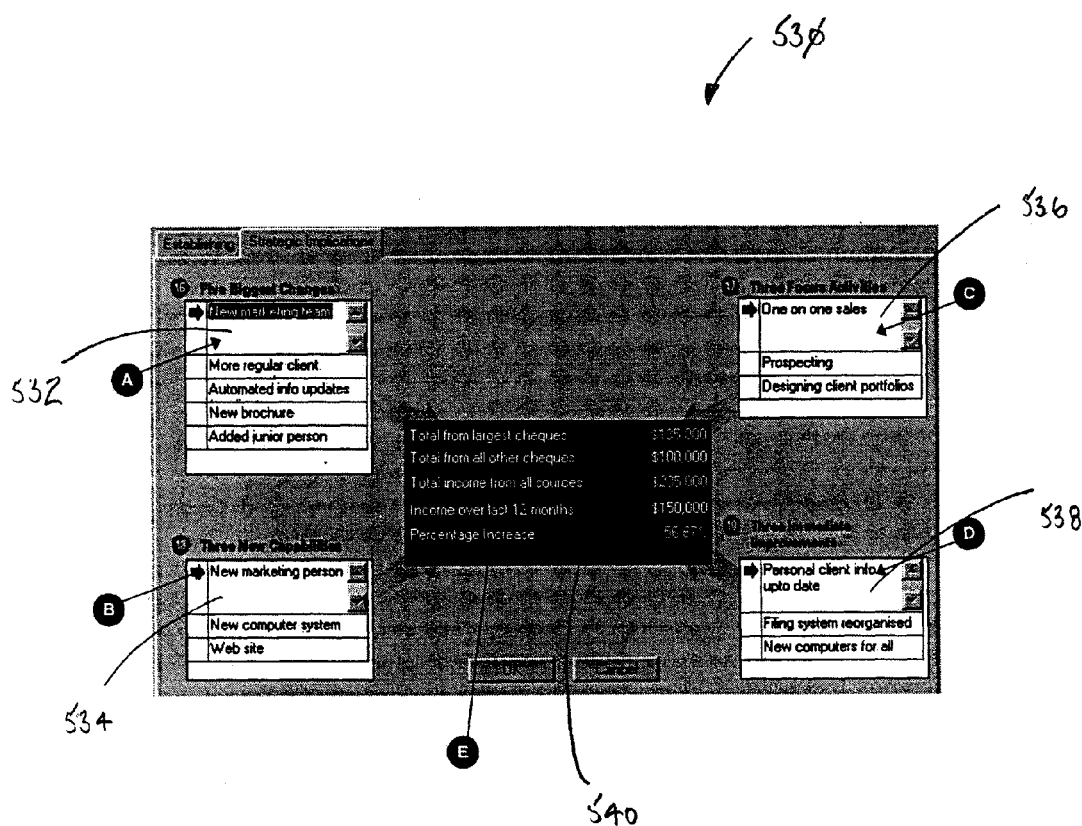
FIG. 36 is a screen capture of the strategic implications screen of the largest cheque.

Referring now to FIG. 36, a screen capture of the strategic implications screen of the largest cheque is shown generally as 530. The strategic implementations screen 530 allows the user to focus on the key items that impact their ability to achieve their largest cheque. Five biggest changes field 532 permits the user to enter the five biggest changes necessary to meet their goal of the largest cheque. Three new capabilities field 534 permits the user to enter the three new capabilities they believe they must have to meet their goal of the largest cheque. Three focus activities field 536 permits the user to enter the three focus activities necessary to meet their goal of the largest cheque. Three immediate improvements field 538 permits the user to enter the three immediate improvements necessary to meet their goal of the largest cheque. Calculation table 540 comprises five fields, from top to bottom they are:

a) total from largest cheques, this field is automatically filled in from total field 516 of largest cheque screen 490 (FIG. 35);

b) total from all other cheques, this is a field into which the user may enter a value;

c) total income from all sources, this field is automatically calculated by adding a) to b);

d) income over the last 12 months, this is a field into which the user may enter a value; and e) percentage increase, this field is automatically calculated by the system.

Referring now to FIG. 37, a screen capture of the lifetime extender screen of the tools component of FIG. 1 is shown generally as 550. The lifetime extender screen 550 allows the user to record their lifetime goals to aid in future planning and goal setting. The lifetime extender screen comprises eight questions labelled A to H, namely:

A) at what age are you going to die;

B) what do you want your life to be like the year before you die;

i) physically;

ii) mentally;

iii) financially;

iv) your relationship; and v) your self assessment.

C) given this, at which age are you really going to die;

D) how many extra years do you have;

E) what would you like to do with these years;

F) how old are you now;

G) how old will you be in three years; and

H) assuming you want this time now rather than the end of your life, what are your priorities for the next 3 years.

Questions E and H allow the user to enter up to five items.

Referring now to FIG. 38, a screen capture of the unique method screen of the tools component of FIG. 1 is shown generally as 560. The unique method screen 560 allows the user to identify and refine the processes by which they achieve their goals. Project field 562 allows the user to select an existing project or enter a new project. Action field 564 allows the user to enter an action or step toward completing the project. Who field 566 pairs each action field 564 with the individuals responsible for completing the action. There are a total of twelve action/who pairs. Notes field 568 allows the user to enter notes on areas of the unique method where they see room for improvement or refinement.

Figure 39:
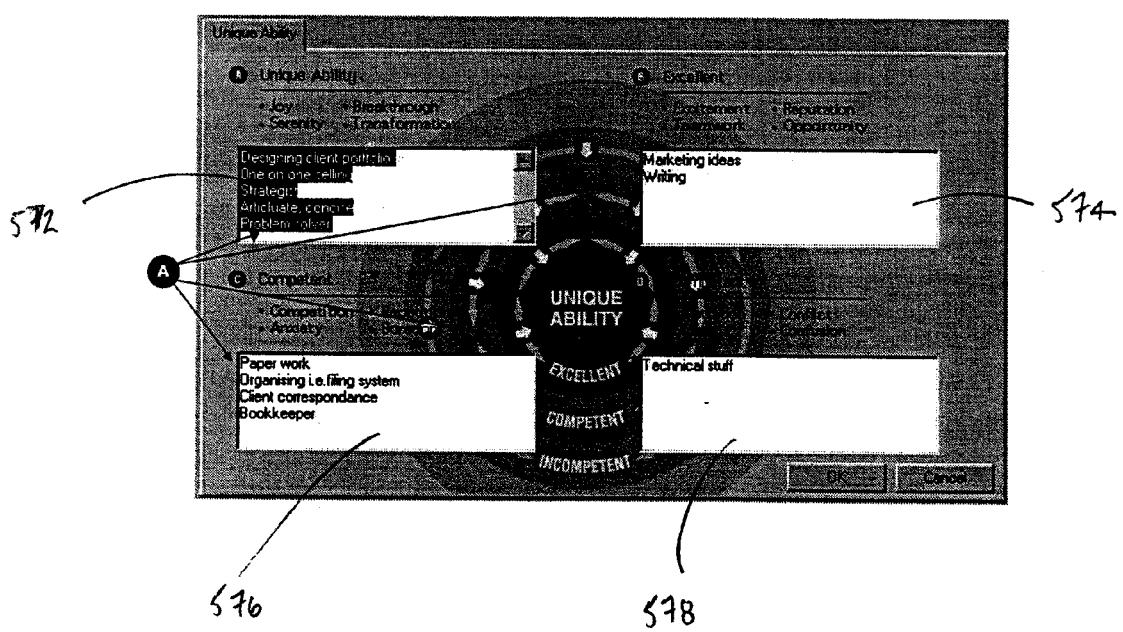
FIG. 39 is a screen capture of the unique ability screen of the tools component.

Referring now to FIG. 39, a screen capture of the unique ability screen of the tools component of FIG. 1 is shown generally as 570. The unique ability screen 570 allows the user to enter and identify their unique abilities that may help or hinder them in accomplishing their goals. Unique ability field 572 permits the user to enter the abilities that they believe are central to their ability to accomplish their goals. Excellent field 574 allows the user to enter skills that are not of the stature of unique ability skills, but still strong. Competent field 576 permits the user to enter skills in which they are competent, but do not provide the break through opportunity of the unique ability skills. Incompetent field 578 is used to describe areas that the user clearly recognizes as outside of their domain of competence.

Figure 40:
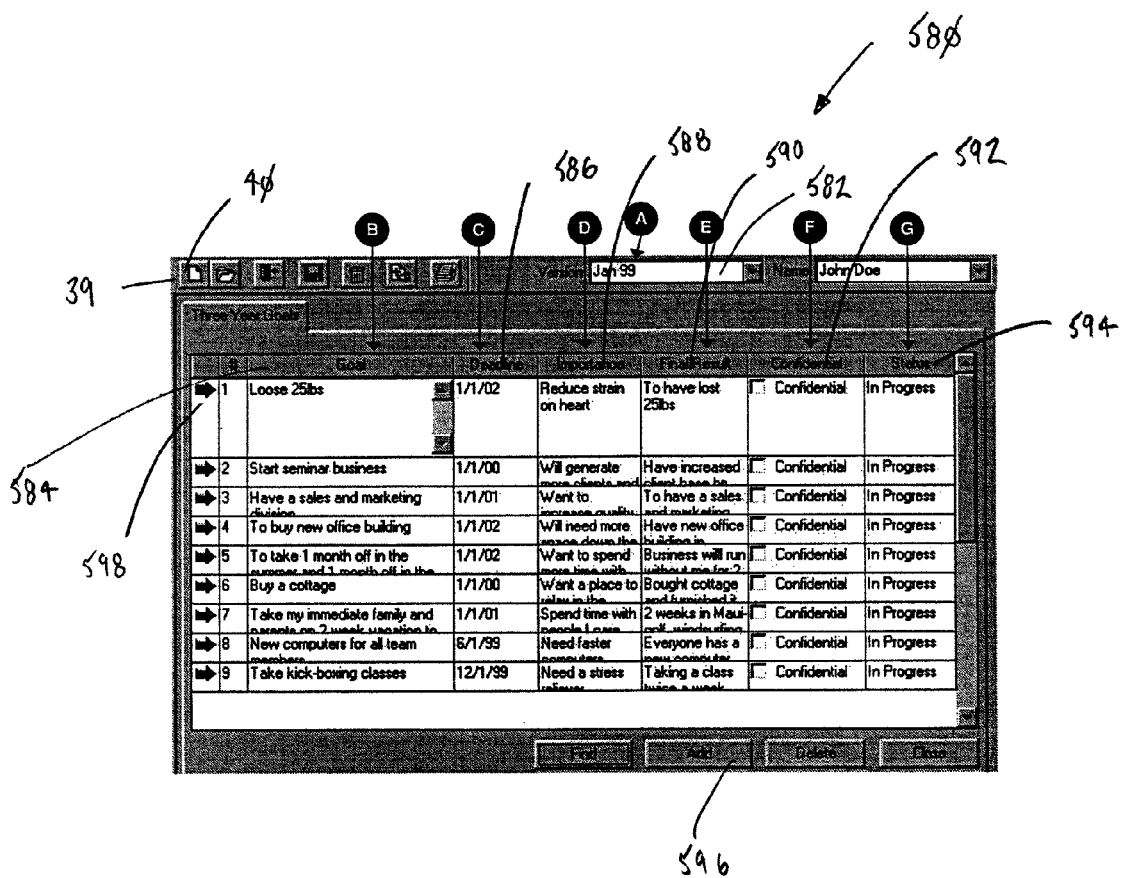
FIG. 40 is a screen capture of the three year goals screen of the three year planner of FIG. 1.

Referring now to FIG. 40, a screen capture of the three year goals screen of the three year planner of FIG. 1, is shown generally as 580. The three year goals screen 580 displays details about the goals the user wishes to achieve during a three year period. From screen 580, the user may add, update and delete goals. Any of the fields may be edited by clicking on the appropriate field. The user must select an existing version from the version field 582 or create a new version by clicking on the new file icon 40 of the toolbar 39. Goal field 584 may contain multiple lines of information describing the goal. Deadline field 586 contains the date by which the goal should be accomplished. Importance field 588 indicates the level of importance the goal is to the user. Final result field 590 contains the expected final result upon achieving the goal. Confidential field 592 may be checked if the user wishes to prevent other users from viewing the goal. Status field 594 may be selected from a drop down list displaying the standard system status codes: in progress (I), completed (C), forward (F) and drop (D). When the user selects the add button 596, or selector arrow 598 a pop up window (FIG. 41) appears providing more detail of the goal.

Figure 41:
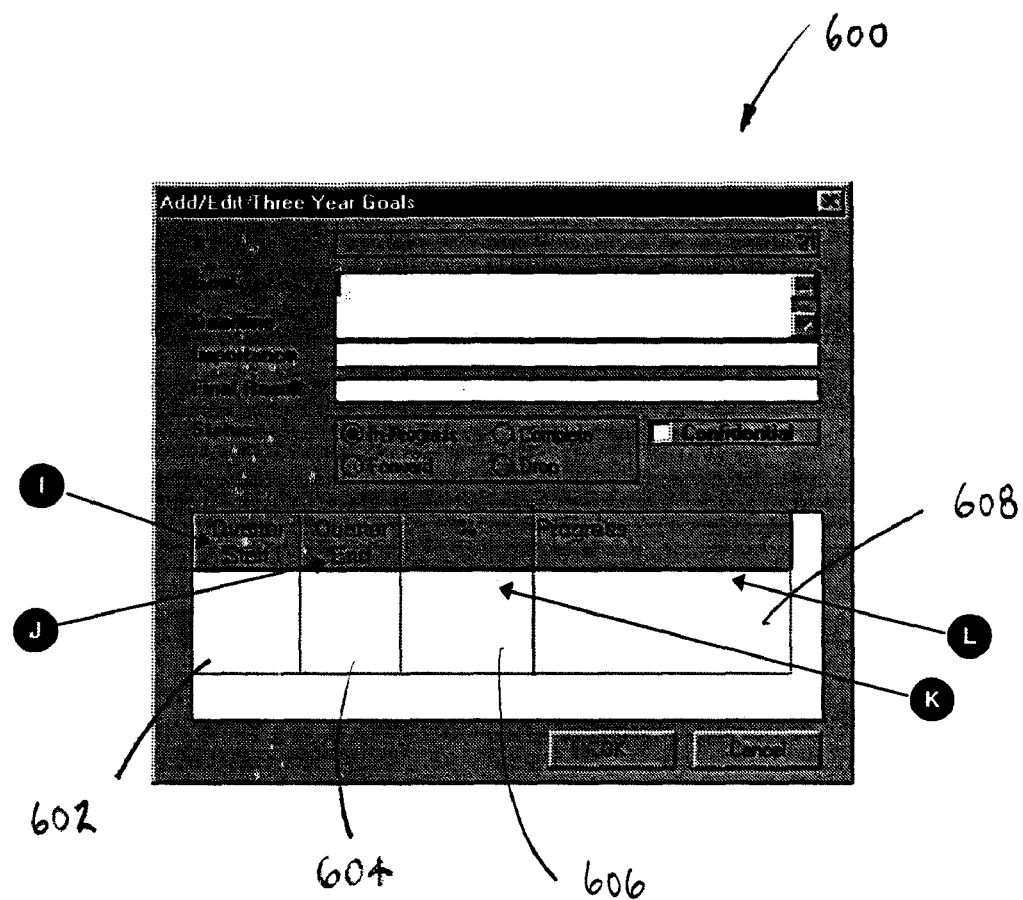
FIG. 41 is a screen capture of the add/edit pop up window of the three year planner.

Referring now to FIG. 41, a screen capture of the add/edit pop up window of the three year planner is shown generally as 600. Window 600 appears when the user selects the add button 596, or selector arrow 598 of three year goals screen 580 (FIG. 40). Window 600 contains all of the data of three year goals screen 580 (FIG. 40), with four additional fields. Quarter start field 602 is a date field for which the format MM/DD/YY is required. The date in field 602 must start on the same day of the week as specified by the user in their preferences (field 704, FIG. 49), such as Sunday or Monday. Quarter end field 604 contains the date on which the selected quarter ends. Percentage complete field 606 contains the percentage of completion toward the goal. Only whole numbers are permitted. Progress field 608 allows the user to enter a brief description of their progress on multiple lines.

Figure 42:
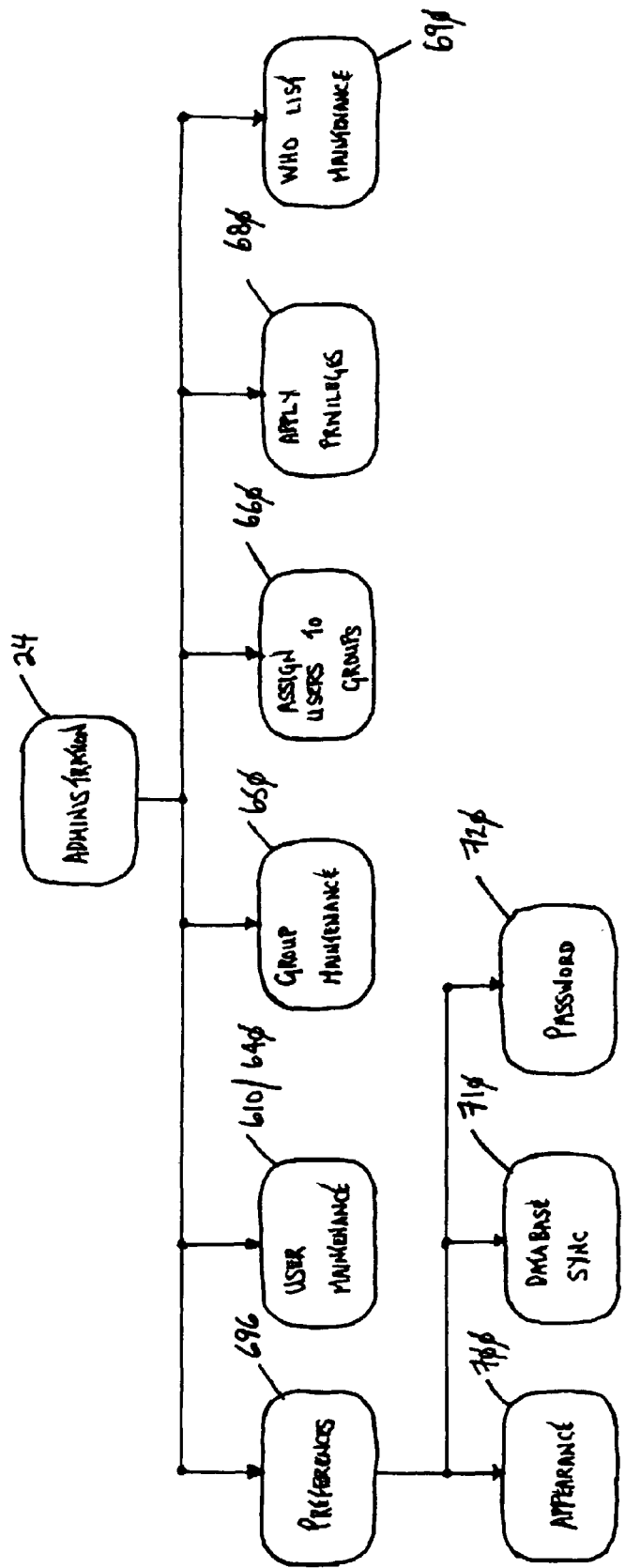
FIG. 42 is a block diagram illustrating the sub-components of administration function of FIG. 1.

FIG. 42 is a block diagram of the administration function 24. Administration function 24 has components preferences 696, user maintenance 610/640, group maintenance 650, assign users to groups 660, apply privileges 680 and who list maintenance 690. Preferences components 696 contains subcomponents appearance 700, database sync 710 and password 720. The administration function 24 is invoked by clicking on administration function 24 in the command bar 30 (FIG. 3) and then selecting users from the administration menu (not shown).

The present invention provides support for multiple users. With multi-user support comes the ability to share files and data. The present invention provides privilege features which allows the user to control which portions of their data may be viewed by others. Default privileges are assigned by the system to allow all users to view and or share data. A user may, however, apply privileges for specific users to grant or restrict their access to specific screens. There are three ways to control access privileges of users:

1) default privileges, set by the system administrator (more on this later);

2) assign privileges, associated with specific screens and set by the user; and 3) the confidential indicator, located on most screens and set by the user.

Based upon the privileges assigned, the following access is possible:

a) no access, no records will be displayed;

b) view access, summary records displayed on a particular screen can be reviewed, users having view access may not update or modify the data; and c) edit access, users will have the same authority as the owner to review and edit items displayed on a particular screen.

Default privileges are global, meaning they apply throughout the system. Assigning default privileges grants access privileges to the following screens: Pocket Coach 24 (FIG. 6), Protect Your Confidence 220 (FIG. 15), strategy circle 440 (FIG. 33*b*), largest cheque 490 (FIG. 35), lifetime extender 550 (FIG. 37), unique method 560 (FIG. 38), unique ability 570 (FIG. 39), and 3-year planner 580 (FIG. 40). Setting default privileges is part of the system administrator function, which will be described later. To assign privileges for each of the above screens, when the screen is being displayed the user may select the privileges icon 44 (FIG. 4), a pop up window (not shown) will appear allowing the user to select which individuals or groups may have: edit, view, or no access to the current screen.

Should a user wish to view the data of another user, they first click on the file menu 33 of the command bar 30 (FIG. 3) and then select the open option. This will display a pop up window (not shown) from which the user may select the screen to be displayed and the associated user.

Figure 43:
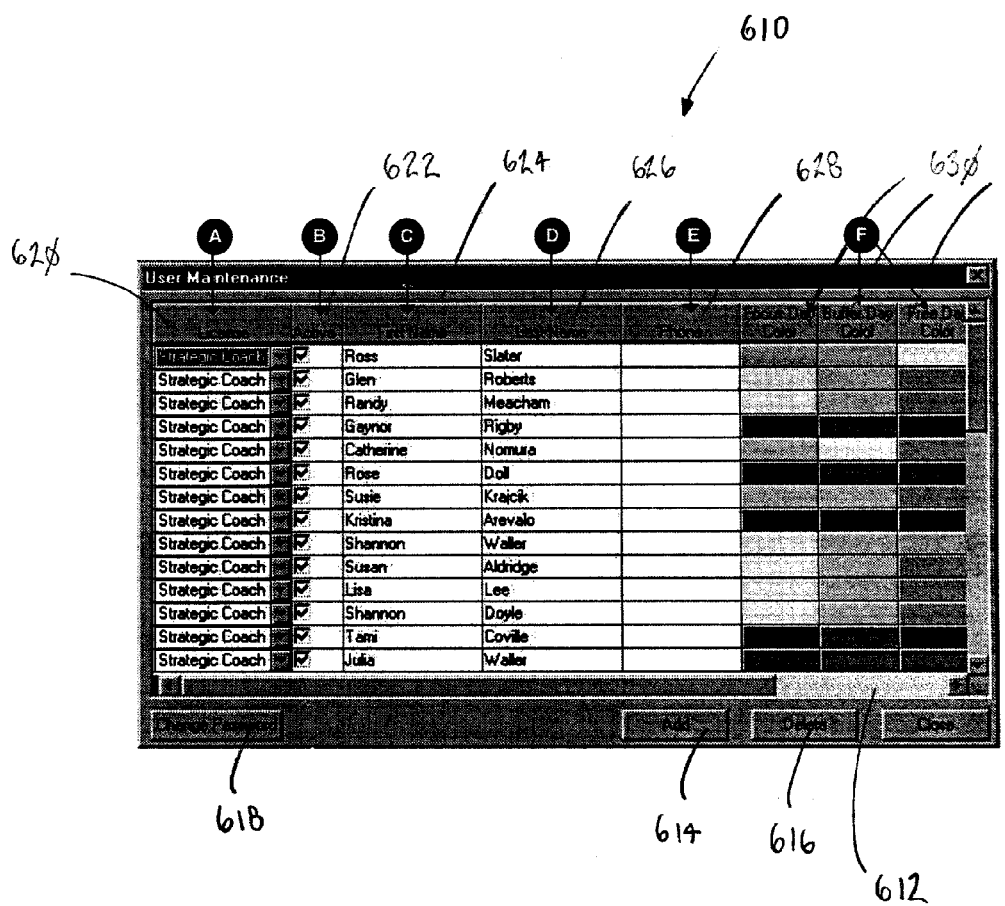
FIG. 43 is a screen capture of the user maintenance screen of the administration function.

Referring now to FIG. 43, a screen capture of a user maintenance screen of the administration function is shown generally as 610. User maintenance screen 610 displays all current users and their user preferences. From screen 610, the system administrator may add new users, set default user preferences and delete inactive users. As the data displayed in screen 610 is wider than a standard monitor, scroll bar 612 has been provided to allow the system administrator to scroll the display to view all data. Additional fields are shown in FIG. 37. Add button 614 will introduce a new row in screen 610 into which the system administrator may add data on a new user. Delete button 616 will remove all data and files owned by the user. Before a user is deleted, a delete confirmation message will be displayed requiring the system administrator to confirm that the record and associated files should be deleted. In cases where the user forgets their password, the system administrator may assign a new password by first clicking on a user and then clicking the change password button 618. A change password pop up window (not shown) will appear allowing the system administrator to type in a new password for the selected user. Active box 622 is checked by default. By removing the check mark in the active box 622, the user will become inactive but all of their data files will be retained, as opposed to selecting the delete box 616, which will result in the deletion of all of the user's files. First name field 624 contains the first name of the user and last name field 626 contains their surname. Phone number field 628 may contain slashes and parentheses. Each day type (free, focus and buffer) within day type columns 630 may have a different colour to highlight their type when displayed in screens such as the quarterly view screen 310 (FIG. 21). By double clicking on the cell corresponding to the day type for a user a drop down list of colours (not shown) will appear. By clicking on the desired colour from the drop down list, the colour in the selected day type field will change accordingly.

Figure 44:
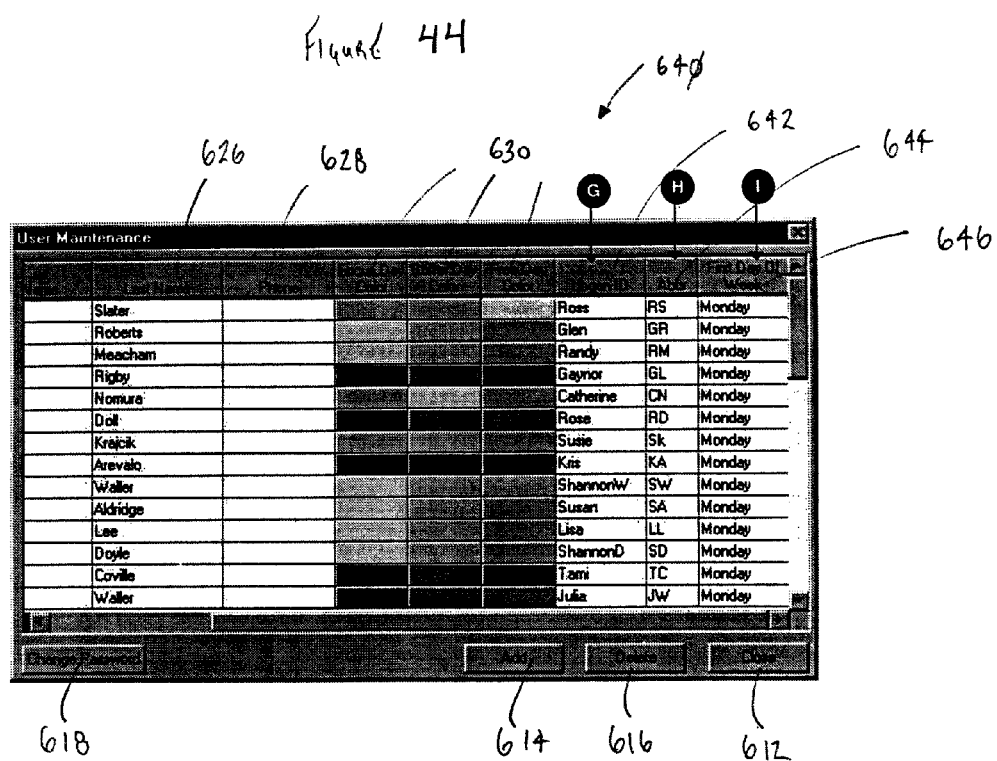
FIG. 44 is a screen capture of the user maintenance screen of FIG. 43, scrolled horizontally to the right.

Referring now to FIG. 44, a screen capture of the user maintenance screen of FIG. 36, scrolled horizontally to the right is shown generally as 640. Fields displayed in both FIG. 36 and FIG. 37 are numbered the same. Logon ID field 642 contains the user id that an individual will use to log on to the system. The user id may be a maximum of fifteen characters. The user id will also be the user password for the first time a user logs on to the system. After a successful first logon the user may change their password. Abbreviation field 644 contains an abbreviation for a user name. This abbreviation will appear throughout the system to denote the owner/user of specific items. First day of week field 646 is the day of the week on which the user's calendar will begin. The default value is Monday but it may be changed to any day of the week. Field 646 may not be blank.

Figure 45:
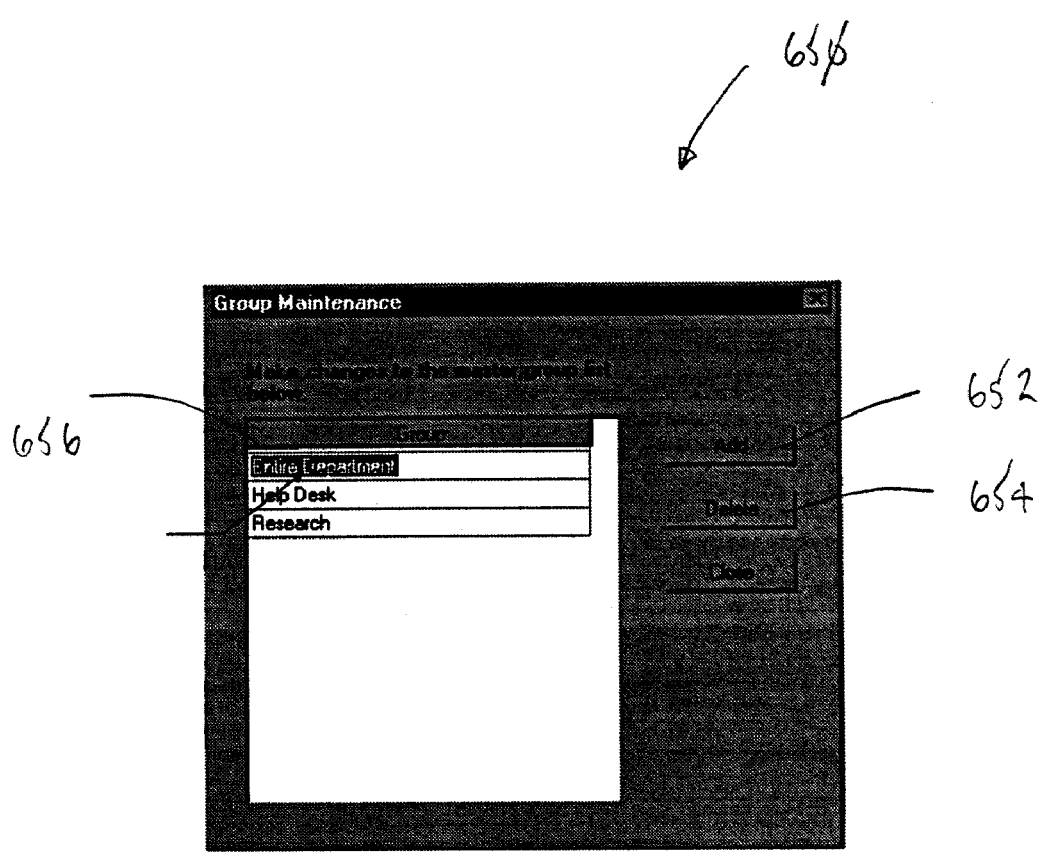
FIG. 45 is a screen capture of the group maintenance screen of the administration function.

Referring now to FIG. 45, a screen capture of the group maintenance screen of the administration function is shown generally as 650. Group maintenance screen 650 permits the system administrator to create groups. Groups consist of multiple users and are useful when the system administrator wishes to assign the same privileges to multiple users. To add a new group, the system administrator clicks on the add button 652 and a new blank line appears in the group name list 656. A group may be deleted by highlighting a group in the group name list 656 and pressing the delete button 654.

Figure 46:
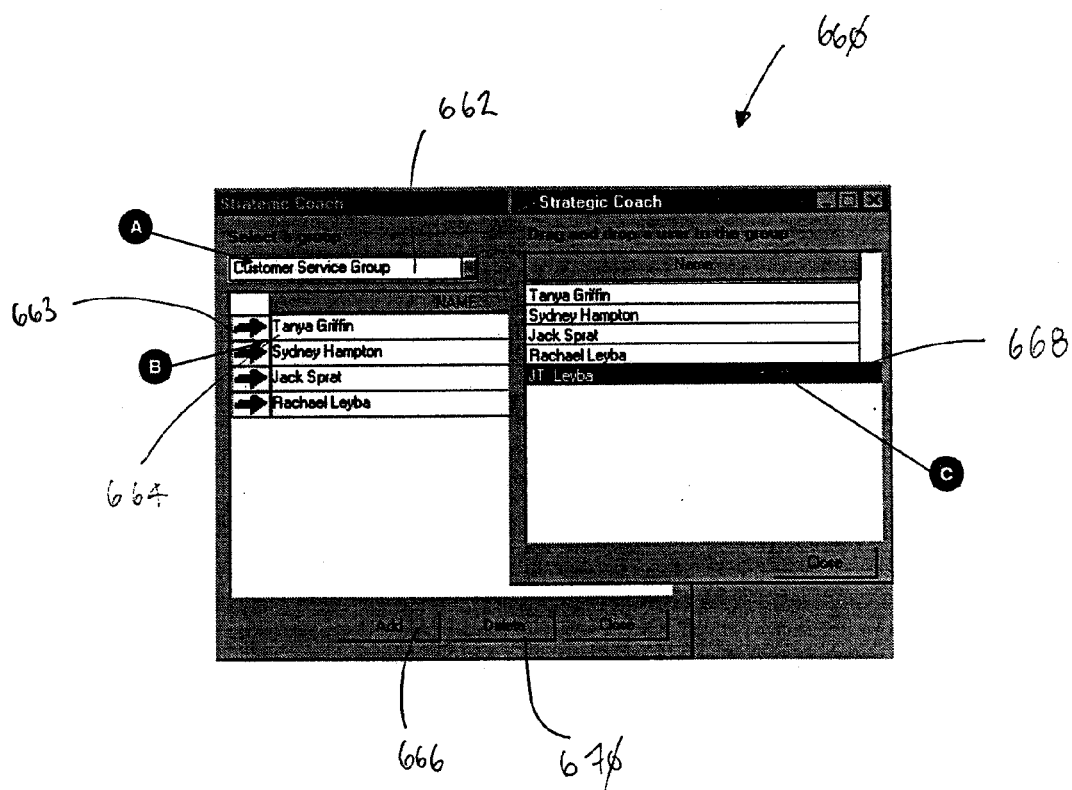
FIG. 46 is a screen capture of the assign users to groups screen of the administration function.

Referring now to FIG. 46, a screen capture of the assign users to groups screen of the administration function is shown generally as 660. User groups screen 660 is used by the system administrator to add or delete users from a group. Group field 662 displays the name of the group being edited and may be changed by clicking on selector arrow 663 adjacent the field. Once a group has been selected, all user names in that group will be displayed in names column 664. Clicking on add button 666 results in the display of pop up window 668 from which a new user may be selected by dragging the user record to the names column 664. Highlighting a record in the names column 664 and then pressing delete button 670 will delete the selected user name from the group.

Figure 47:
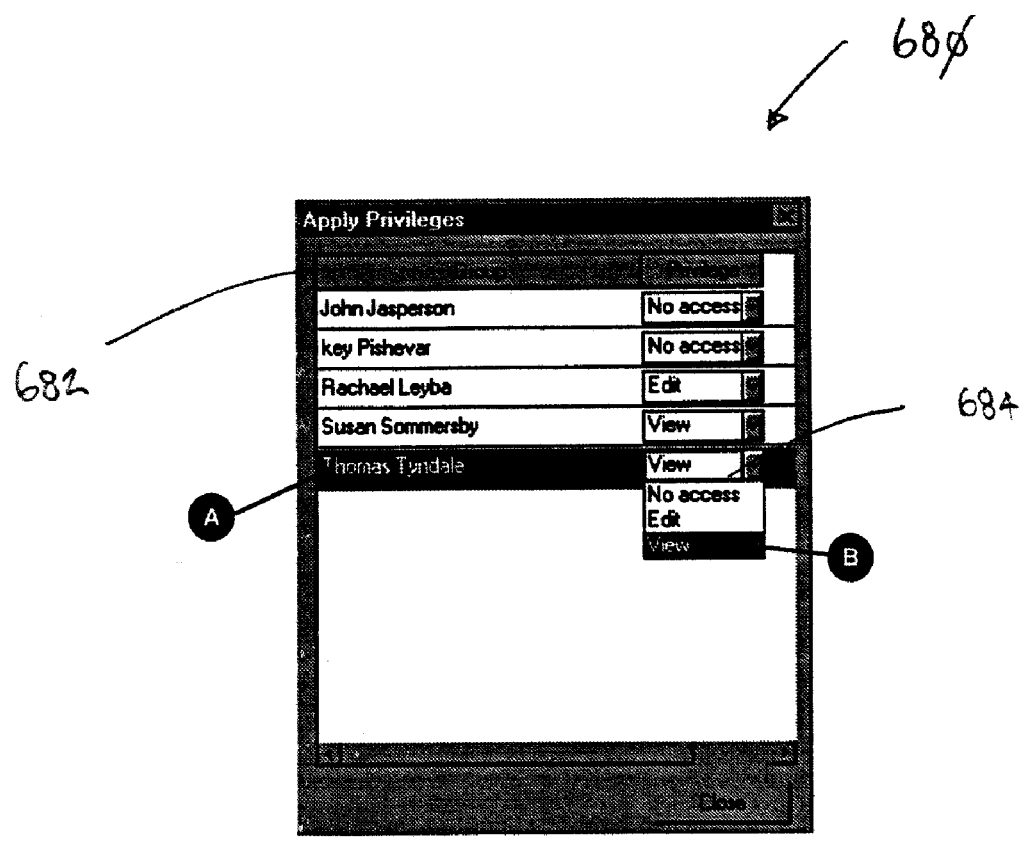
FIG. 47 is a screen capture of the apply privileges screen of the administration function.

Referring now to FIG. 47, a screen capture of the apply privileges screen of the administration function is shown generally as 680. Apply privileges screen 680 may be used by any user to assign access privileges to the information entered by the user into the system. Users may grant the following access privileges to other users:

a) view; read only b) edit; full access c) no access; locked out

To further restrict users with view and/or edit access, clicking the confidential check box on any screen will result in the record being blanked out and in red. Privileges may be granted to users for specific screens by selecting the apply privileges icon 44 located on the tool bar 39 (FIG. 4). Apply privileges icon 44 only appears on screens for which this feature is active. Selecting a group or user from group list 682 will result in the highlighting of that selection. An access selection may then be made from drop down list 684 which will apply to the selected user or all members of the selected group.

Referring now to FIG. 48, a screen capture of the who list maintenance screen of the administration function is shown generally as 690. Who list maintenance screen 690 permits a user to create a list of individuals to be used in delegations fields throughout the system. The individuals on the list may or may not have access to the system. Selecting the add button 692 results in a blank line being displayed in the list, into which a name may be entered. Pressing the delete button 694 after highlighting an entry in the list will result in removal of that entry.

Referring now to FIG. 49, a screen capture of the appearance screen of the preferences component of the administration function is shown generally as 700. Appearance screen 700 allows the user to define certain fields within the application. Day colour selection box 702 allows the user to select the colour for each type of day (focus, buffer and free). The selected colour will then be displayed for each day type in the scheduling screens of the system. The first day of week field 704 allows the user to select the day that begins their week. This value will be listed as the default in the weekly planner screen 270 (FIG. 20) and will be required when new quarters are created. Currency format field 706 allows the user to select a preferred currency format from a drop down list.

Figure 50:
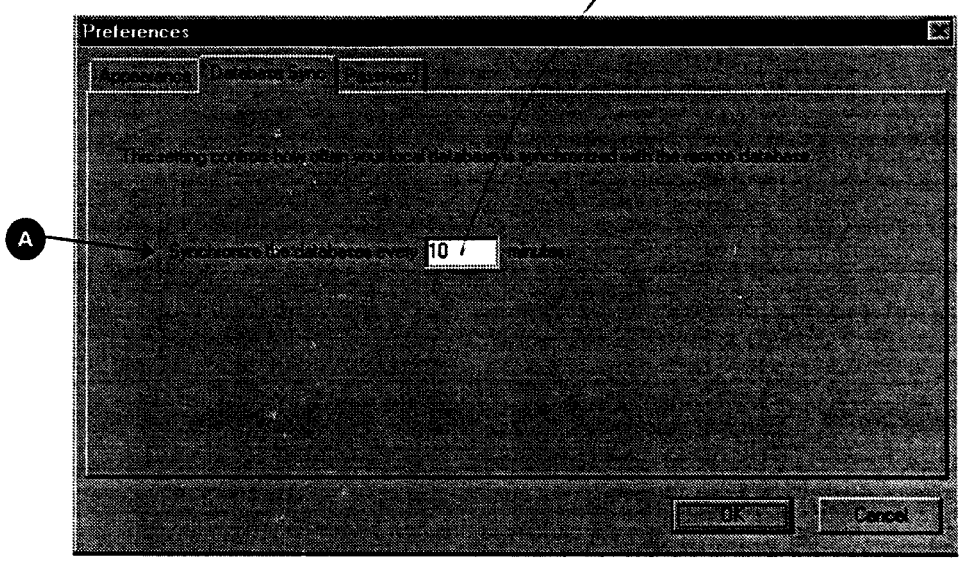
FIG. 50 is a screen capture of the database synchronization screen of the preferences sub-component of the administration function; and, FIG. 51 is a screen capture of the password screen of the preferences sub-component of the administration function.

Referring now to FIG. 50, a screen capture of the database synchronization screen of the preferences component of the administration function is shown generally as 710. Database synchronization screen 710 permits the user to synchronize local data stored on the user machine with the master database stored on a server. Each user has their own copy of data they are editing or viewing stored on their workstation. As data is shared by multiple users, each of whom may be updating information at any time, multiple versions of data will exist. The synchronize function ensures that the data on the workstation is reconciled with the master database to keep the master database current. Synchronize field 712 allows the user to set how often the local database will be synchronized with the remote database.

Figure 51:
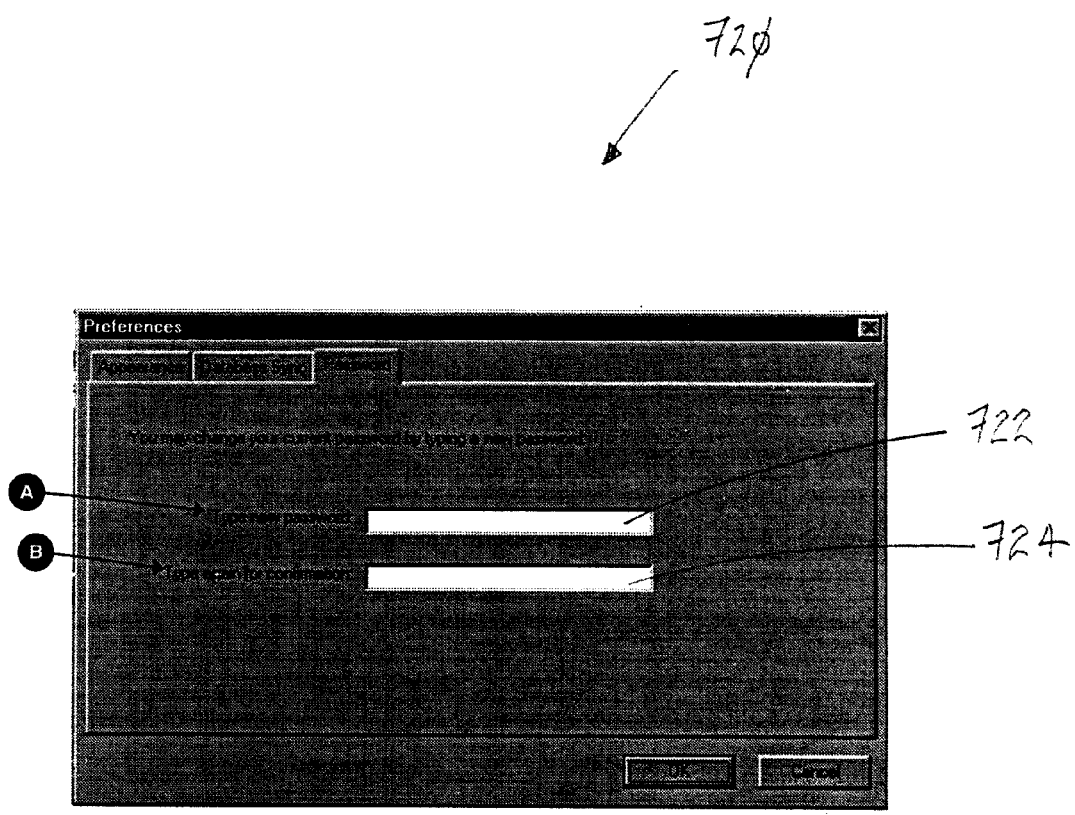

Referring now to FIG. 51, a screen capture of the password screen of the preferences component of the administration function is shown generally as 720. Password screen 720 permits the user to change their log on password. When a user first logs on, their password will be he same as their logon user id. This is the system default. The system administrator does not set a user password unless there is a system error or the user has forgotten their password. A password may be up to fifteen characters and may contain any combination of letters and/or numbers. Password field 722 allows the user to enter a new password and password confirmation field 724 verifies that the password was entered correctly.

In the current embodiment of the present invention, an import facility is provided, files may be imported by selecting the file function of the command bar 30 (FIG. 3) and selecting the importing function from the drop down list displayed. In the present invention data may be imported only to the contacts component of the system 324 (FIG. 24) or the to-do list component of the system 360 (FIG. 28). Similarly an export feature is provided which by selecting the file menu and clicking on exporting, allows the user to export data from either the contacts or to-do list components.

It is to be understood that the invention is not limited in its application to the details of construction and arrangement of components illustrated in the accompanying drawings, since the invention is capable of other embodiments, and of being practiced or carried out in various ways within the scope of the claims. Also it is to be understood that the phraseology and terminology employed herein is for the purpose of description and not limitation.

The invention claimed is:

1. A project management computer system for aiding a user in attaining goals, the system comprising:
   a display and an input device;
   a memory storing computer readable instructions; and
   a processor coupled to memory and the display, the processor adapted to execute the stored instructions for displaying:
   (a) a strategy circle interface comprising:
      (i) at least one goal field for describing a goal,
      (ii) a plurality of obstacle fields for describing a plurality of obstacles to be overcome in attaining the goal; and
      (iii) a plurality of strategy fields for describing activities for overcoming the plurality of obstacles to achieve the goal;
   (b) a planner interface comprising:
      (i) means for displaying one or more activities associated with at least one obstacle described in the strategy circle interface;
      (ii) means for designating free, focus, and buffer days associated with each of one or more calendar days of a time period, wherein the planner interface includes means for designating free, focus, and buffer days over a time period of weekly, quarterly, or yearly; and
   (c) an entrepreneurial time system interface comprising:
      (i) means for inputting and displaying one or more activities associated with the at least one obstacle as a free, focus, or buffer day activity;
      (ii) means for calculating from the free, focus, and buffer day designations of the planner interface, a preset goal and an actual number of free days, focus days, and buffer days actually passed for a selected quarterly time period; and
      (iii) means for displaying the preset goal, actual days, and a comparison of actual days to the preset goal days for each of the free, focus, and buffer days for the selected time period.

2. A computer program product for aiding a user in attaining goals, the computer program product comprising a computer readable medium storing instructions for execution by a processor, the processor coupled to the memory and a display and adapted to execute the instructions for displaying:
   (a) a strategy circle interface comprising:
      (i) at least one goal field for describing a goal,
      (ii) a plurality of obstacle fields for describing a plurality of obstacles to be overcome in attaining the goal; and
      (iii) a plurality of strategy fields for describing activities for overcoming the plurality of obstacles to achieve the goal;
   (b) a planner interface comprising:
      (i) means for displaying one or more activities associated with at least one obstacle described in the strategy circle interface;
      (ii) means for designating free, focus, and buffer days associated with each of one or more calendar days of a time period, wherein the planner interface includes means for designating free, focus, and buffer days over a time period of weekly, quarterly, or yearly; and
   (c) an entrepreneurial time system interface comprising:
      (i) means for inputting and displaying one or more activities associated with the at least one obstacle as a free, focus, or buffer day activity;
      (ii) means for calculating from the free, focus, and buffer day designations of the planner interface, a preset goal and an actual number of free days, focus days, and buffer days actually passed for a selected quarterly time period; and
      (iii) means for displaying the preset goal, actual days, and a comparison of actual days to the preset goal days for each of the free, focus, and buffer days for the selected time period.

3. The project management computer system of claim 1, wherein the entrepreneurial time system interface further comprises:
   means for selecting the selected quarterly time period.

4. The project management computer system of claim 1, wherein the entrepreneurial time system interface further comprises:
   means for designating data as confidential and hidden from other users of the project management computer system.

5. The project management computer system of claim 1, wherein at least one obstacle field in the plurality of obstacle fields is linked to the at least one goal field.

6. The project management computer system of claim 1, wherein at least one obstacle field in the plurality of obstacle fields has a unique associated strategy field in the plurality of strategy fields, and the at least one obstacle field is linked with the unique associated strategy field.

7. The project management computer system of claim 1, further comprising a strategy matrix having, for each strategy field in the plurality of strategy fields, an associated plurality of information fields for receiving information regarding a strategy described in the strategy field.

8. The project management computer system of claim 1, further comprising a search means for searching through the plurality of strategy records for a selected search term.

9. The project management computer system of claim 1, wherein for each strategy field in the plurality of strategy fields the associated plurality of information fields comprises an associated personnel field for entering names of personnel required to implement a strategy designated in the strategy field.

10. The project management computer system of claim 1, wherein for each strategy field in the plurality of strategy fields the associated plurality of information fields comprises an associated resource field for entering a description of resources required to implement a strategy designated in the strategy field.

11. The project management computer system of claim 1, wherein for each strategy field in the plurality of strategy fields the associated plurality of information fields comprises an associated plurality of step fields for describing steps to be executed to implement a strategy designated in the strategy field.

12. The computer program product of claim 2, wherein the entrepreneurial time system interface further comprises:
   means for selecting the selected quarterly time period.

13. The computer program product of claim 2, wherein the entrepreneurial time system interface further comprises:
   means for designating data as confidential and hidden from other users of the project management computer system.

14. The computer program product of claim 2, wherein at least one obstacle field in the plurality of obstacle fields is linked to the at least one goal field.

15. The computer program product of claim 2, wherein at least one obstacle field in the plurality of obstacle fields has a unique associated strategy field in the plurality of strategy fields, and the at least one obstacle field is linked with the unique associated strategy field.

16. The computer program product of claim 2, further comprising a strategy matrix having, for each strategy field in the plurality of strategy fields, an associated plurality of information fields for receiving information regarding a strategy described in the strategy field.

17. The computer program product of claim 2, further comprising a search means for searching through the plurality of strategy records for a selected search term.

18. The computer program product of claim 2, wherein for each strategy field in the plurality of strategy fields the associated plurality of information fields comprises an associated personnel field for entering names of personnel required to implement a strategy designated in the strategy field.

19. The computer program product of claim 2, wherein for each strategy field in the plurality of strategy fields the associated plurality of information fields comprises an associated resource field for entering a description of resources required to implement a strategy designated in the strategy field.

20. The computer program product of claim 2, wherein for each strategy field in the plurality of strategy fields the associated plurality of information fields comprises an associated plurality of step fields for describing steps to be executed to implement a strategy designated in the strategy field.

* * * * *